(12) United States Patent
Faris et al.

(10) Patent No.: US 6,558,830 B2
(45) Date of Patent: May 6, 2003

(54) METAL-AIR FUEL CELL BATTERY SYSTEMS HAVING MECHANISM FOR EXTENDING THE PATH LENGTH OF METAL-FUEL TAPE DURING DISCHARGING AND RECHARGING MODES OF OPERATION

(75) Inventors: Sadeg M. Faris, Pleasantville, NY (US); Tsepin Tsai, Peekskill, NY (US)

(73) Assignee: Reveo, Inc., Elmsford, NY (US)

( * ) Notice: Subject to any disclaimer, the term of this patent is extended or adjusted under 35 U.S.C. 154(b) by 2 days.

(21) Appl. No.: 09/770,109

(22) Filed: Jan. 25, 2001

(65) Prior Publication Data

US 2002/0022168 A1 Feb. 21, 2002

Related U.S. Application Data

(63) Continuation of application No. 09/112,596, filed on Jul. 9, 1998, now Pat. No. 6,228,519, which is a continuation-in-part of application No. 09/110,761, filed on Jul. 3, 1998, now Pat. No. 6,335,111, and a continuation-in-part of application No. 09/110,762, filed on Jul. 3, 1998, now Pat. No. 6,299,997, and a continuation-in-part of application No. 09/074,337, filed on May 7, 1998, now Pat. No. 6,472,093, and a continuation-in-part of application No. 08/944,507, filed on Oct. 6, 1997, now Pat. No. 6,296,960.

(51) Int. Cl.$^7$ .......................... H01M 12/06; H01M 4/00
(52) U.S. Cl. ........................ 429/27; 429/68; 429/127
(58) Field of Search .......................... 429/27, 68, 127

(56) References Cited

U.S. PATENT DOCUMENTS

| | | | |
|---|---|---|---|
| 3,252,838 A | 5/1966 | Huber et al. | |
| 3,260,620 A | 7/1966 | Gruber | |
| 3,357,864 A | 12/1967 | Huber | |
| 3,432,354 A | 3/1969 | Jost | |
| 3,436,270 A | 4/1969 | Oswin et al. | |
| 3,454,429 A | 7/1969 | Gruber | |
| 3,532,548 A | 10/1970 | Stachurski | |
| 3,536,535 A | * 10/1970 | Lippincott | 429/68 |
| 3,577,281 A | 5/1971 | Pountney et al. | |
| 3,717,505 A | 2/1973 | Unkle et al. | |
| 3,963,519 A | 6/1976 | Louie | |
| 3,977,901 A | 8/1976 | Buzzelli | |
| 4,052,541 A | 10/1977 | von Krusenstierna | |
| 4,152,489 A | 5/1979 | Chottiner | |
| 4,172,924 A | 10/1979 | Warszawski | |
| 4,246,324 A | 1/1981 | de Nora et al. | |
| 4,331,742 A | 5/1982 | Richter | |
| 4,341,847 A | 7/1982 | Sammells | |
| 4,551,399 A | 11/1985 | Despic | |
| 4,560,626 A | 12/1985 | Joy | |
| 4,626,482 A | 12/1986 | Hamlen et al. | |
| 4,693,946 A | 9/1987 | Niksa et al. | |
| 4,714,662 A | 12/1987 | Bennett | |
| 4,828,939 A | 5/1989 | Turley et al. | |
| 4,913,983 A | 4/1990 | Cheiky | |
| 4,916,036 A | * 4/1990 | Cheiky | 429/127 |
| 4,950,561 A | 8/1990 | Niksa et al. | |
| 4,957,826 A | 9/1990 | Cheiky | |
| 4,968,396 A | 11/1990 | Harvey | |

(List continued on next page.)

*Primary Examiner*—Stephen Kalafut
(74) *Attorney, Agent, or Firm*—Thomas J. Perkowski, Esq., P.C.; Ralph J. Crispino

(57) ABSTRACT

Disclosed is a method and apparatus for extending pathlength of metal-fuel tape during discharging and/or recharging operations so that a supply of metal-fuel tape contained within a cassette device or on a supply reel can be rapidly discharged and/or recharged in an improved manner. During discharging operations, a plurality of discharging heads are selectively arranged about the extended path-length of metal-fuel tape so as increase the rate at which electrical power is powered from the system. During recharging operations, a plurality of recharging heads are selectively arranged about the extended path-length of metal-fuel tape to decrease the time required to recharge the metal-fuel tape transported through the system.

24 Claims, 31 Drawing Sheets

U.S. PATENT DOCUMENTS

| | | | |
|---|---|---|---|
| 5,250,370 A | * 10/1993 | Faris | 429/68 |
| 5,260,144 A | 11/1993 | O'Callaghan | |
| 5,306,579 A | 4/1994 | Shepard et al. | |
| 5,318,861 A | 6/1994 | Harats et al. | |
| 5,328,777 A | 7/1994 | Bentz et al. | |
| 5,328,778 A | 7/1994 | Woodruff et al. | |
| 5,354,625 A | 10/1994 | Bentz et al. | |
| 5,362,577 A | 11/1994 | Pedicini et al. | |
| 5,387,477 A | 2/1995 | Cheiky | |
| 5,389,456 A | 2/1995 | Singh et al. | |
| 5,405,713 A | 4/1995 | Pecherer et al. | |
| 5,418,080 A | 5/1995 | Korall et al. | |
| 5,439,758 A | 8/1995 | Stone et al. | |
| 5,462,816 A | 10/1995 | Okamura et al. | |
| 5,486,429 A | 1/1996 | Thibault et al. | |
| 5,512,384 A | * 4/1996 | Celeste et al. | 429/27 X |
| 5,525,441 A | 6/1996 | Reddy et al. | |
| 5,536,592 A | * 7/1996 | Celeste et al. | 429/68 |
| 5,554,452 A | 9/1996 | Delmolino et al. | |
| 5,582,931 A | 12/1996 | Kawakami | |
| 5,599,637 A | 2/1997 | Pecherer et al. | |
| 5,691,074 A | 11/1997 | Pedicini et al. | |
| 5,711,648 A | 1/1998 | Hammerslag | |
| 5,721,064 A | 2/1998 | Pedicini et al. | |
| 5,756,228 A | 5/1998 | Roseanou | |

* cited by examiner

FIG.2A1
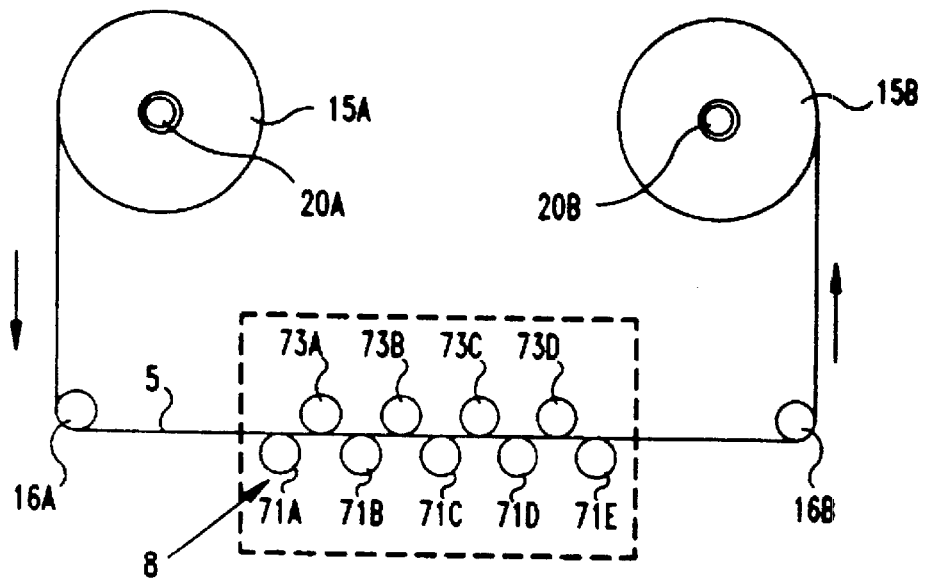
FIG.2A2
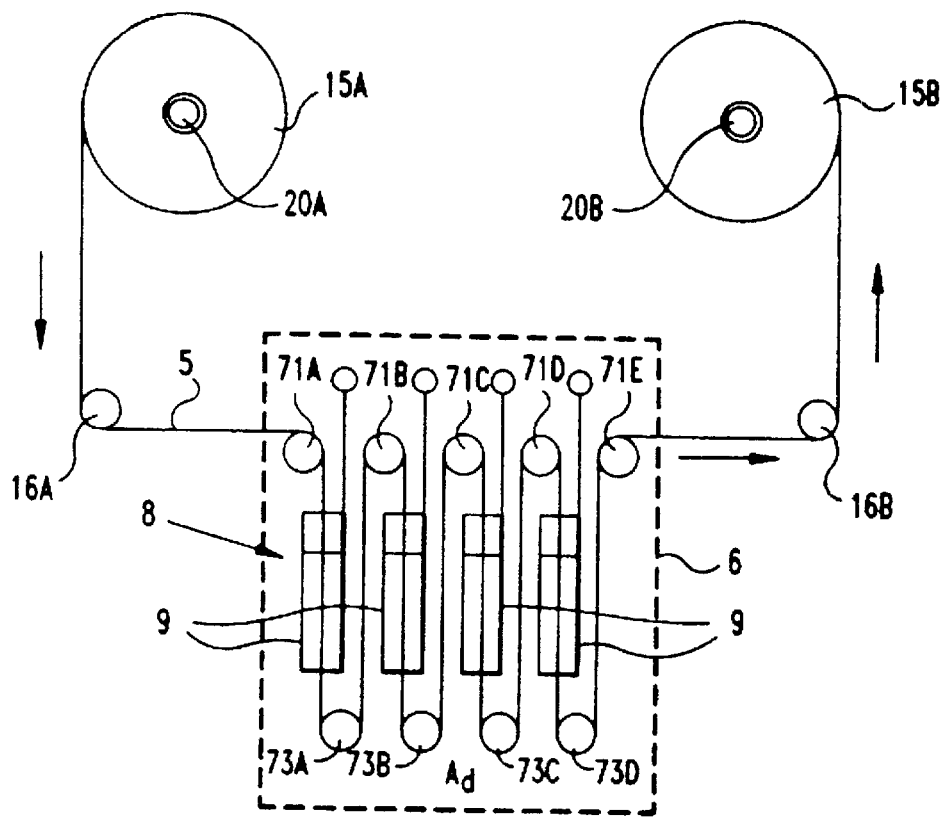

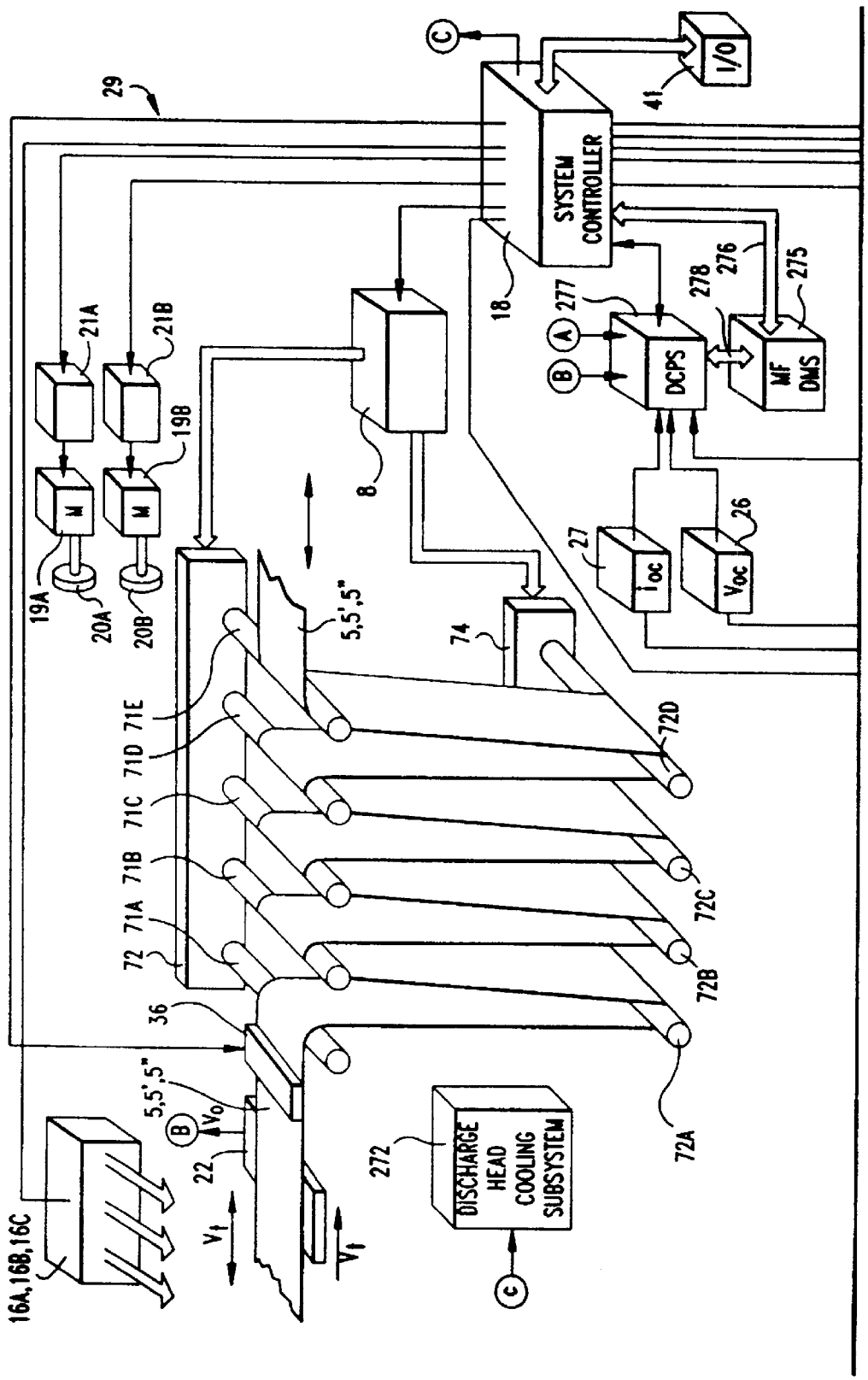
FIG.2A31

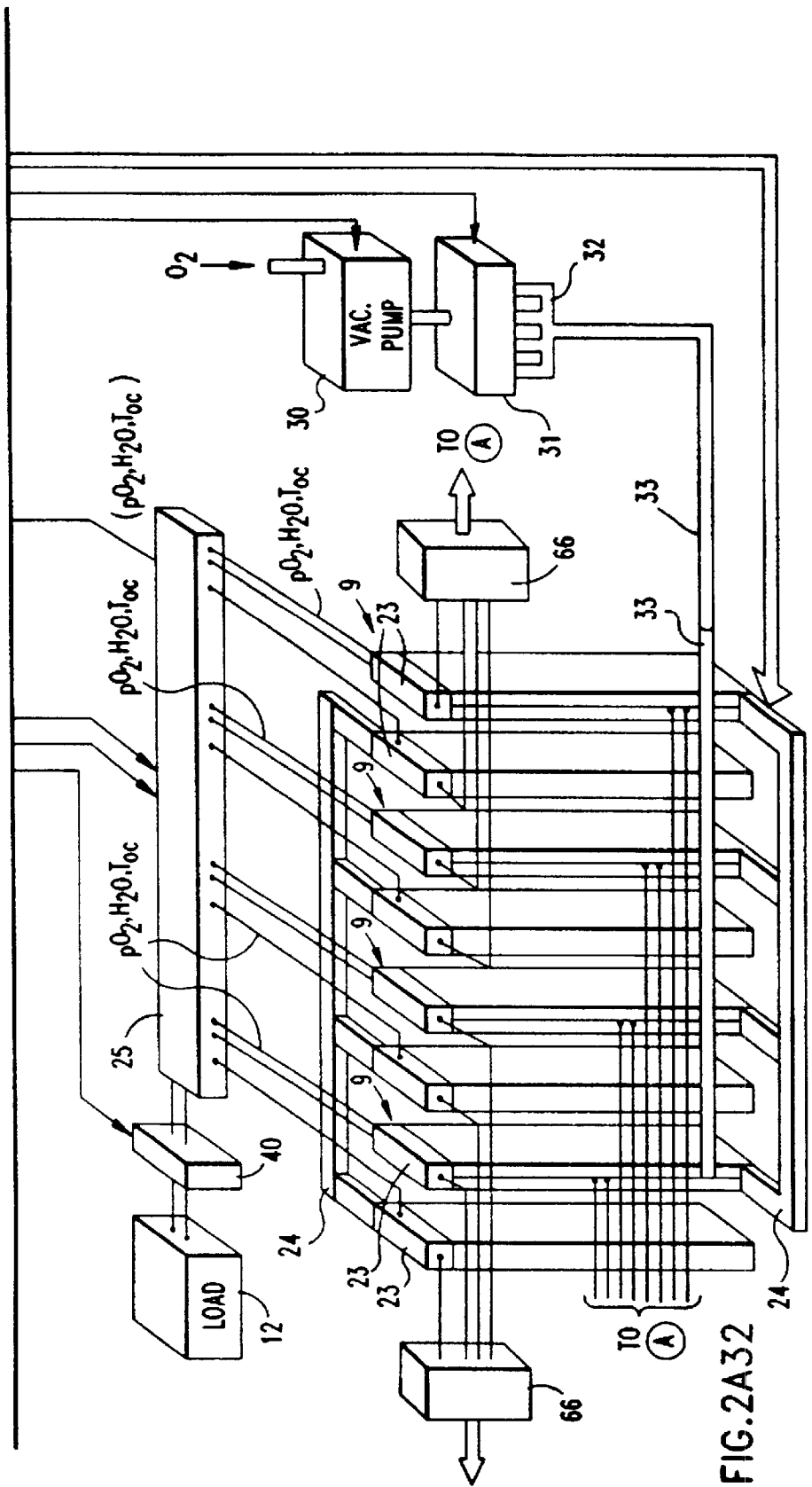
FIG. 2A32

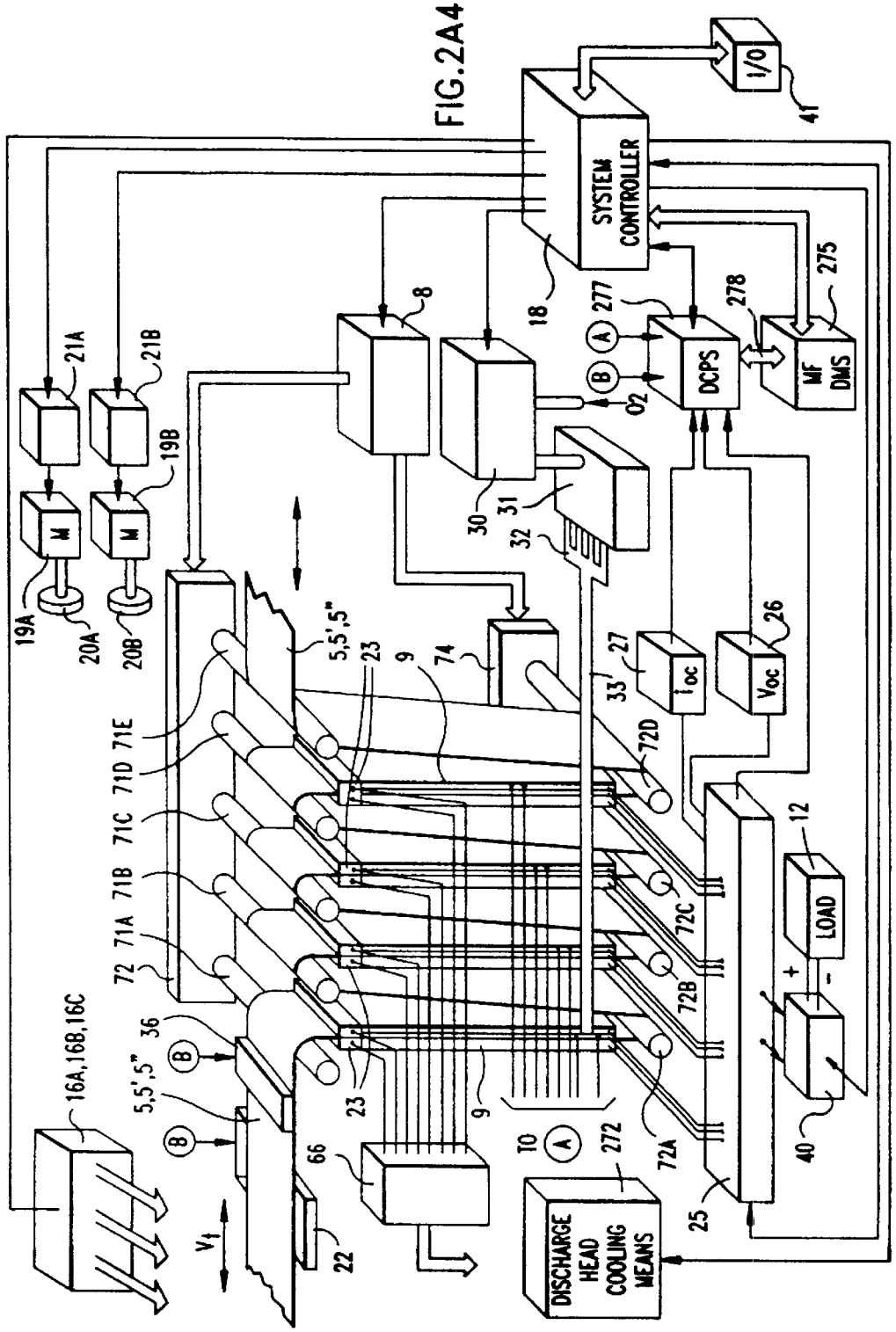
FIG.2A4

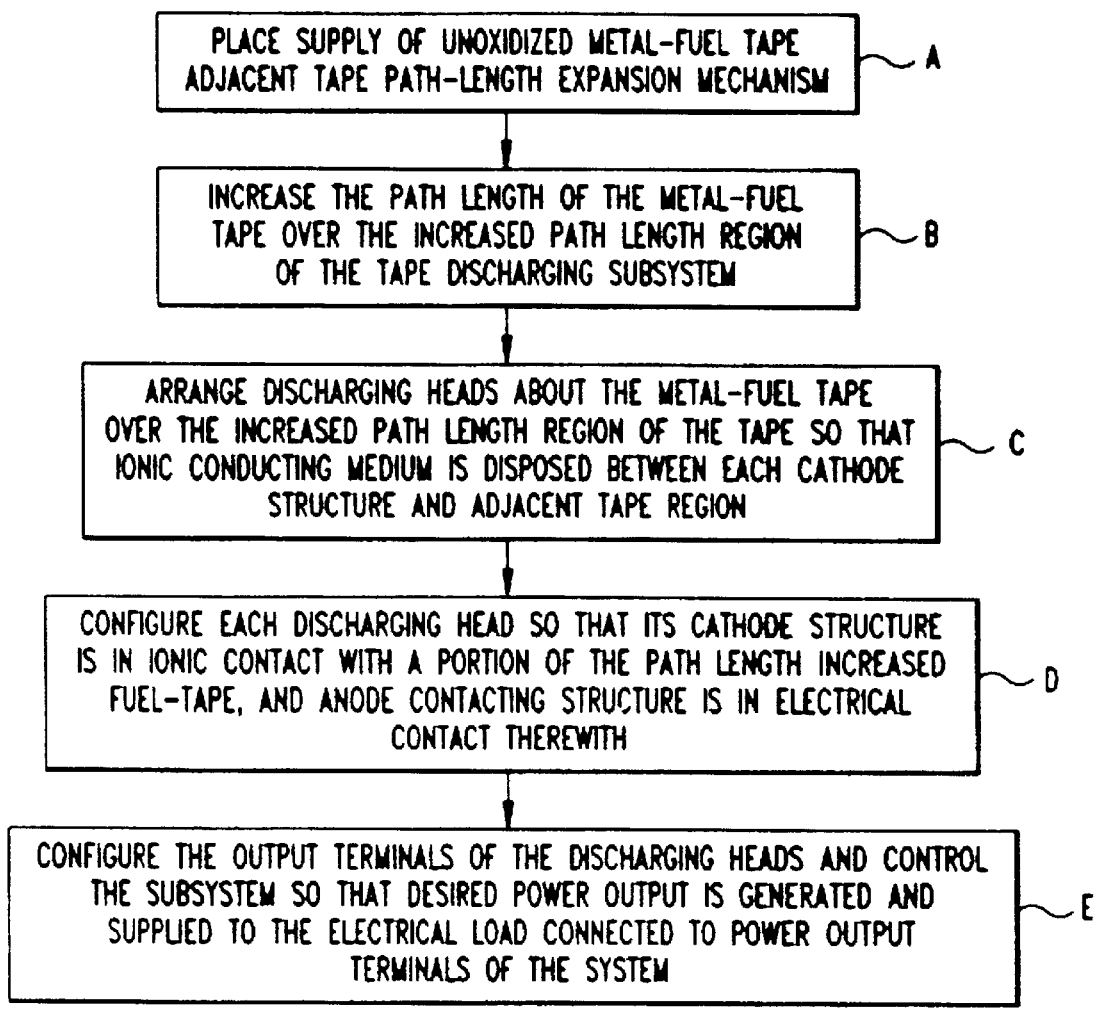
FIG.2A5

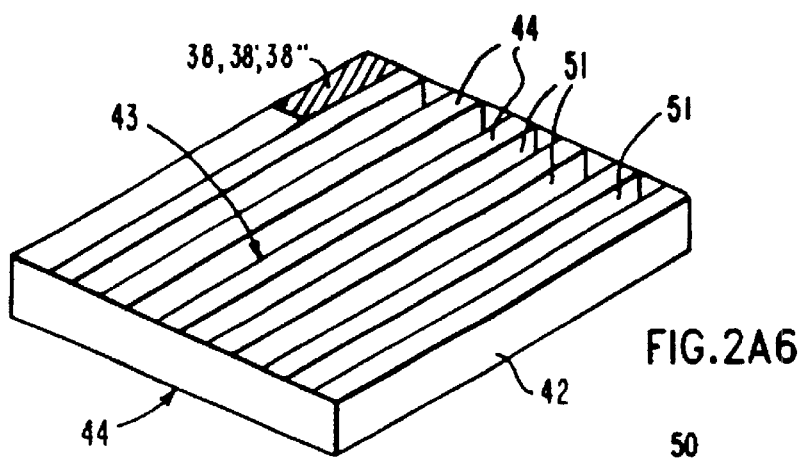
FIG.2A6
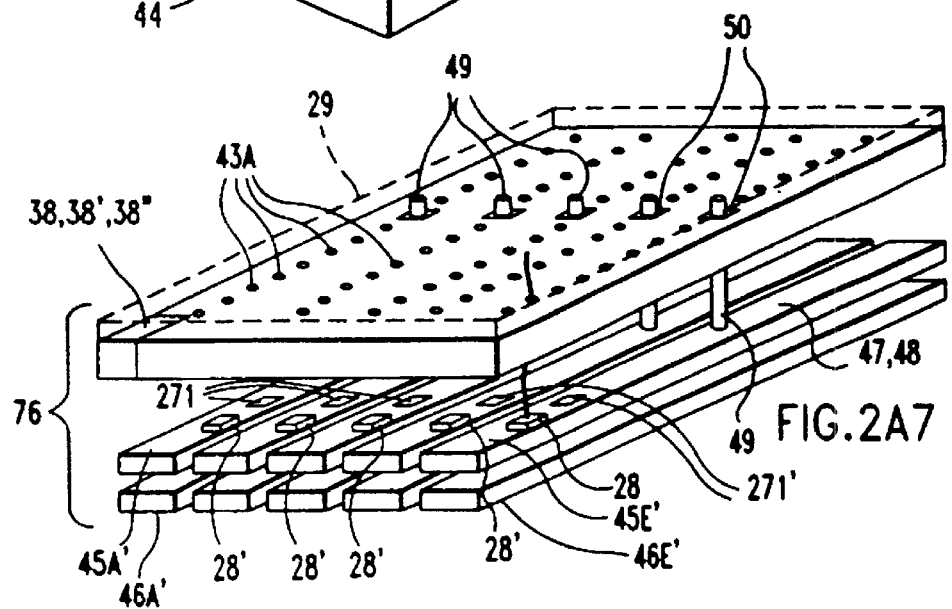
FIG.2A7
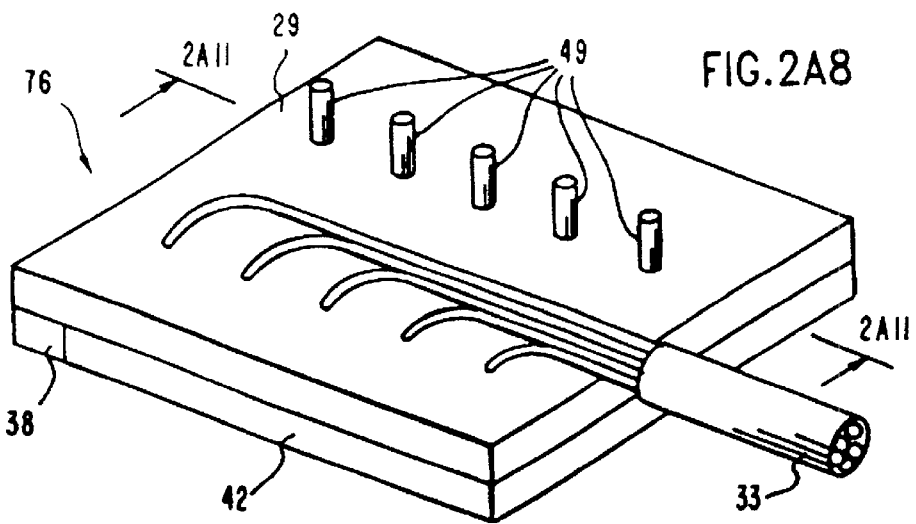
FIG.2A8

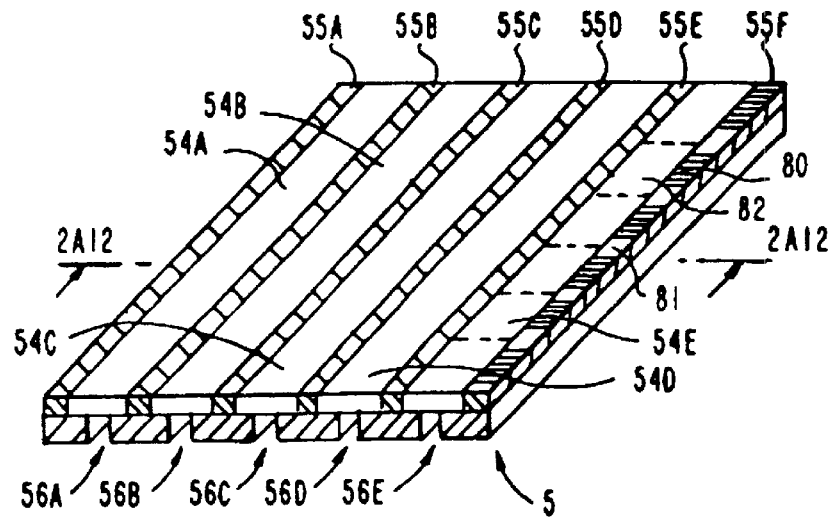
FIG.2A9
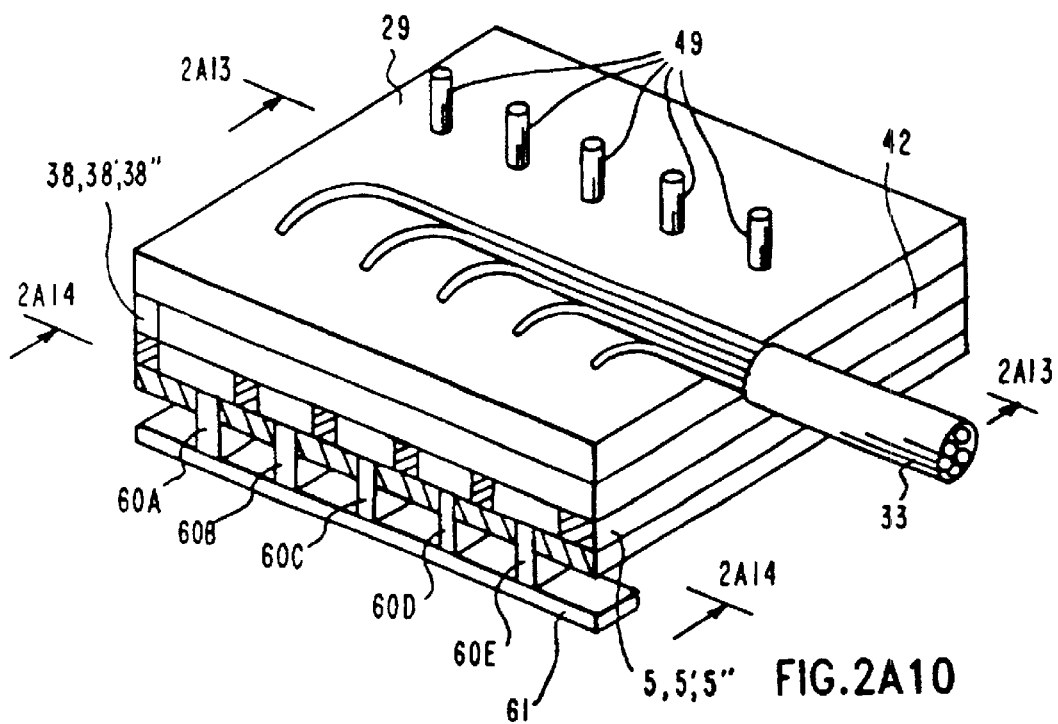
FIG.2A10

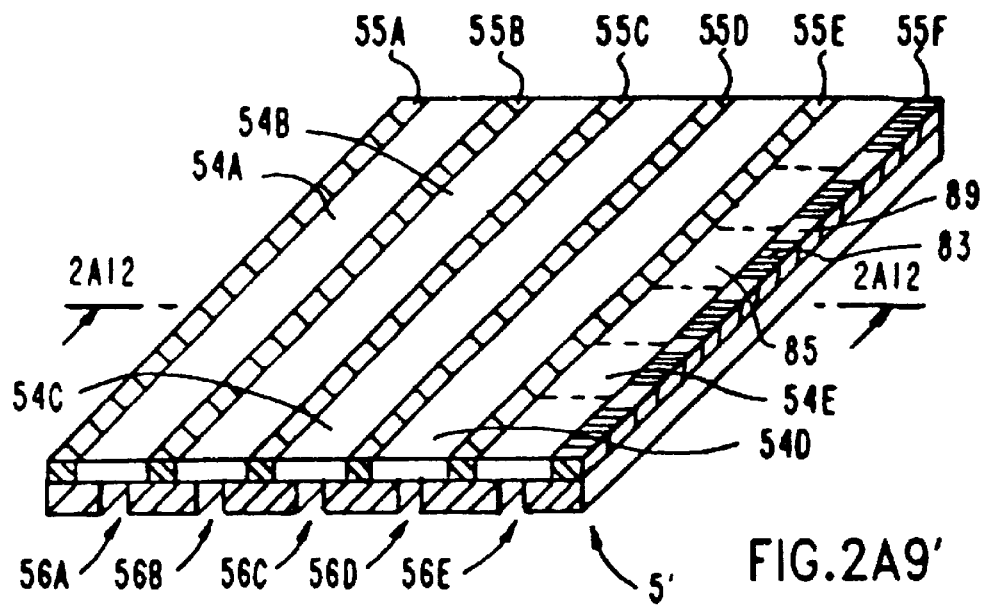
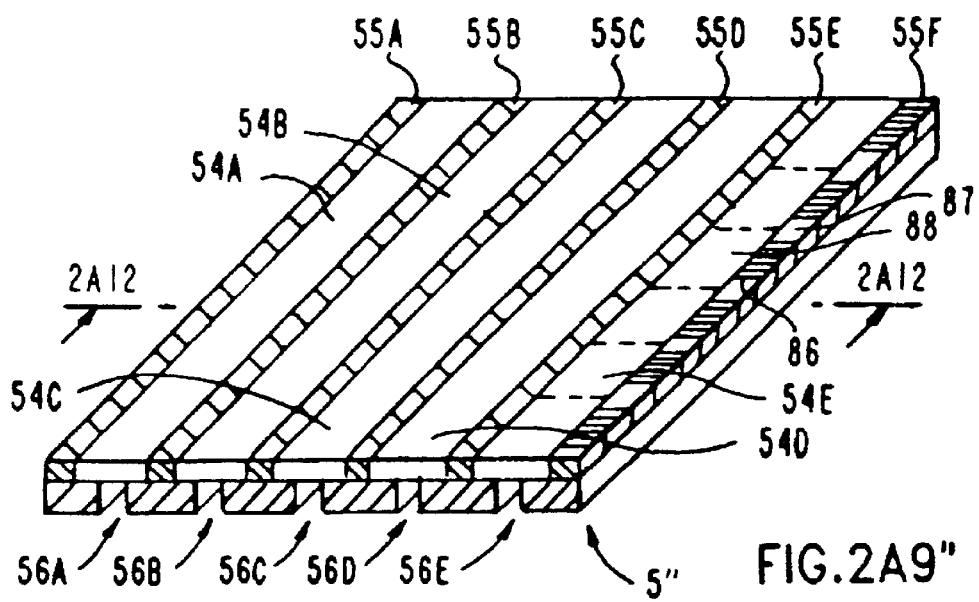

FIG.2A11
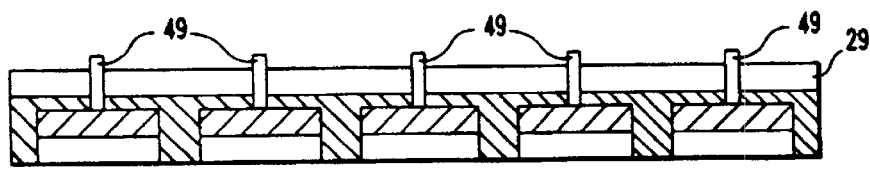
FIG.2A12
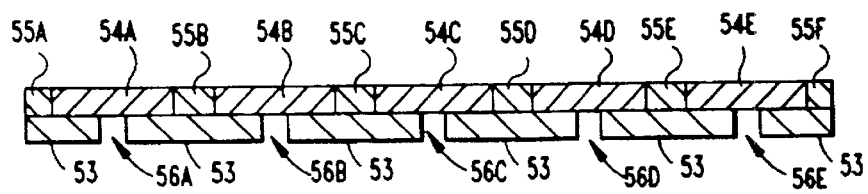
FIG.2A13
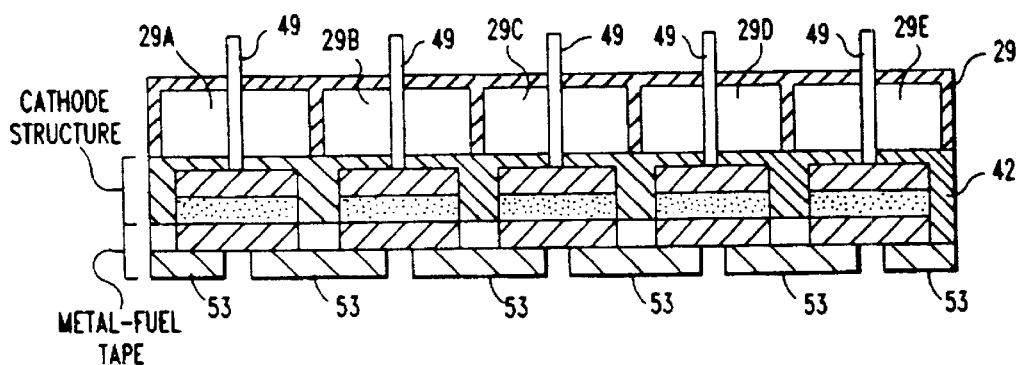
FIG.2A14
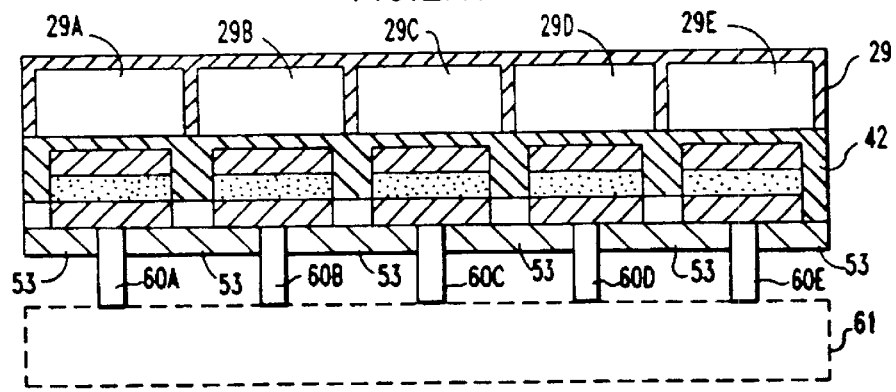

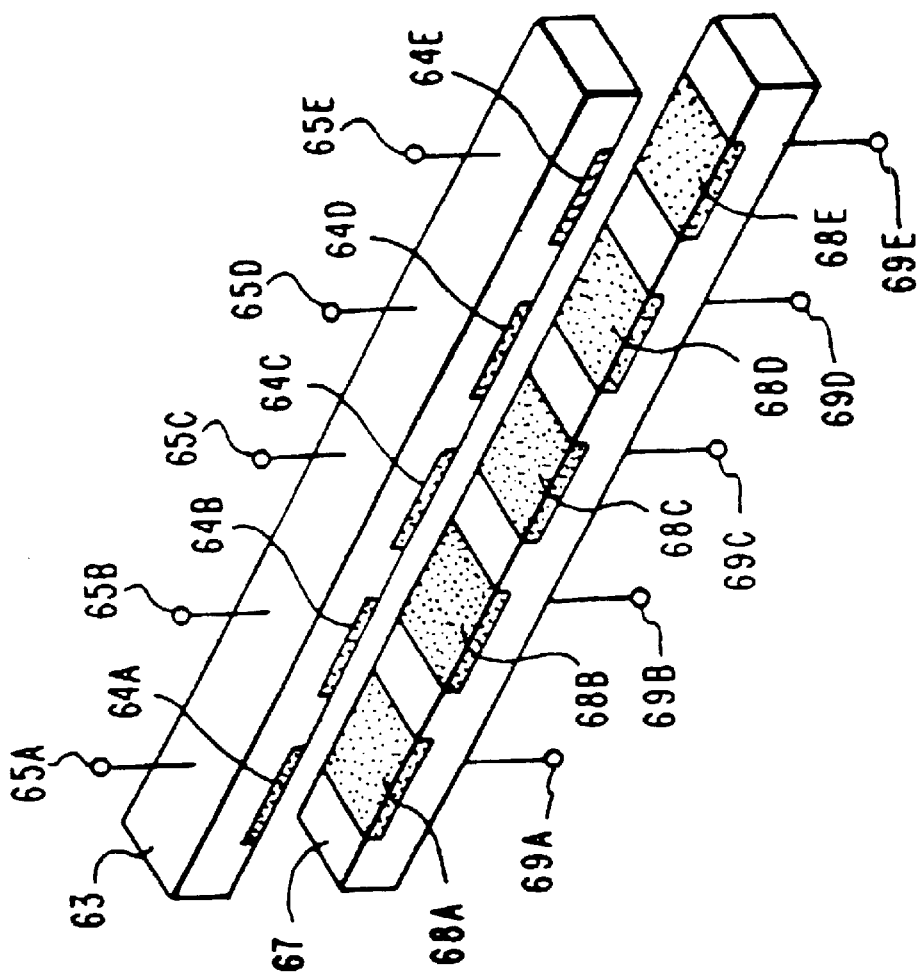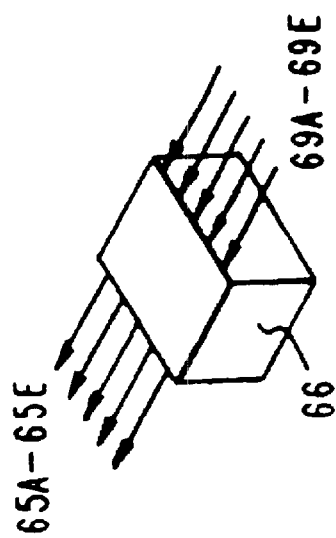
FIG.2A15

FIG.2A16

DISCHARGE DATA STRUCTURE

| FUEL-TAPE CASSETTE NO.__ | METAL-FUEL TRACK NO.1 | | | | | | METAL-FUEL TRACK NO.2 | METAL-FUEL TRACK NO.3 | METAL-FUEL TRACK NO.4 | METAL-FUEL TRACK NO.5 |
|---|---|---|---|---|---|---|---|---|---|---|
| | | $t_1$ | $t_2$ | $t_3$ | ... | $t_n$ | | | | |
| | $i_{oc}$ | | | | ... | | | | | |
| | $V_{oc}$ | | | | ... | | | | | |
| | $V_t$ | | | | ... | | | | | |
| | $pO_2$ | | | | ... | | | | | |
| | $H_2O\%$ | | | | ... | | | | | |
| | CM | | | | ... | | | | | |
| ZONE NO.1 | | | | | | | | | | |
| ZONE NO.2 | | | | | | | | | | |
| ZONE NO.3 | | | | | | | | | | |
| ZONE NO.4 | | | | | | | | | | |
| ZONE NO.5 | | | | | | | ... | ... | ... | ... |
| ... | | | | | | | | | | |
| ZONE NO.n | | | | | | | | | | |

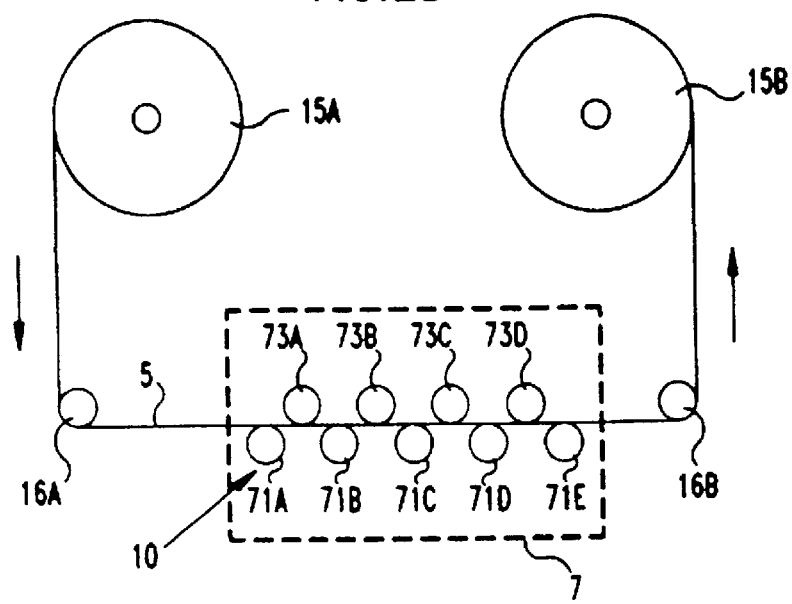
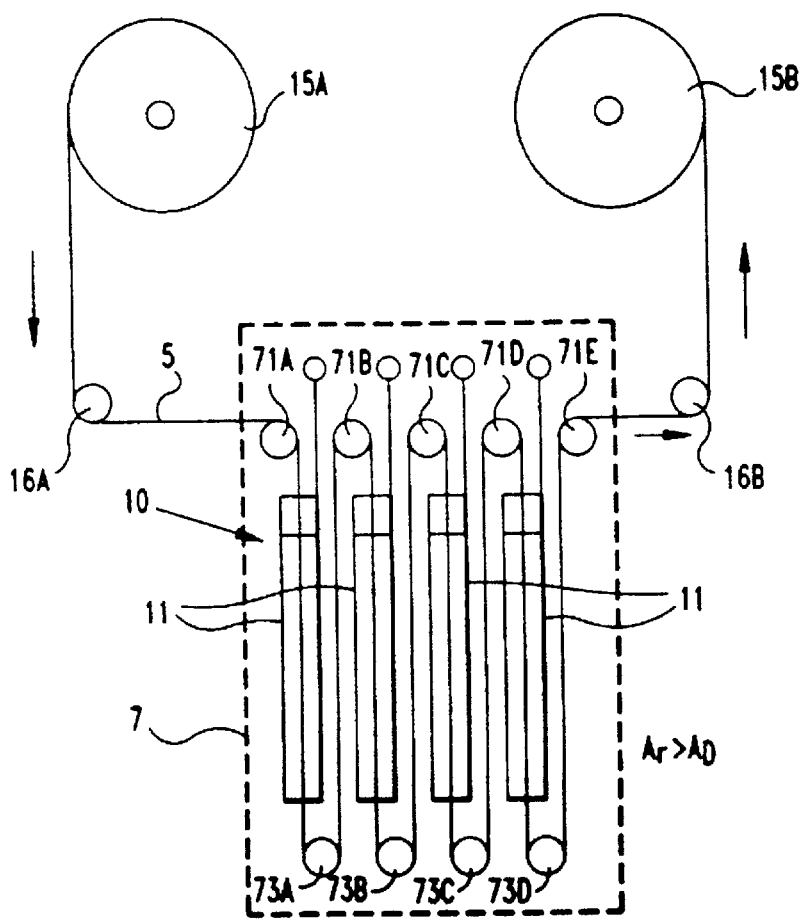

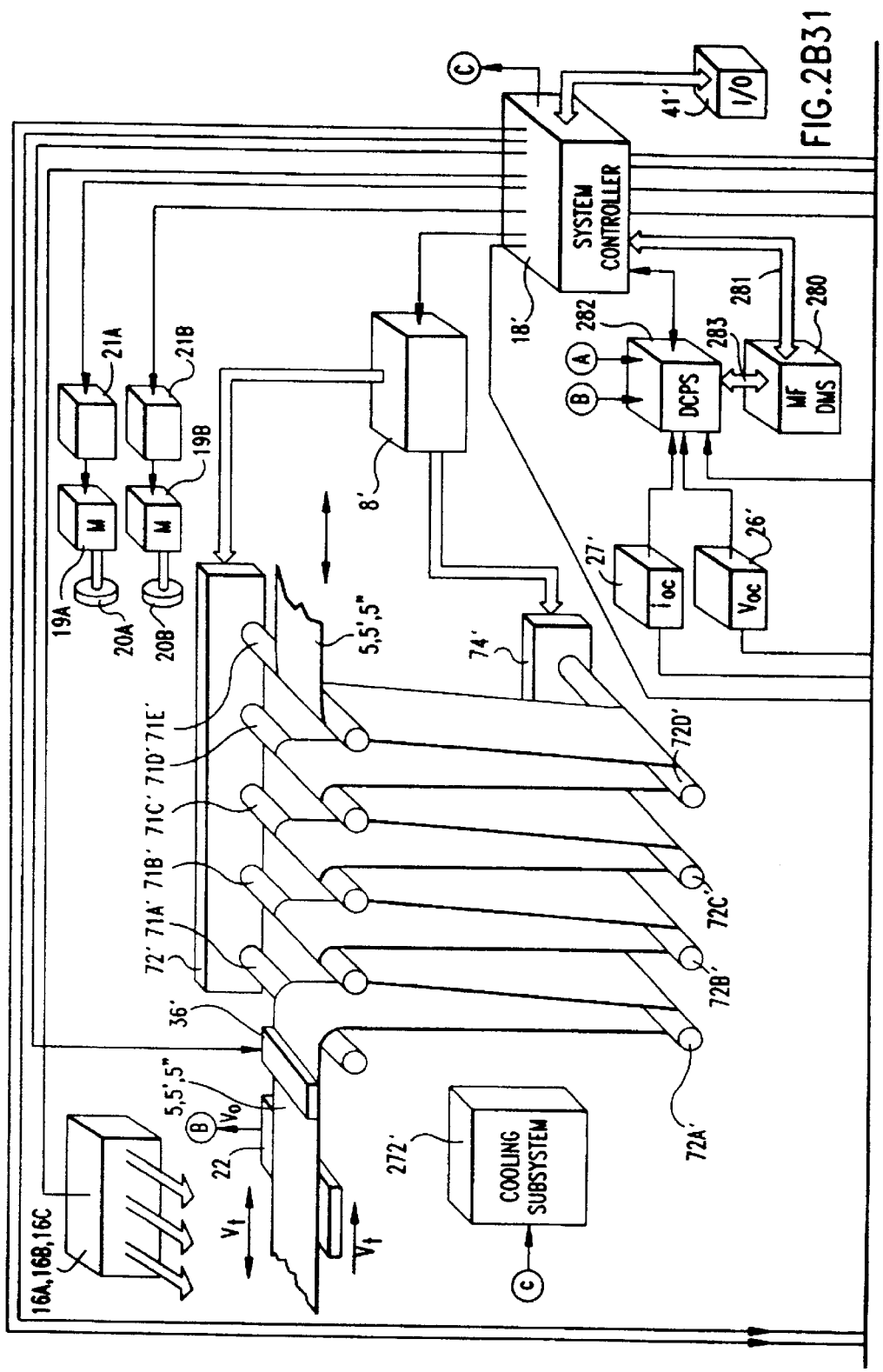

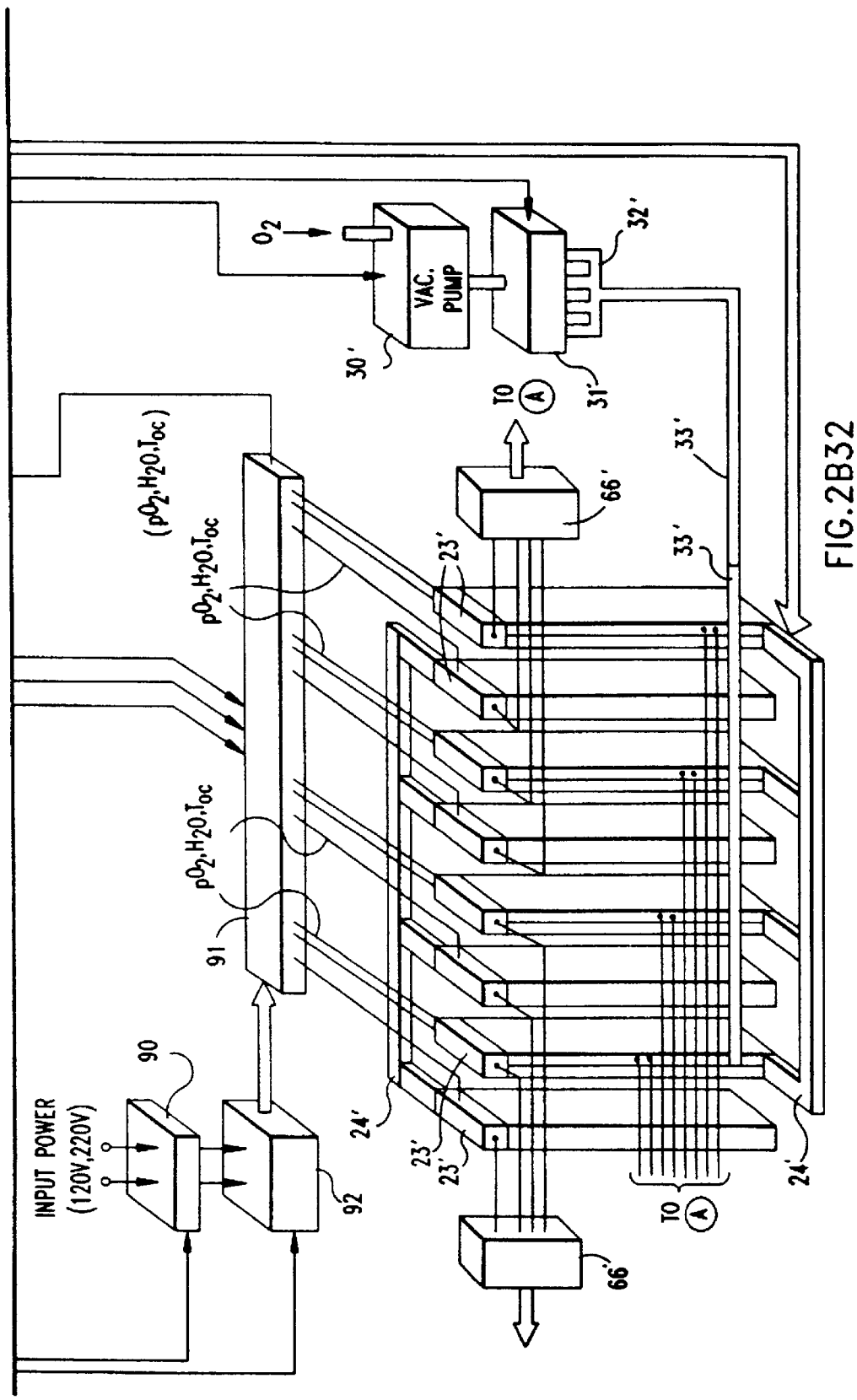
FIG. 2B32

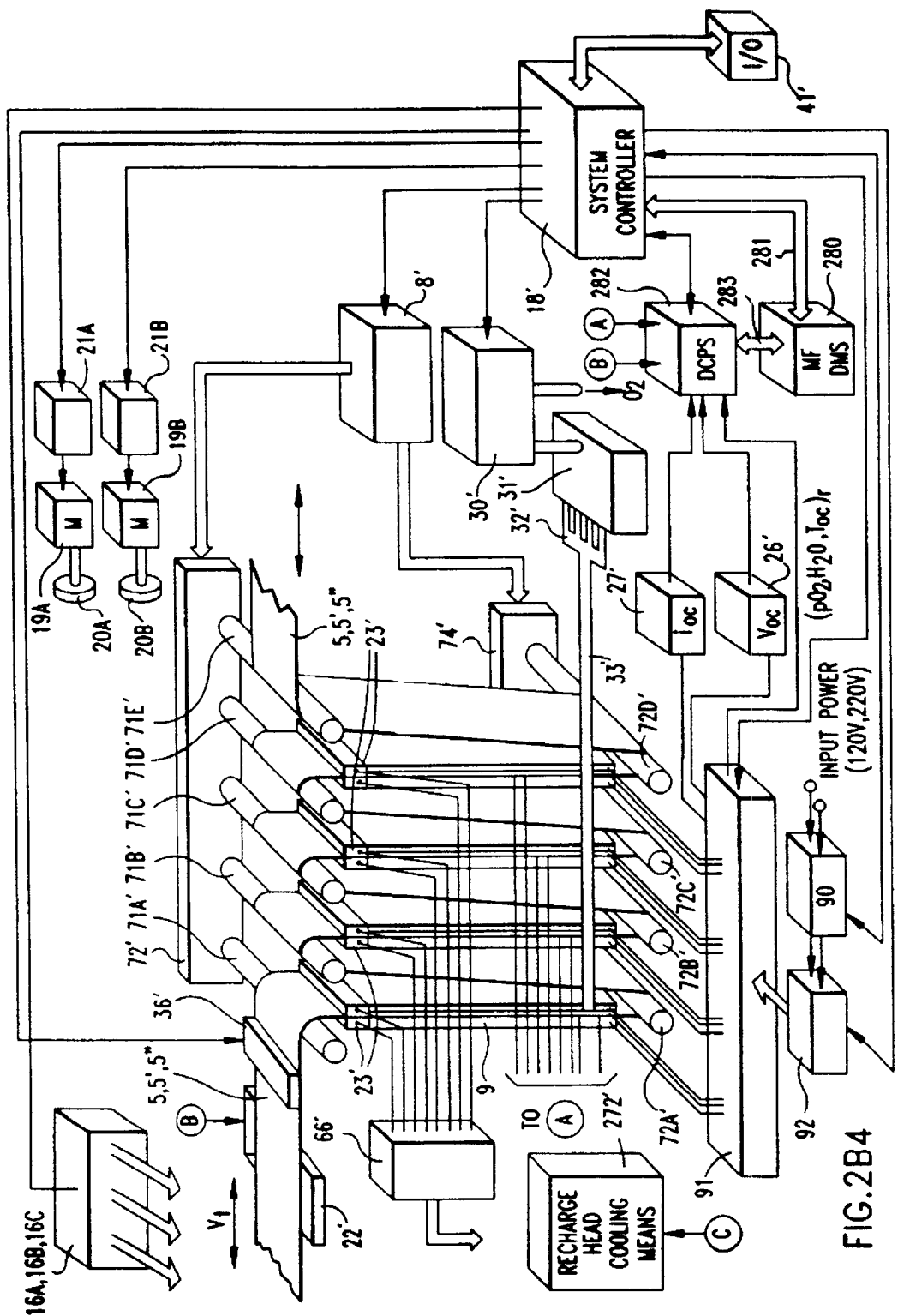
FIG. 2B4

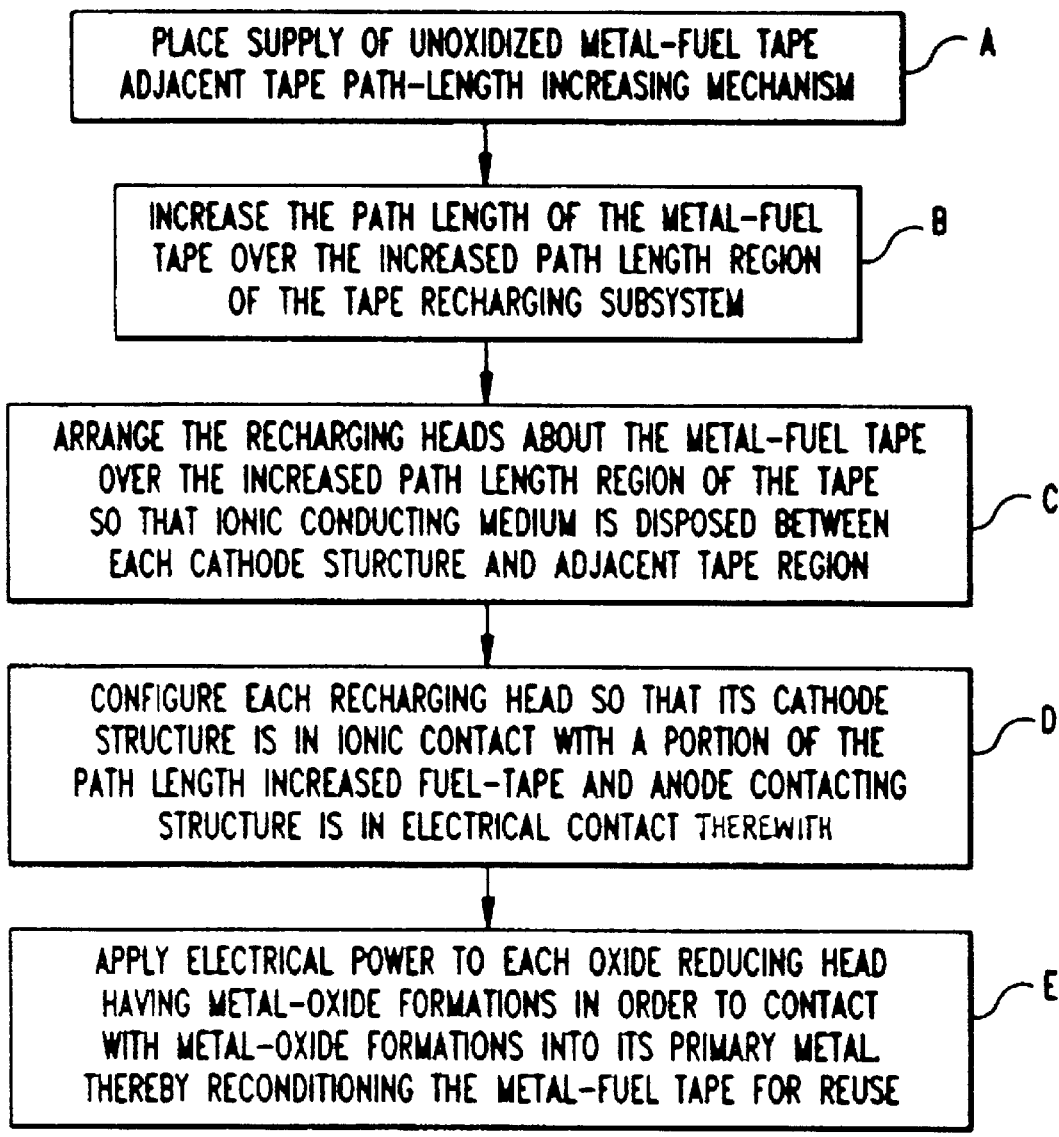
FIG.2B5

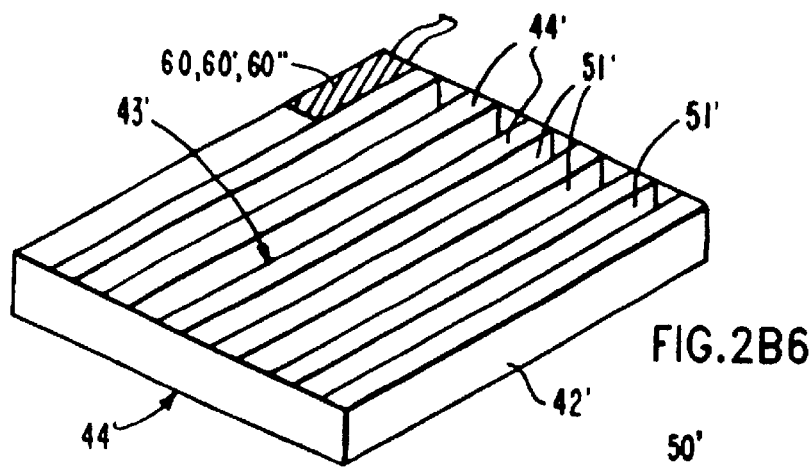
FIG.2B6
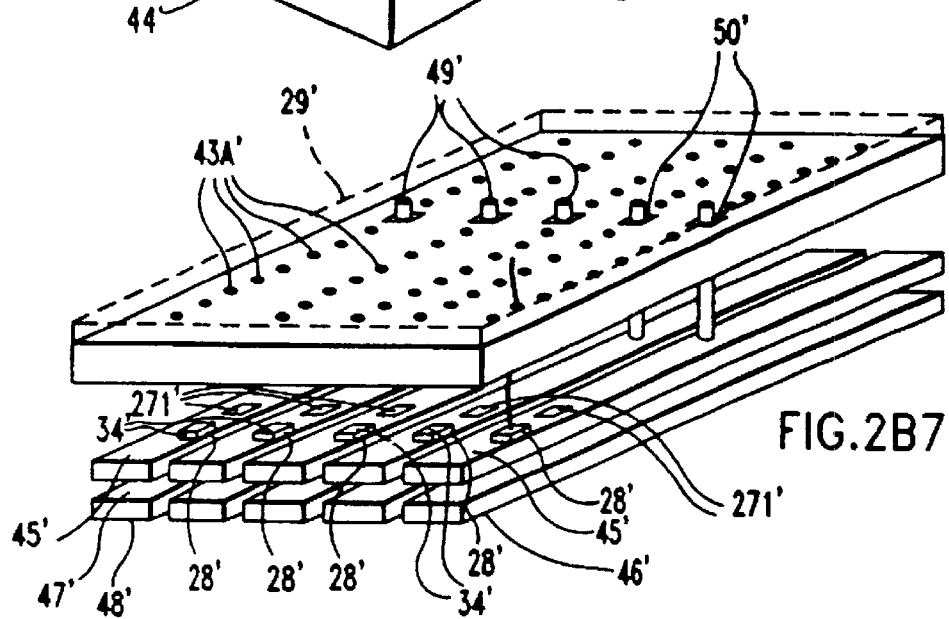
FIG.2B7
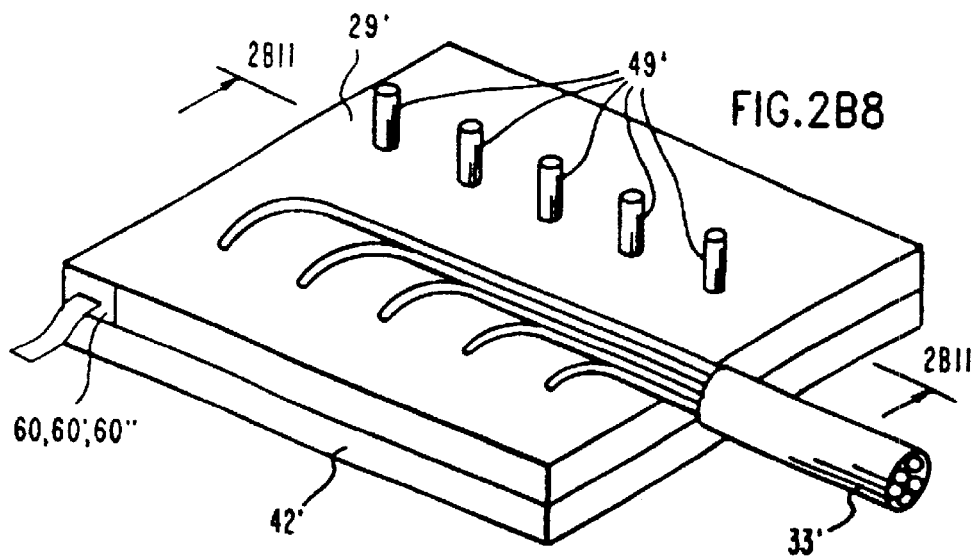
FIG.2B8

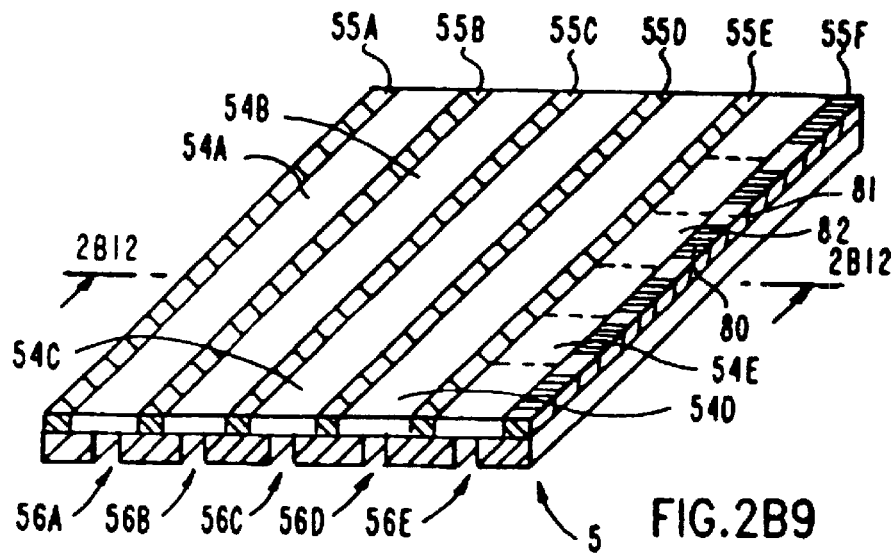
FIG.2B9
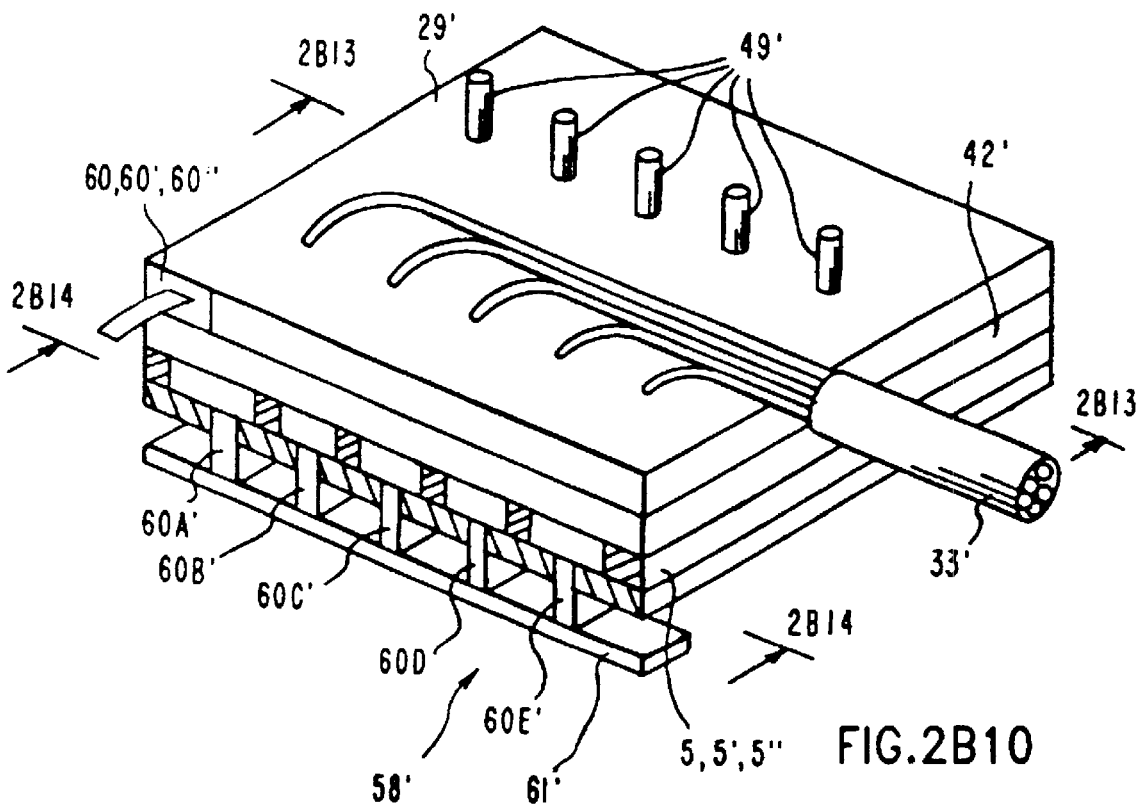
FIG.2B10

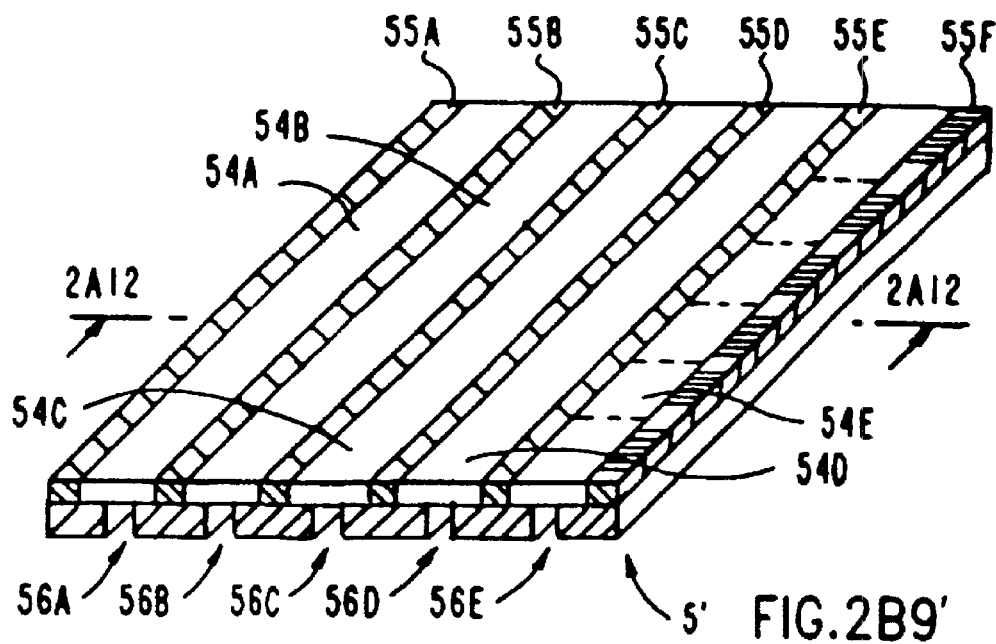
FIG. 2B9'
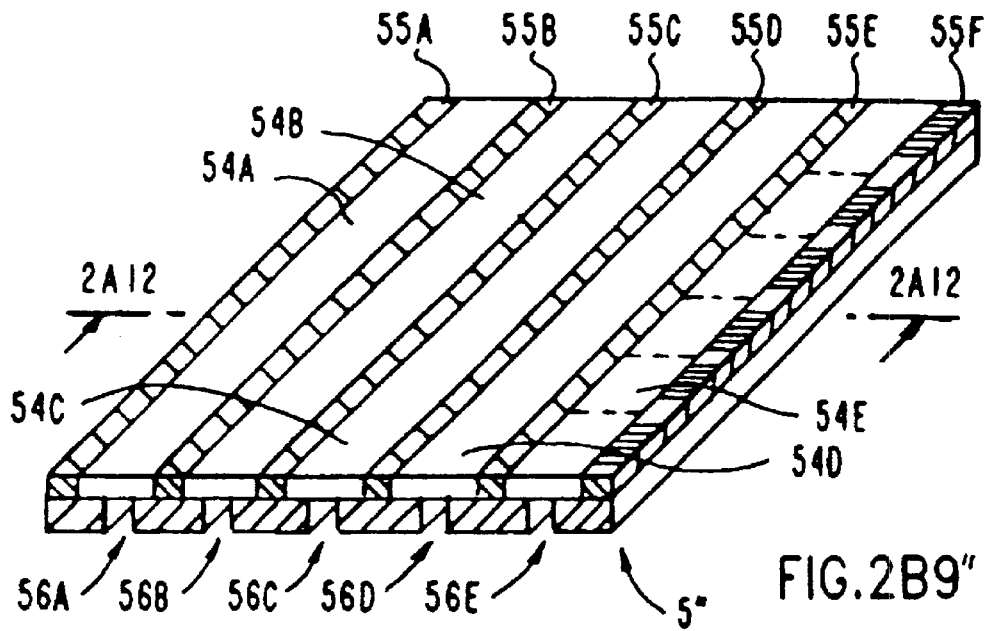
FIG. 2B9"

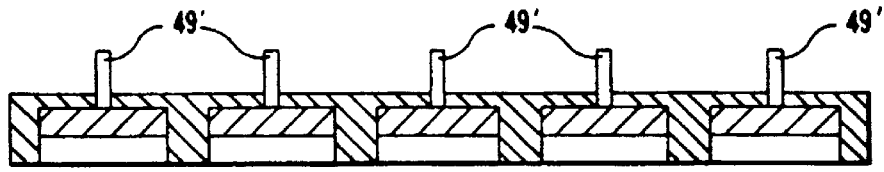
FIG.2B11
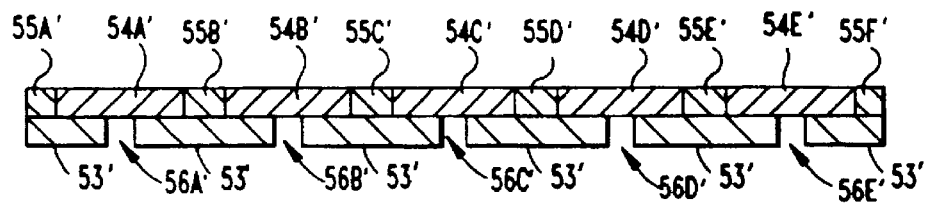
FIG.2B12
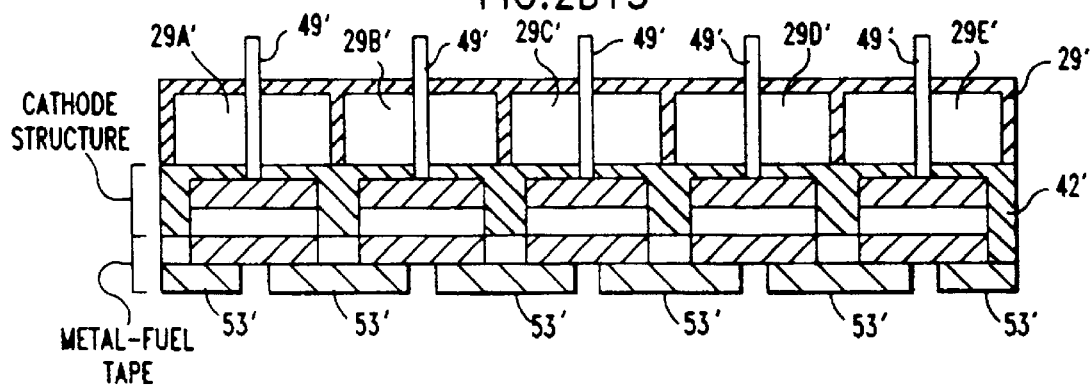
FIG.2B13
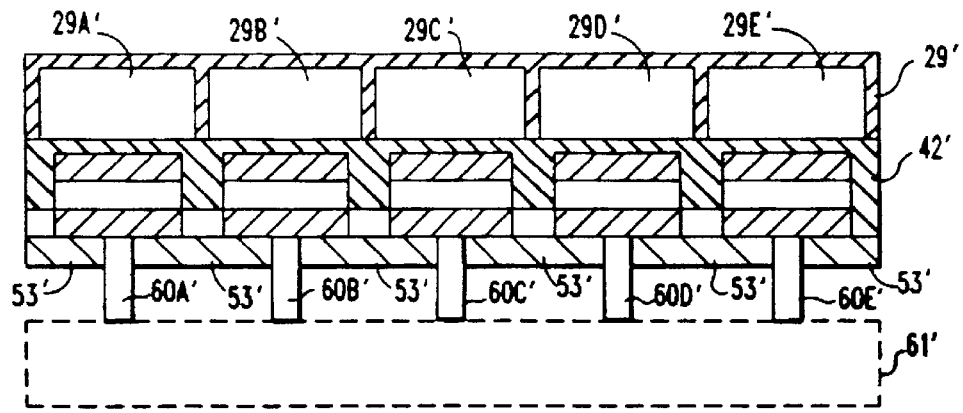
FIG.2B14

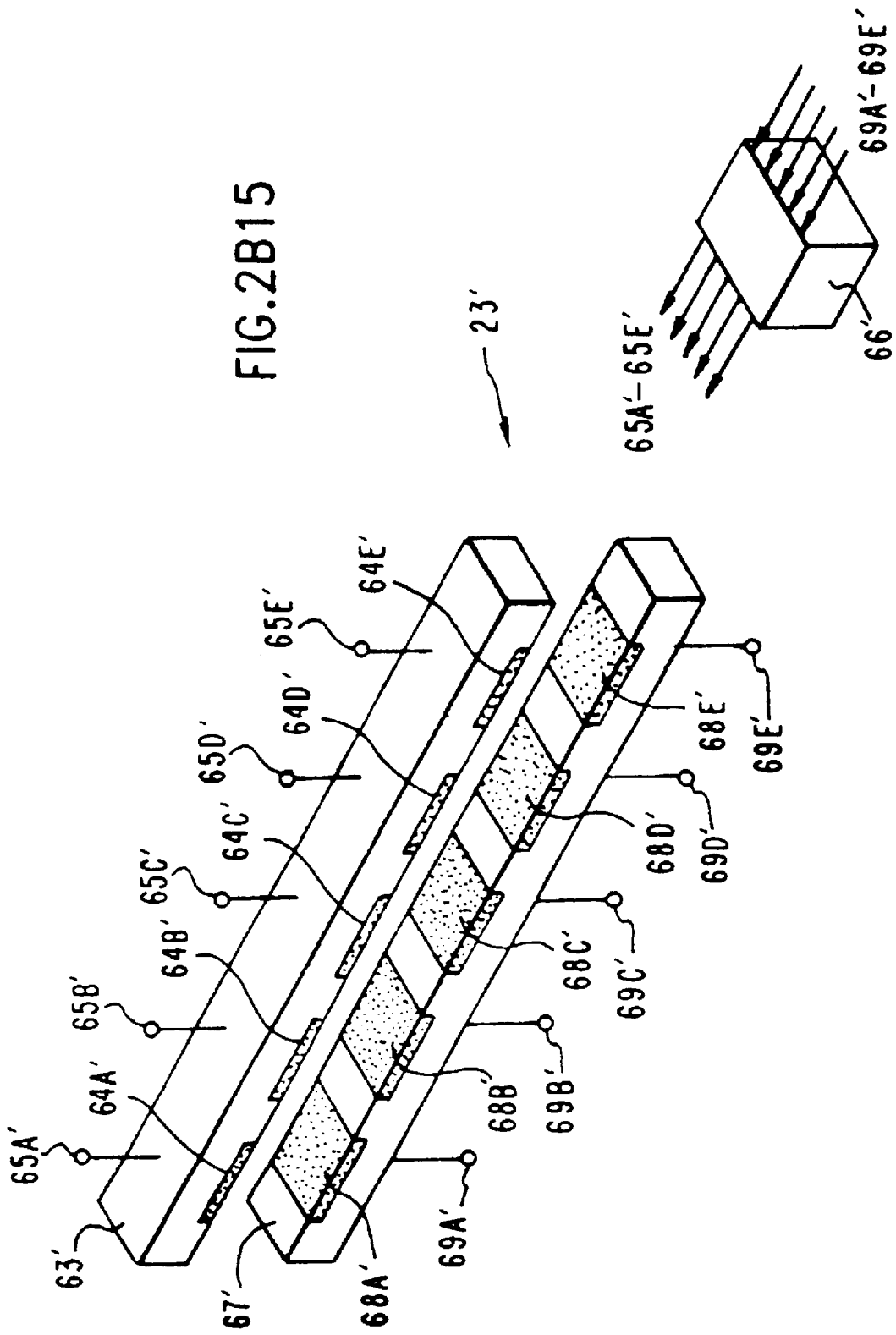
FIG.2B15

FIG.2B16
RECHARGE DATA STRUCTURE

| FUEL-TAPE CASSETTE NO.__ | METAL-FUEL TRACK NO.1 | | | | METAL-FUEL TRACK NO.2 | METAL-FUEL TRACK NO.3 | METAL-FUEL TRACK NO.4 | METAL-FUEL TRACK NO.5 |
|---|---|---|---|---|---|---|---|---|
| ZONE NO.1 | | $t_1$ | $t_2$ | $t_3$ ... $t_n$ | | | | |
| | $i_{oc}$ | | | ... | | | | |
| | $v_{oc}$ | | | ... | | | | |
| | $v_f$ | | | ... | | | | |
| | $pO_2$ | | | ... | | | | |
| | $H_2O\%$ | | | ... | | | | |
| | CM | | | ... | | | | |
| ZONE NO.2 | | | | | | | | |
| ZONE NO.3 | | | | | | | | |
| ZONE NO.4 | | | | | | | | |
| ZONE NO.5 | | | | | ... | ... | ... | ... |
| ZONE NO.n | | | | | | | | |

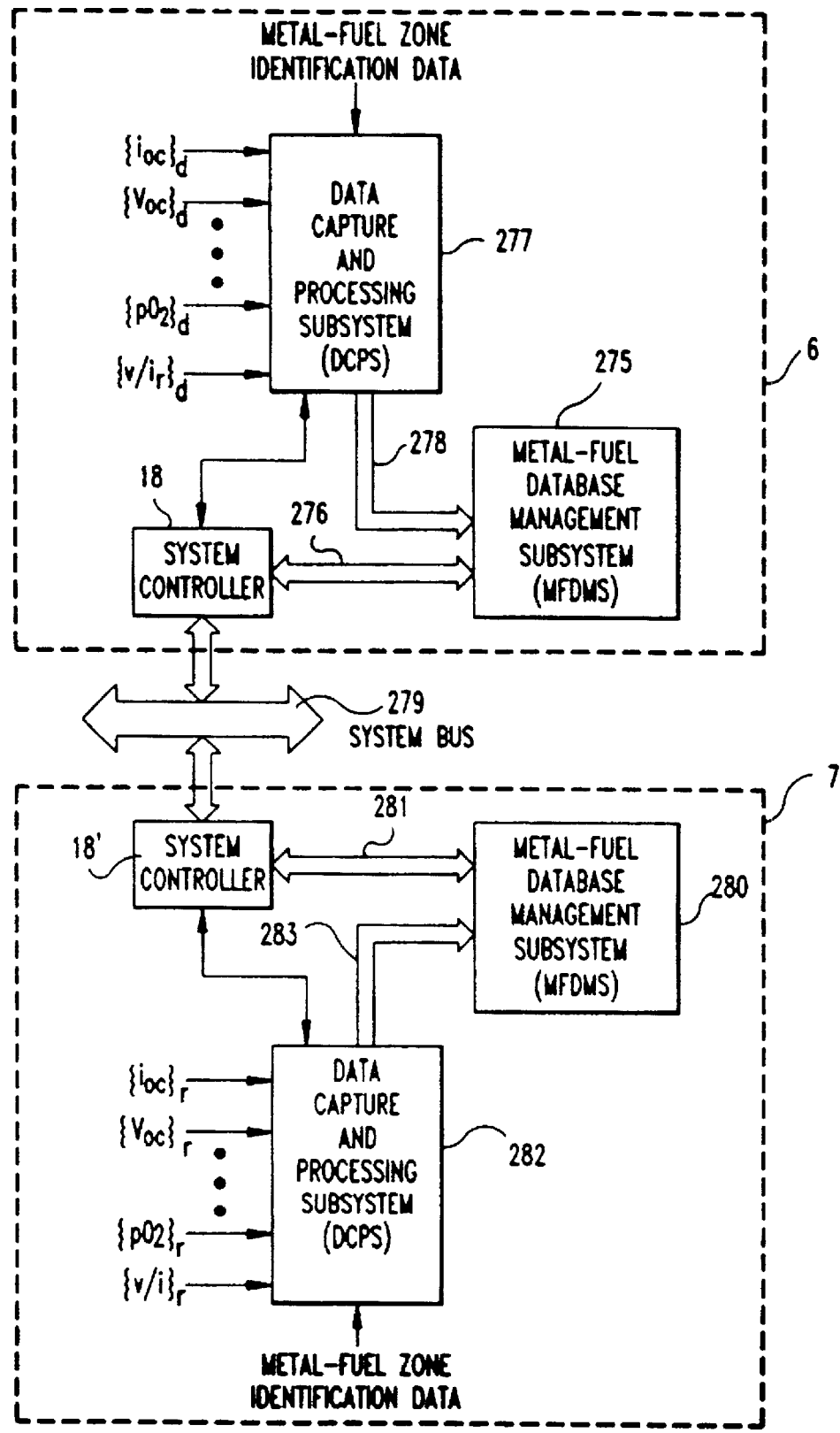
FIG.2B17

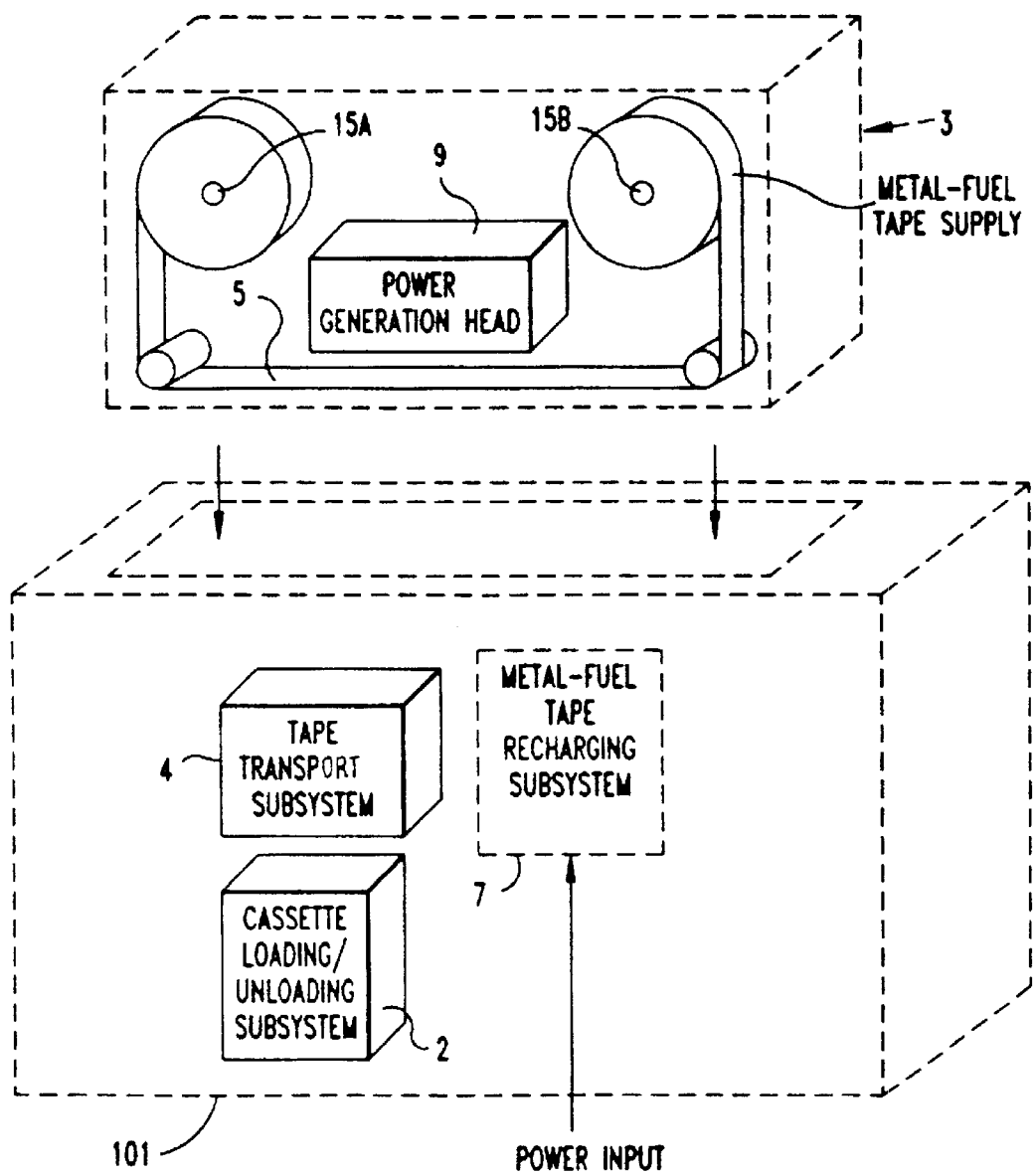

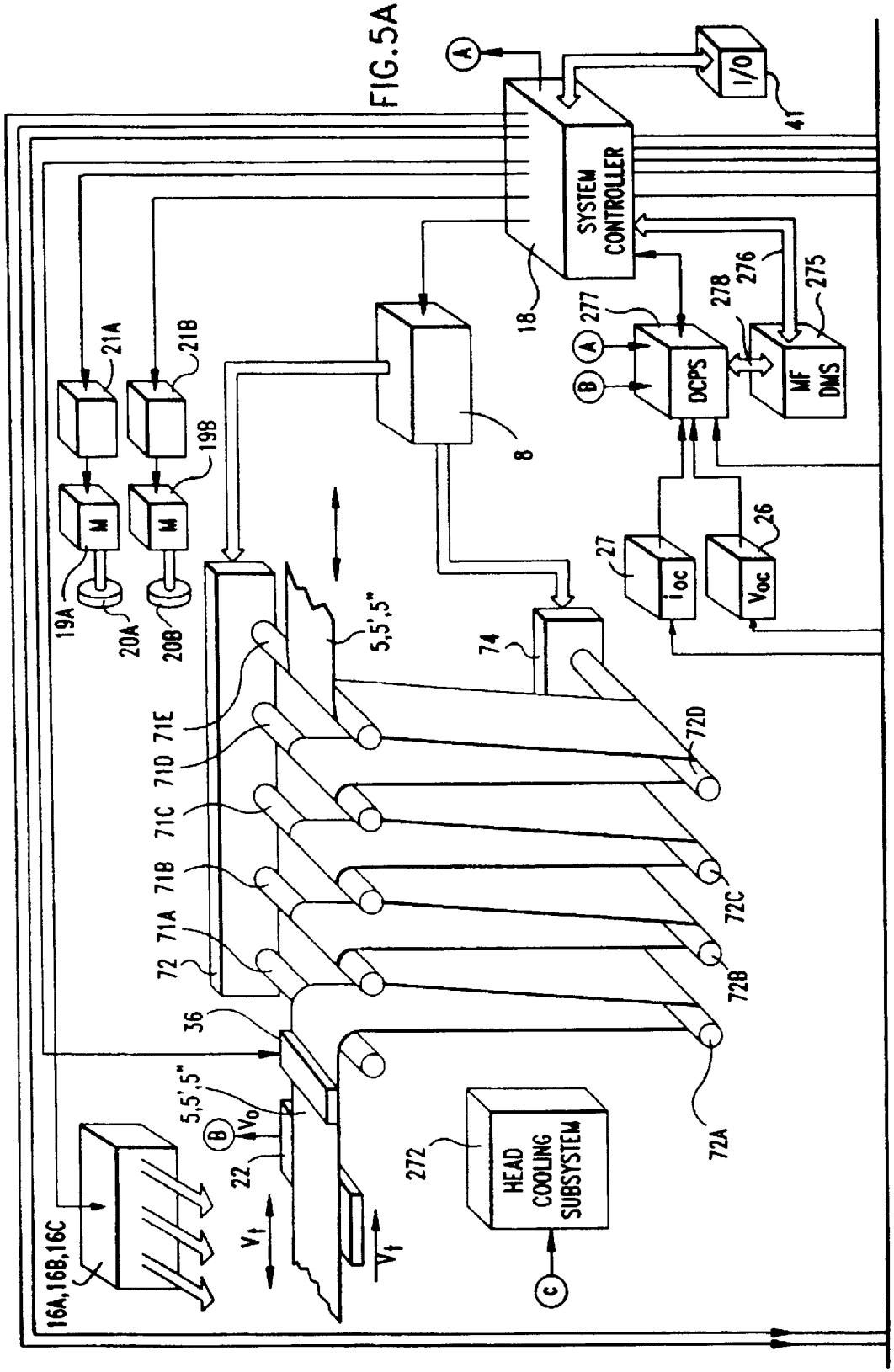
FIG.5A1(1)

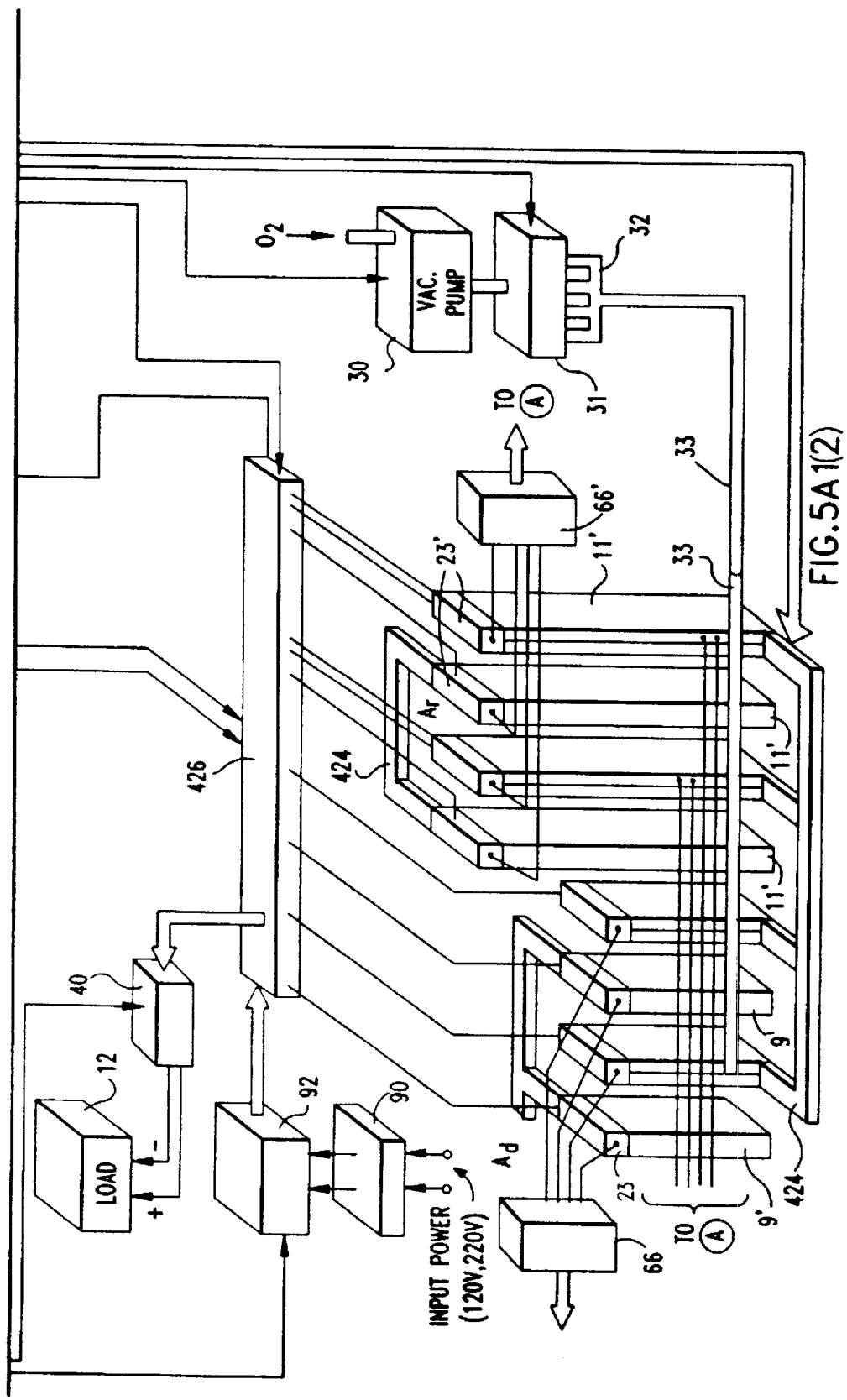
FIG.5A1(2)

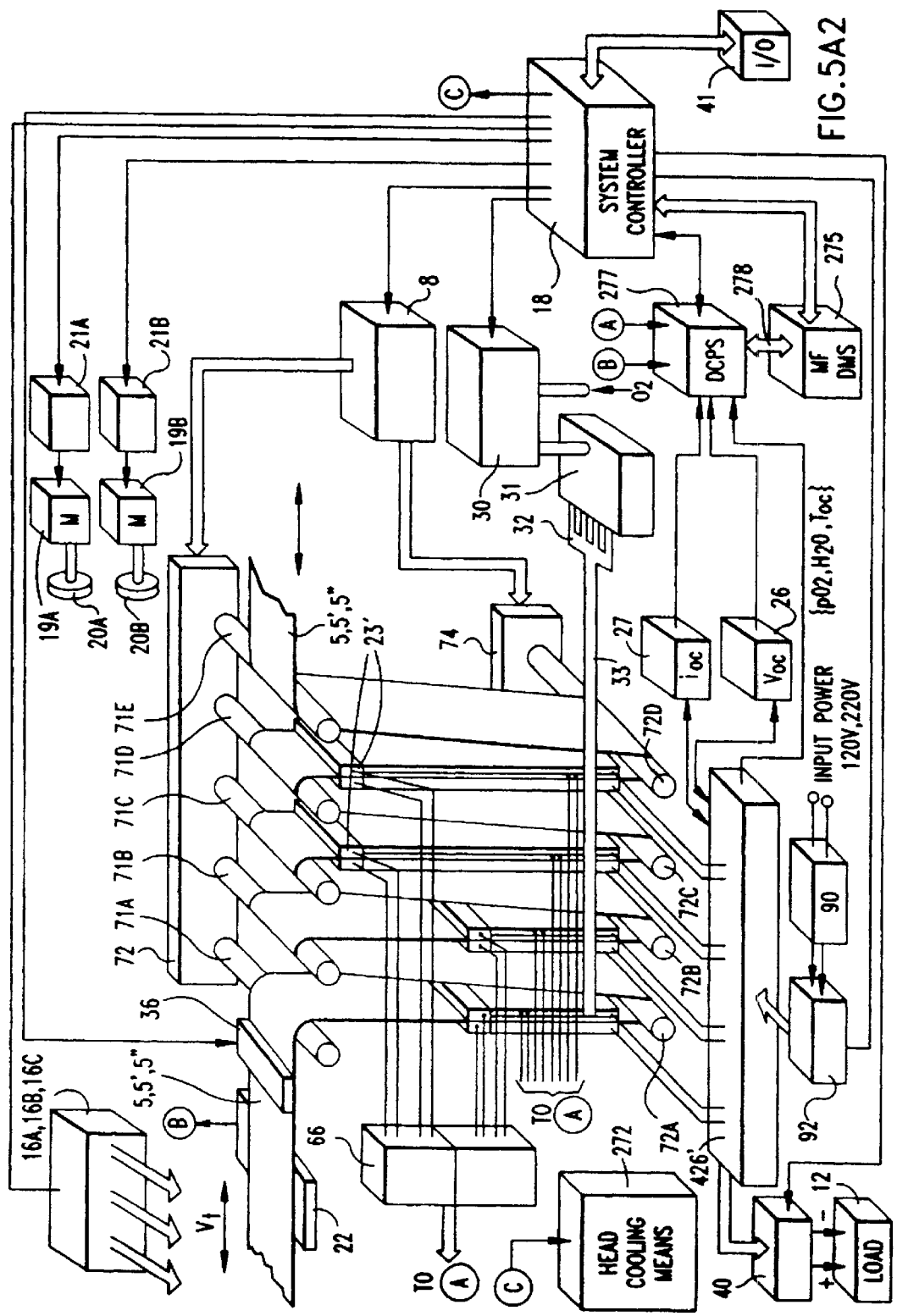
FIG.5A2

METAL-AIR FUEL CELL BATTERY SYSTEMS HAVING MECHANISM FOR EXTENDING THE PATH LENGTH OF METAL-FUEL TAPE DURING DISCHARGING AND RECHARGING MODES OF OPERATION

RELATED CASES

This is a Continuation of Application No. 09/112,596 entitled "Metal-Air Fuel Cell Battery System Having Mechanism For Extending The Path Length Of Metal-Fuel Tape During Discharging And Recharging Modes Of Operation" filed Jul. 9, 1998, now U.S. Pat. No. 6,228,519, which is Continuation-in-Part of: application Ser. No. 09/110,761 entitled "METAL-AIR FUEL CELL BATTERY SYSTEM EMPLOYING A PLURALITY OF MOVING CATHODE STRUCTURES FOR IMPROVED VOLUMETRIC POWER DENSITY" filed Jul. 3, 1998 by Sadeg M. Faris, Tsepin Tsai, Thomas J. Legbandt, Wayne Yao, and Muguo Chen now U.S. Pat. No. 6,335,111; application Ser. No. 09/110,762 entitled "METAL-AIR FUEL CELL BATTERY SYSTEM EMPLOYING METAL-FUEL TAPE AND LOW-FRICTION CATHODE STRUCTURES" filed Jul. 3, 1998 by Sadeg M. Faris, Tsepin Tsai, Thomas J, Legbandt, Wayne Yao, and Muguo Chen now U.S. Pat. No. 6,299,997; application Ser. No. 09/074,337 entitled "METAL-AIR FUEL-CELL BATTERY SYSTEM HAVING MEANS FOR MANAGING AVAILABILITY OF METAL-FUEL THEREWITHIN" filed May 7, 1998 now U.S. Pat No. 6,472,093; application Ser. No. 08/944,507 entitled "High-Power Density Metal-Air Fuel Cell Battery System" by Sadeg Faris, et al. filed Oct. 6, 1997, now U.S. Pat. No. 6,296,960, said application being assigned to Reveo, Inc. and incorporated herein by reference in its entirely.

BACKGROUND OF THE INVENTION

1. Field of the Invention

The present invention relates to improved methods and systems for optimally discharging metal-air fuel cell battery (FCB) systems and devices, as well as improved methods and systems for optimally recharging the same in a quick and efficient manner.

2. Description of the Prior Art

In U.S. Pat. No. 6,296,960, Applicant discloses several types of novel metal-air fuel cell battery (FCB) systems. During power generation, metal-fuel tape is transported over a stationary cathode, structure in the presence, of an ionically-conducting medium, such as an electrolyte-impregnated gel. In accordance with well known principles of electro-chemistry, the transported metal-fuel tape is oxidized as electrical power is produced from the system.

Metal-air FCB systems of the type disclosed in U.S. Pat. No. 6,296,960 have numerous advantages over prior art electro-chemical discharging devices. For example, one advantage is the generation of electrical power over a range of output voltage levels required be particular electrical load conditions. Another advantage is that oxidized metal-fuel tape can be repeatedly reconditioned (i.e. recharged) during batter, recharging cycles carried out during electrical discharging operation, as well as separately therefrom.

In U.S. Pat. No. 5,250,370, Applicant discloses an improved system and method for recharging oxidized metal-fuel tape used in prior art metal-air FCB systems. By integrating a recharging head within a metal-air FCB discharging system, this technological improvement theoretically enables quicker recharging of metal-fuel tape for reuse in FCB discharging operations. In practice, however, a number of important problems have remained unsolved which has hitherto rendered rechargeable FCB systems commercially unfeasible.

In particular, prior art FCB systems have required very large volumes of physical space to accommodate enlarged discharging electrodes, as well as enlarged recharging electrodes. In practice, however, this is often not possible, or practical. Consequently, it has not been possible to optimally discharge and recharge metal-fuel tape using prior art FCB systems and methodologies.

Thus there is a great need in the art for an improved method and apparatus for electrochemically discharging and recharging metal-fuel tape in a manner which overcomes the limitations of prior art technologies.

OBJECTS AND SUMMARY OF THE INVENTION

Accordingly, a primary object of the present invention is to provide an improved method of and apparatus for electrochemically discharging and/or recharging metal-air fuel cell batteries (FCB) in a manner which avoids the shortcomings and drawbacks of prior art technologies.

Another object of the present invention is to provide such an apparatus in the form of a Metal-Fuel. Tape Discharging Subsystem, wherein the path-length of oxidized metal-fuel tape is substantially extended in a folded manner during discharging operations in order that a supply of oxidized metal-fuel tape contained within a cassette device or on a supply reel can be rapidly discharged in order to satisfy dynamic loading conditions.

Another object of the present invention is to provide such a system, wherein the recharging head assembly comprises a plurality of cathode and anode structures which are selectively arranged about the extended path-length of oxidized metal-fuel tape during discharging operations.

Another object of the present invention is to provide such a system, wherein the oxidized metal-fuel tape to be discharged comprises multiple metal-fuel tracks for use in generating different output voltages from a metal-air FCB system.

Another object of the present invention is to provide such a system, wherein a discharging power regulating subsystem is provided for regulating operating parameters during electro-chemical oxidation of metal-oxide during discharging operations.

Another object of the present invention is to provide such an apparatus in the form of a Metal-Fuel Tape Recharging Subsystem, wherein the path-length of oxidized metal-fuel tape is substantially extended during recharging operations in order that a supply of oxidized metal-fuel tape contained within a cassette device or on a supply reel can be rapidly recharged.

Another object of the present invention is to provide such a system, wherein the recharging head assembly comprises a plurality of cathode and anode structures which are selectively arranged about the extended path-length of oxidized metal-fuel tape during recharging operations.

Another object of the present invention is to provide such a system, wherein the oxidized metal-fuel tape to be recharged comprises multiple metal-fuel tracks for use in generating different output voltages from a metal-air FCB system.

Another object of the present invention is to provide such a system, wherein a recharging power regulating subsystem is provided for regulating operating parameters during electro-chemical reduction of metal-oxide during recharging operations.

Another object of the present invention is to provide such apparatus in the form of a hybrid-type Metal-Fuel Tape Discharging/Recharging Subsystem, wherein the path-length of oxidized metal-fuel tape is substantially extended during discharging and recharging operations in order that a supply of oxidized metal-fuel tape contained within a cassette device or on a supply reel can be rapidly discharged and recharged accordingly.

Another object of the present invention is to provide such a hybrid-type system, wherein the discharging/recharging head assembly comprises a plurality of cathode and anode structures which are selectively arranged about the extended path-length of oxidized metal-fuel tape during discharging and recharging operations.

Another object of the present invention is to provide such a hybrid-type system, wherein the oxidized metal-fuel tape to be discharged comprises multiple metal-fuel tracks for use in generating different output voltages from a metal-air FCB system.

Another object of the present invention is to provide such a hybrid-type system, wherein a discharging power regulating subsystem is provided for regulating operating parameters during electro-chemical oxidation of metal-oxide during discharging operations.

These and other objects of the present invention will become apparent hereinafter.

BRIEF DESCRIPTION OF THE DRAWINGS

For a more complete understanding of the Objects of the Present Invention, the following detailed Description of the Illustrative Embodiments Of the Present Invention should be read in conjunction with the accompanying Drawings, wherein:

FIG. 2A1 is a generalized schematic representation of the Metal-Fuel Tape Discharging Subsystem of FIG. 1. wherein the tape path-length extension mechanism associated therewith is shown in its non-extended configuration;

FIG. 2A2 is a generalized schematic representation of the Metal-Fuel Tape Discharging Subsystem of FIG. 1, wherein the tape path-length extension mechanism associated therewith is shown in its extended configuration and the assembly of discharging heads thereof configured about the extended path of metal-fuel tape for generating electrical power across an electrical load connected to the metal-air FCB system;

FIGS. 2A31 and 2A32 is a generalized schematic representation of the Metal-Fuel Tape Discharging Subsystem shown in FIG. 1, wherein the subcomponents thereof are shown in greater detail, and the discharging heads thereof withdrawn from the extended path of unoxidized metal-fuel tape;

FIG. 2A4 is a schematic representation of the Metal-Fuel Tape Discharging Subsystem shown in FIG. 2A3, wherein the tape path-length extension mechanism is arranged in its extended configuration with its four independent discharging heads arranged about the extended path of unoxidized metal-fuel tape, and metal-fuel zone (MFZ) identification data is generated from each discharging head during tape discharging operations so that the system controller can record, in memory, "discharge parameters" of the Metal-Fuel Tape Discharging Subsystem during discharging each metal-fuel zone identified along the metal-fuel tape being transported through the discharge head assembly;

FIG. 2A5 is a high-level flow chart setting forth the basic steps involved during the discharging of metal-fuel tape (i.e. electrical power generation therefrom) when using the Metal-Fuel Tape Discharging Subsystem shown in FIGS. 2A31,2A32 and 2A4;

FIG. 2A6 is a perspective view of the cathode support structure employed in each discharging head of the Metal-Fuel Tape Discharging Subsystem shown in FIGS. 2A31, 2A32 and 2A4, showing five parallel channels within which electrically-conductive cathode strips and ionically-conducting electrolyte-impregnated strips are securely supported in its assembled state;

FIG. 2A7 is a perspective, exploded view of cathode and electrolyte impregnated strips and oxygen pressure (pO2) sensors installed within the support channels of the cathode support structure shown in FIG. 2A6;

FIG. 2A8 is a perspective view of the cathode structure and oxygen-injecting chamber of the first illustrative embodiment of the present invention, shown in its fully assembled state and adapted for use in the discharging head assembly shown in FIGS. 2A31,2A32 and 2A4;

FIG. 2A9 is a perspective view of a section of unoxidized metal-fuel tape for use in the Metal-Fuel Tape Discharging Subsystem shown in FIGS. 1, 2A31,2A32 and 2A4, showing (i) its parallel metal-fuel strips spatially registerable with the cathode strips in the cathode structure of the discharging head partially shown in FIG. 2A8, and (ii) a graphically-encoded data track containing sequences of code symbols along the length of metal-fuel tape for identifying each metal-fuel zone therealong and facilitating, during discharging operations, (i) reading (or accessing), from data storage memory, recharge parameters and/or metal-fuel indicative data correlated to metal-fuel identification data prerecorded during previous recharging and/or discharging operations, and (ii) recording, in data storage memory, sensed discharge parameters and computed metal-oxide indicative data correlated to metal-fuel zone identification data read during the discharging operation;

FIG. 2A9' is a perspective view of a section of unoxidized metal-fuel tape for use in the Metal-Fuel Tape Discharging Subsystem shown in FIGS. 1, 2A31,2A32 and 2A4, showing (i) parallel metal-fuel strips spatially registerable with the cathode strips in the cathode structure of the discharging head partially shown in FIG. 2A8, and (ii) a magnetically-encoded data track embodying sequences of code symbols along the length of metal-fuel tape for identifying each metal-fuel zone therealong and facilitating, during discharging operations, (i) reading (or accessing), from data storage memory, recharge parameters and/or metal-fuel indicative data correlated to metal-fuel identification data prerecorded during previous recharging and/or discharging operations, and (ii) recording, in data storage memory, sensed discharge parameters and computed metal-oxide indicative data correlated to metal-fuel zone identification data read during the discharging operation;

FIG. 2A9″ is a perspective view of a section of unoxidized metal-fuel tape for use in the Metal-Fuel Tape Discharging Subsystem shown in FIGS. 1, 2A31,2A32 and 2A4, showing (i) parallel metal-fuel strips spatially registerable with the cathode strips in the cathode structure of the discharging head partially shown in FIG. 2A8, and (ii) an optically-encoded data track containing sequences of light-transmission aperture-type code symbols along the length of metal-fuel tape for identifying each metal-fuel zone therealong and facilitating, during discharging operations, (i) reading (or accessing), from data storage memory, recharge parameters and/or metal-fuel indicative data correlated to metal-fuel identification data prerecorded during previous recharging and/or discharging operations, and (ii) recording, in data storage memory, sensed discharge parameters and computed metal-oxide indicative data correlated to metal-fuel zone identification data read during the recharging operation;

FIG. 2A10 is a perspective view of an assembled discharging head within the Metal-Fuel Tape Discharging Subsystem shown in FIGS. 2A31,2A32 and 2A4, wherein during the Discharging Mode thereof, metal-fuel tape is transported past the air-pervious cathode structures shown in FIG. 2A8, and multiple anode-contacting elements establishing electrical contact with the metal-fuel strips of metal-fuel tape transported through the discharging head;

FIG. 2A11 is a cross-sectional view of the assembled cathode structure, taken along line 2A11—2A11 of FIG. 2A8, showing its cross-sectional details;

FIG. 2A12 is a cross-sectional view of the metal-fuel tape shown in FIG. 2A9, taken along line 2A12—2A12 thereof, showing its cross-sectional details;

FIG. 2A13 is a cross-sectional view of the cathode structure and oxygen-injecting chamber of the discharging head shown in FIG. 2A10, taken along line 2A13—2A13 therein;

FIG. 2A14 is a cross-sectional view of the discharging head shown in FIG. 2A10, taken along line 2A14—2A14 therein, showing its cross-sectional details;

FIG. 2A15 is a perspective view of the multi-track metal-oxide sensing head assembly employed in the Metal-Fuel Tape Discharging Subsystem shown in FIGS. 2A1 through 2A4, particularly adapted for real-time sensing (i.e. detecting) metal-oxide formations alone each metal-fuel zone to assess the presence or absence of metal-fuel therelong during discharging operations;

FIG. 2A16 is a schematic representation of the information structure maintained within the Metal-Fuel Tape Discharging Subsystem of FIG. 1, comprising a set of information fields for recording discharge parameters, and metal-oxide and metal-fuel indicative data for each metal-fuel zone identified (i.e. addressed) along a discharged section of metal-fuel tape during the discharging mode of operation;

FIG. 2B1 is a generalized schematic representation of the Metal-Fuel Tape Recharging Subsystem of FIG. 1, wherein the tape path-length extension mechanism employed therein is shown in its non-extended configuration;

FIG. 2B2 is a generalized schematic representation of the Metal-Fuel Tape Recharging Subsystem of FIG. 1, wherein the tape path-length extension mechanism employed therein is shown in its extended configuration and the recharging heads thereof are configured about the extended path of oxidized metal-fuel tape for recharging the same;

FIGS. 2B31,2B32 is a generalized schematic representation of the Metal-Fuel Tape Recharging Subsystem shown in FIG. 1, wherein the subcomponents thereof are shown in greater detail, and the recharging heads thereof withdrawn from the extended path of oxidized metal-fuel tape;

FIG. 2B4 is a schematic representation of the Metal-Fuel Tape Recharging Subsystem shown in FIGS. 2A31,2A32 wherein the subcomponents thereof are shown in greater detail, the tape path-length extension mechanism is arranged in its extended configuration with four independent recharging heads arranged about the extended path of oxidized metal-fuel tape, and metal-fuel zone identification (MFZID) data is generated from the recharging heads during tape recharging operations so that the system controller can access previously recorded discharge parameters and metal-fuel indicative data from system memory, correlated to each metal-fuel zone along the metal-fuel tape, thereby enabling optimal setting of recharge parameters during tape recharging operations;

FIG. 2B5 is a high-level flow chart setting forth the basic steps involved during the recharging of oxidized metal-fuel tape when using the Metal-Fuel Tape Recharging Subsystem shown in FIGS. 2B31,2B32 through 2B4;

FIG. 2B6 is a perspective view of the cathode support structure employed in each recharging head of the Metal-Fuel Tape Recharging Subsystem shown in FIGS. 2B31, 2B32 and 2B4, and comprises five parallel channels within which electrically-conductive cathode strips and ionically-conducting electrolyte-impregnated strips are securely supported;

FIG. 2B7 is a perspective, exploded view of cathode and electrolyte-impregnated strips and oxygen pressure (pO2) sensors installed within the support channels of the cathode support structure shown in FIG. 2B8;

FIG. 2B8 is a perspective view of the cathode structure and oxygen-evacuation chamber of the first illustrative embodiment of the present invention, shown in its fully assembled state and adapted for use in the recharging heads shown in FIGS. 2B31,2B32 and 2B4:

FIG. 2B9 is a perspective view of a section of oxidized metal-fuel tape for recharging in the Metal-Fuel Tape Recharging Subsystem shown in FIGS. 2B31,2B32 and 4B4, and comprising parallel metal-fuel strips spatially registerable with the cathode strips in the cathode structure (i.e. recharging head) of FIG. 2B8, and graphically encoded data track containing sequences of bar code symbols along the length of metal-fuel tape for identifying each metal-fuel zone along the reel of metal-fuel tape, and facilitating, during recharging operations, (i) reading (or accessing), from data storage memory, discharge parameters and/or metal-oxide indicative data correlated to metal-fuel identification data prerecorded during previous discharging and/or recharging operations, and (ii) recording, in data storage memory, sensed recharge parameters and computed metal-fuel indicative data correlated to metal-fuel zone identification data read during the recharging operation;

FIG. 2B9' is a perspective view of a section of oxidized metal-fuel tape for use in the Metal-Fuel Tape Recharging Subsystem shown in FIGS. 1, 2B31,2B32 and 2B4, showing (i) parallel metal-fuel strips spatially registerable with the cathode strips in the cathode structure of the recharging head partially shown in FIG. 2B8, and (ii) a magnetically-encoded data track embodying sequences of digital words along the length thereof identifying each metal-fuel zone therealong, and facilitating, during recharging operations, (i) reading (or accessing), from data storage memory, discharge parameters and/or metal-oxide indicative data correlated to metal-fuel identification data prerecorded during previous discharging and/or recharging operations, and (ii) recording, in data storage memory, sensed recharge parameters and computed metal-fuel indicative data correlated to metal-fuel zone identification data read during the recharging operation:

FIG. 2B9" is a perspective view of a section of reoxidized metal-fuel tape for use in the Metal-Fuel Tape Recharging Subsystem shown in FIGS. 1, 2B31,2B32 and 2B4, showing (i) parallel metal-fuel strips spatially registerable with the cathode strips in the cathode structure of the recharging head partially shown in FIG. 2B8, and (ii) an optically-encoded data track containing sequences of light-transmission aperture-type code symbols along the length of metal-fuel tape for identifying each metal-fuel zone therealong, and facilitating, during recharging operations, (i) reading (or accessing), from data storage memory, discharge parameters and/or metal-oxide indicative data correlated to metal-fuel identification data prerecorded during previous discharging and/or recharging operations, and (ii) recording, in data storage memory, sensed recharge parameters and computed metal-fuel indicative data correlated to metal-fuel zone identification data read during the recharging operation;

FIG. 2B10 is a perspective view of a recharging head within the Metal-Fuel Tape Recharging Subsystem shown in FIGS. 2B31,2B32 and 2B4, wherein during the Recharging Mode thereof, metal-fuel tape is transported past the air-pervious cathode structure shown in FIG. 2B8, and five anode-contacting elements establish electrical contact with the metal-fuel strips of the transported metal-fuel tape;

FIG. 2B11 is a cross-sectional view of the cathode support structure head in the Metal-Fuel Tape Recharging Subsystem hereof, taken along line 2B11—2B11 of FIG. 2B8, showing a plurality of cathode and electrolyte-impregnated strips supported therein, FIG. 2B12 is a cross-sectional view of the metal-fuel tape shown in FIG. 2B9, taken along line 2B12—2B12 thereof;

FIG. 2B13 is a cross-sectional view of the cathode structure of the recharging head shown in FIG. 2B10, taken along line 2B13—2B13 therein;

FIG. 2B14 is a cross-sectional view of the recharging head assembly shown in FIG. 2B10, taken along line 2B14—2B14 therein:

FIG. 2B15 is a perspective view of the multi-track metal-oxide sensing head employed in the Metal-Fuel Tape Recharging Subsystem shown in FIGS. 2B3 and 2B4, particularly adapted for sensing which metal-fuel tracks have been discharged and thus require recharging by the subsystem;

FIG. 2B16 is a schematic representation of the information structure maintained within the Metal-Fuel Tape Recharging Subsystem of FIG. 1, comprising a set of information fields for recording recharge parameters and metal-fuel and metal-oxide indicative data for each metal-fuel zone identified (i.e. addressed) along a section of metal-fuel tape during the recharging mode of operation;

FIG. 2B17 is a schematic representation of the FCB system of FIG. 1 showing a number of subsystems which enable, during the recharging mode of operation, (a)(i) reading metal-fuel zone identification data from transported metal-fuel tape, (a)(ii) recording in memory, sensed recharge parameters and computed metal-fuel indicative data derived therefrom, and (a)(iii) reading (accessing) from memory, discharge parameters and computed metal-oxide indicative data recorded during the previous discharging and/or recharging mode of operation through which the identified metal-fuel zone has been processed, and during the discharging mode of operation, (b)(i) reading metal-fuel zone identification data from transported metal-fuel tape. (b)(,ii) recording in memory, sensed discharge parameters and computed metal-oxide indicative data derived therefrom and (b)(iii) reading (accessing) from memory, recharge parameters and computed metal-fuel indicative data recorded during the previous recharging and/or discharging operations through which the identified metal-fuel zone has been subjected;

FIG. 3B is a schematic block diagram of a third illustrative embodiment of the metal-air FCB system of the present invention shown realized as an external stand-alone unit, into which a cassette-type device containing a supply of oxidized metal-fuel tape and at least a portion of the metal-fuel tape discharging subsystem (e.g. the discharging head) can be received and quickly recharged for reuse in generating electrical power;

FIG. 4 is a is a schematic block diagram of a sixth illustrative embodiment of the metal-air FCB system of the present invention, wherein metal-fuel tape discharging and recharging functions are realized in a single hybrid-type Metal-Fuel Tape Discharging/Recharging Subsystem, wherein the tape path-length extension mechanism employed therein extends metal-fuel tape to be recharged over a path which is substantially greater than the path maintained for metal-fuel tape to be discharaged;

FIGS. 5A1(1) and 5A1(2) set forth is a schematic representation of the hybrid Metal-Fuel Tape Discharging/Recharging Subsystem shown in FIG. 4, wherein the configured discharging heads and recharging heads thereof are shown withdrawn from the extended path of metal-fuel tape:

FIG. 5A2 is a schematic representation of the hybrid Metal-Fuel Tape Discharging/Recharging Subsystem shown in FIG. 4, wherein the configured discharging heads and recharging heads are arranged about the extended path-length of metal-fuel tape to enable simultaneous discharging and recharging operations to be carried out in an optimal manner.

DETAILED DESCRIPTION OF THE ILLUSTRATIVE EMBODIMENTS OF THE PRESENT INVENTION

Figure 1:
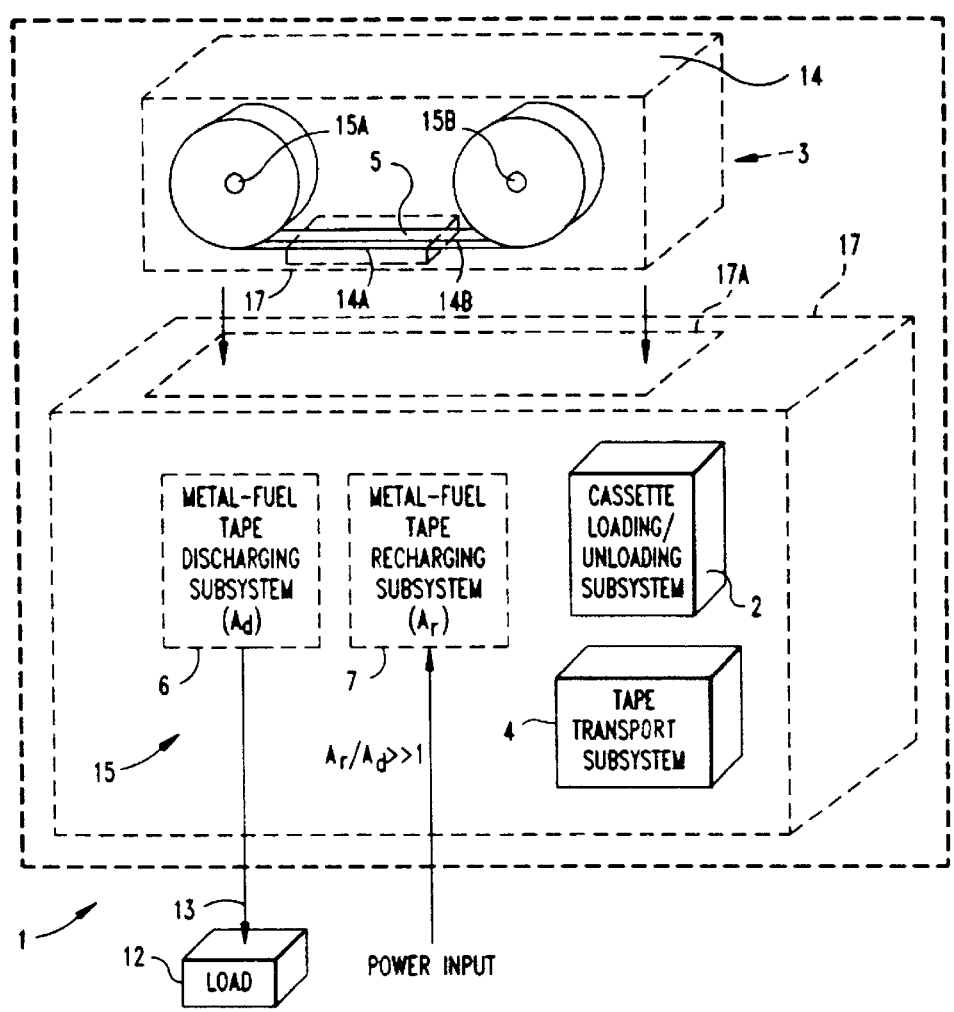
FIG. 1 is a schematic block diagram of a first illustrative embodiment of the metal-air FCB system of the present invention, wherein a Metal-Fuel Tape Discharging Subsystem and a Metal-Fuel Tape Recharging Subsystem are integrated within a single, stand-alone rechargeable power generation unit, and the tape path-length extension mechanism employed in the Metal-Fuel Tape Recharging Subsystem extends oxidized metal-fuel tape over a path-length which is substantially greater than the path-length maintained by the tape path-length extension mechanism in the Metal-Fuel Tape Discharging Subsystem (i.e. $A_{Recharge} >> A_{Discharge}$)

Referring now to the figures in the accompanying Drawings, the illustrative embodiments of the present invention will now be described in great technical detail, wherein like elements are indicated by like reference numbers.

In general, many of the rechargeable metal-air FCB-based systems according to the present invention can be decomposed into a number of subsystems including, for example: a Metal-Fuel Transport Subsystem; a Metal-Fuel Discharging Subsystem: and a Metal-Fuel Recharging Subsystem. The function of the Metal-Fuel Transport Subsystem is to transport metal-fuel material, in the form of tape, cards, sheets, cylinders and the like, to the Metal-Fuel Discharge Subsystem, or the Metal-Fuel Recharge Subsystem, depending on the mode of the system selected. When transported to or through the Metal-Fuel Discharge Subsystem, the metal-fuel is discharged by (i.e. electro-chemically reaction with) one or more discharging heads in order produce electrical power across an electrical load connected to the subsystem while $H_2O$ and $O_2$ are consumed at the cathode-electrolyte interface during the electro-chemical reaction. When transported to or through the Metal-Fuel Recharging Subsystem, discharged metal-fuel is recharged by one or more recharging heads in order to convert the oxidized metal-fuel material into its source metal material suitable for reuse in power discharging operations, while $O_2$ is released at the cathode-electrolyte interface during the electro-chemical reaction. The electro-chemistry upon which such discharging and recharging operations are based is described in Applicant's, U.S. Pat. No. 6,296,960, U.S. Pat. No. 5,250,370, and other applied science publications well known in the art. These applied science principles will be briefly summarized below.

During discharging operations within metal-air FCB systems, metal-fuel such as zinc, aluminum, magnesium or beryllium is employed as an electrically-conductive anode of a particular degree of porosity (e.g. 50%) which is brought in "ionic-contact with an electrically-conductive oxygen-pervious cathode structure to a particular degree of porosity, by way of an ionically -conductive medium such as an electrolyte gel. KOH, NaOH or ionically-conductive polylmer. When the cathode and anode structure are brought into ionic contact, a characteristic open-cell voltage is automatically generated. The value of this open-cell voltage is based on the difference in electro-chemical potential of the anode and cathode materials. When an electrical load is connected across the cathode and anode structures of the metal-air FCB cell, so constructed, electrical power is delivered to the electrical load, as oxygen $O_2$ from the ambient environment is consumed and metal-fuel anode material oxidizes. In the case of a zinc-air FCB system or device, the zinc-oxide (ZnO) is formed on the zinc anode structure during the discharging cycle, while oxygen is consumed within the region between the adjacent surfaces of the cathode structure and electrolytic medium (hereinafter referred to as the "cathode-electrolyte interface" for purposes of convenience).

During recharging operations, the Metal-Fuel Recharging Subsystem hereof applies an external voltage source (e.g. more than 2 volts for zinc-air systems) across the cathode structure and oxidized metal-fuel anode of the metal-air FCB system. Therewhile, the Metal-Fuel Recharging Subsystem controls the electrical current flowing between the cathode and metal-fuel anode structures, in order to reverse the electro-chemical reaction which occurred during discharging operations. In the case of the zinc-air FCB system or device, the zinc-oxide (ZnO) formed on the zinc anode structure during the discharging cycle is converted into (i.e. reduced back) into zinc, while oxygen $O_2$ is released at the cathode-electrolyte interface to the ambient environment.

Specific ways and means for optimally carrying out such discharging and recharging processes in metal-air FCB systems and devices will be described in detail below in connection with the various illustrative embodiments of the present invention.

THE FIRST ILLUSTRATIVE EMBODIMENT OF THE METAL-AIR FCB SYSTEM OF THE PRESENT INVENTION

The first illustrative embodiment of the metal-air FCB system hereof is illustrated in FIGS. 1 through 2B16. As shown in FIG. 1, this metal-air FCB system 1 comprises a number of subsystems, namely: a Metal-Fuel Tape Cassette Cartridge Loading/Unloading Subsystem 2 for loading and unloading: a metal-fuel tape cassette device 3 into the FCB system during its Cartridge Loading and Unloading Modes of operation, respectively; a Metal-Fuel Tape Transport Subsystem 4 for transporting metal-fuel tape 5, supplied by the loaded cassette device, through the FCB system during its Discharging and Recharging Modes of operation alike; a Metal-Fuel Tape Discharging (i.e. Power Generation) Subsystem 6 for generating electrical power from the metal-fuel tape during the Discharging Mode of operation; and a Metal-Fuel Tape Recharging Subsystem 7 for electro-chemically recharging (i.e. reducing) sections of oxidized metal-fuel tape during the Recharging Mode of operation. In the illustrative embodiment of the Metal-Fuel Tape Discharging Subsystem 6 to be described in greater detail hereinbelow, an assembly of discharging (i.e. discharging) heads are provided for discharging metal-fuel tape in the presence of air ($O_2$) and water and ($H_2O$) and generating electrical power across an electrical load connected to the FCB system.

In order toe equip the metal-air FCB system with multiple discharging heads arranged within an ultra-compact space, the Metal-Fuel Tape Discharging Subsystem 6 comprises a metal-fuel tape path-length extension mechanism 8, as shown in FIGS. 2A1 and 2A2. In FIG. 2A1, the path-length extension mechanism 8 is shown in its unextended configuration. When a cassette cartridge 3 is loaded into the cassette storage bay of the FCB system, the path-length extension mechanism 8 within the Metal-Fuel Tape Discharging Subsystem 6 automatically extends the path-length of the metal-fuel tape 5 in a folded manner, as shown in FIG. 2A2, thereby permitting an assembly of discharging heads 9 to be arranged thereabout for generating electrical power during the Discharging Mode of the system, while efficiently utilizing physical housing space. The many advantages of providing multiple discharging heads in the Metal-Fuel Tape Discharging Subsystem will become apparent hereinafter.

Similarly, in order to equip the metal-air FCB system with multiple metal-oxide reducing (i.e. recharging) heads arranged within an ultra-compact space, the Metal-Fuel Tape Recharging Subsystem 7 also comprises a metal-fuel tape path-length extension mechanism 10. In FIG. 2B1, the path-length extension mechanism 10 is shown in its unextended configuration. When a cassette cartridge 3 is loaded into the cassette storage bay of the FCB system, the path-length extension mechanism 10 within the Metal-Fuel Tape Recharging Subsystem 7 automatically extends the path-length of the metal-fuel tape 5, as shown in FIG. 2B2, thereby permitting the assembly of recharging heads 11 to be inserted between and arranged about the path-length extended metal-fuel tape, for converting metal-oxide formations into its primary metal during the Recharging Mode of operation.

In order to provide for rapid recharging of the metal-fuel tape in the metal-air FCB system of the first illustrative embodiment, the total surface area $A_{recharge}$ of the recharging heads in the Metal-Fuel Tape Recharging Subsystem 7 is designed to be substantially greater than the total surface area $A_{discharge}$ of the discharging heads within the Metal-Fuel Tape Discharging Subsystem 6 (i.e. $A_{recharge} >> A_{discharge}$), as taught in Applicant's prior U.S. Pat. No. 5,250,370, incorporated herein by reference. This design feature enables a significant decrease in recharging time, without requiring a significant increase in volume in the housing of the FCB system. These subsystem features will be described in greater detail hereinafter in connection with the description of the Metal-Fuel Tape Discharging and Recharging Subsystems hereof.

Brief Summary of Modes of Operation of the FCB System of the First Illustrative Embodiment of the Present Invention During the Cartridge Loading Mode, the cassette cartridge 3 containing a supply of charged metal-fuel tape 5 is loaded into the FCB system, by the Cassette Loading/Unloading Subsystem 2. During the Discharging Mode, the charged metal-fuel tape within the cartridge is mechanically manipulated by path-length extension mechanism hereof 8 to substantially increase its path-length so that the assembly of discharging heads 9 can be arranged thereabout for electro-chemically generating electrical power therefrom for supply to an electrical load connected thereto. During the Recharging Mode, the oxidized metal-fuel tape 5 within the cartridge is mechanically manipulated by path-length extension mechanism hereof 10 to substantially increase its path-length so that the assembly of metal-oxide reducing (i.e. recharging) heads 11 can be arranged thereabout for electro-chemically reducing (i.e. recharging) the oxide formations on the metal-fuel tape transported therethrough into its primary metal during recharging operations. During the Cartridge Unloading Mode, the cassette cartridge is unloaded (e.g. ejected) from the FCB system by the Cassette Loading/Unloading Subsystems.

While it may be desirable in some applications to suspend tape recharging operations while carrying out tape discharging operations, the FCB system of the first illustrative embodiment enables concurrent operation of the Discharging and Recharging Modes. Notably, this feature of the present invention enables simultaneous discharging and recharging of metal-fuel tape during power generating operation.

Multi-Track Metal-Fuel Tape Used in the FCB System of the First Illustrative Embodiment In the FCB system of FIG. 1, the metal-fuel tape 5 has multiple fuel-tracks (e.g. five tracks) as taught in copending application Ser. No. 08/944,507, supra. When using such a metal-fuel tape design, it is desirable to design each discharging head 9 within the Metal-Fuel Tape Discharging Subsystem 6 as a "multi-track" discharging head. Similarly, each recharging head 11 within the Metal-Fuel Tape Recharging Subsystem 7 hereof should be designed as a multi-track recharging head in accordance with the principles of the present invention. As taught in great detail in copending application Ser. No. 08/944,507, the use of "multi-tracked" metal-fuel tape and multi-track discharging heads enables the simultaneous production of multiple supply voltages (e.g. 1.2 Volts), and thus the generation and delivery of a wide range of output voltages (V1, V2, . . . , Vn) to electrical loads having various loading requirements. Such output voltages can be used suitable for driving various types of electrical loads 12 connected to output power terminals 13 of the FCB system. This is achieved by configuring the individual output voltages produced across each anode-cathode pair during tape discharging operations. This system functionality will be described in greater detail hereinbelow.

In general, multi-track and single-track metal-fuel tape alike can be made using several different techniques. Preferably, the metal-fuel tape contained with the cassette device 3 is made from zinc as this metal is inexpensive, environmentally safe, and easy to work. Several different techniques will be described for making zinc-fuel tape according to the present invention.

For example, in accordance with a first fabrication technique, a thin metal layer (e.g. nickel or brass) of about 1 to 10 microns thickness is applied to the surface of low-density plastic material (drawn and cut in the form of tape). The plastic material should be selected so that it is stable in the presence of an electrolyte such as KOH. The function of this thin metal layer is to provide efficient current collection at the anode surface. Thereafter, zinc powder is mixed with a binder material and then applied as a coating (e.g. about 10 to 1000 microns thick) upon the surface thin metal layer The zinc layer should have a uniform porosity of about 50% to allow ions within the ionically-conducting medium (e.g. electrolyte) to flow with minimum electrical resistance between the current collecting elements of the cathode and anode structures.

In accordance with a second fabrication technique, a thin metal layer (e.g. nickel or brass) of about 1 to 10 microns thickness is applied to the surface of low-density plastic material (drawn and cut in the form of tape). The plastic material should be selected so that it is stable in the presence of an electrolyte such as KOH. The function of the thin metal layer is to provide efficient current collection at the anode surface. Thereafter zinc is electroplated onto the surface of the thin layer of metal. The zinc layer should have a uniform porosity of about 50% to allow ions within the ionically-conducting medium (e.g. electrolyte) to flow with minimum electrical resistance between the current collecting elements of the cathode and anode structures.

In accordance with a third fabrication technique, zinc powder is mixed with a low-density plastic base material and drawn into electrically-conductive tape. The low-density plastic material should be selected so that it is stable in the presence of an electrolyte such as KOH. The electrically-conductive tape should have a uniform porosity of about 50% to allow ions within the ionically-conducting medium (e.g. electrolyte) to flow with minimum electrical resistance between the current collecting elements of the cathode and anode structures. Then a thin metal layer (e.g nickel or brass) of about 1 to 10 microns thickness is applied to the surface of the electrically-conductive tape. The function of the thin metal layer is to provide efficient current collection at the anode surface.

Each of the above-described techniques for manufacturing metal-fuel tape can be ready modified to produce "double-sided" metal-fuel tape, in which single track or multi-track metal-fuel layers are provided on both sides of the flexible, base (i.e. substrate) material. Such embodiments of metal-fuel tape will be useful in applications where discharging heads are to be arranged on both sides of metal-fuel tape loaded within the FCB system. When making double-sided metal-fuel tape, it will be necessary in most embodiments to form a current collecting layer (of thin metal material) on both sides of the plastic substrate so that current can be collected from both sides of the metal-fuel tape, associated with different cathode structures. When making double-sided multi-tracked fuel tape, it may be desirable or necessary to laminate together two lengths of multi-track metal-fuel tape, as described hereinabove, with the substrates of each tape-length in physical contact. Adaptation of the above-described methods to produce double-sided metal-fuel tape will be readily apparent to those skilled in the art having had the benefit of the present disclosure. In such illustrative embodiments of the present invention, the anode-contacting structures within the each discharging head will be modified so that electrical contact is established with each electrically-isolated current collecting layer formed within the metal-fuel tape structure being employed therewith.

Methods and Devices for Packaging Metal-Fuel Tape of the Present Invention

Multi-track metal-fuel tape 5 made in the manner described above can be packaged in a variety of different ways. One packaging technique would be to roll the metal-fuel tape off a supply reel, and take it up on a take-up reel in the manner that 9-track digital recording tape is handled.

Another handling technique, which is preferred over the reel-to-reel technique, involves storing the metal-fuel tape within a compact cassette cartridge device ("cassette fuel cartridge"). As shown in FIG. 1, the cassette device 5 has a housing 14 containing a pair of spaced-apart spindles 15A and 15B, about which a supply of metal-fuel tape 5 (5', 5") is wound in a manner similar to a video-cassette tape. The cassette cartridge device 5 also includes a pair of spaced apart tape guiding rollers 16A and 16B mounted in the front corners of the cassette housing, and an opening 17 formed in the front end portion 14A (i.e. side wall and top surface) thereof.

Front-end opening 14A serves a number of important functions, namely: it allows the "multi-track" discharging head assembly 9 to be moved into a properly aligned position with respect to the "path-length extended" metal-fuel tape during discharging operations; it allows the discharging head assembly to be moved away from the extended path-length of metal-fuel tape when the cassette cartridge is removed from the discharging bay of the Metal-Fuel tape Discharging Subsystem; it allows the tape path-length extension mechanism 10, integrated into the FCB recharging subsystem 7, to engage a section of the metal-fuel tape and then extend its path length by way of the two-step process illustrated in FIGS. 2A1 through 2B2.

Cassette housing opening 14A also allows the "multi-track" recharging head assembly 11 associated with the Metal-Fuel Recharging Subsystem 7 to be moved into a properly aligned position with respect to the "path-length extended" portion of the discharged metal-fuel tape during recharging operations; it also allows the recharging head assembly 11 to be removed (i.e. withdrawn) from the metal-fuel tape when the cassette cartridge is removed from the cassette storage bay 15 of the FCB system. A retractable window or door 14B can be mounted over this opening within the cassette housing in order to close off the cassette interior from the environment when the device is not installed within the cassette storage bay of the system. Various types of spring-biased mechanisms can be used to realize the retractable window of the cassette cartridge of the present invention.

Tape-tensioning, though not shown mechanisms may also be included within the cassette housing in order to ensure that the metal-fuel tape maintains proper tension during unwinding and rewinding of the metal-fuel tape in either the Discharging Mode or Recharging Mode of operation. The cassette housing can be made from any suitable material designed to withstand heat and corrosion. Preferably, the housing material is electrically non-conducting to provide an added measure of user-safety during tape discharging and recharging operations.

Cassette Cartridge Loading/Unloading Subsystem for the First Illustrative Embodiment of the Metal-Air FCB System of the Present Invention As schematically illustrated in FIGS. 1, 2A31,2A32 and 2A4, and shown in detail in U.S. Pat. No. 6,296,960; the Cassette Cartridge Loading/Unloading Transport Subsystem 2 in the FCB system of FIG. 1 comprises a number of cooperating mechanisms, namely: a cassette receiving mechanism 16A for automatically (i) receiving the cassette cartridge 3 at a cassette insertion port 17A formed in the front panel of the system housing 17, and (ii) withdrawing the cartridge into the cassette storage bay therewithin; an automatic door opening mechanism 16B for opening the door formed in the cassette cartridge (for metal-fuel tape access) when the cartridge is received within the cassette storage bay of the FCB system; and an automatic cassette ejection mechanism 16C for ejecting the cassette cartridge from the cassette storage bay through the cassette insertion port in response to a predetermined condition (e.g., the depression of an "ejection" button provided on the front panel of the system housing, automatic sensing of the end of the metal-fuel tape, etc.).

In the illustrative embodiment of FIG. 1, the cassette receiving mechanism can be realized as a platform-like carriage structure that surrounds the exterior of the cassette cartridge housing. The platform-like carriage structure can be supported on a pair of parallel rails, by way of rollers, and translatable therealong by way of an electric motor and cam mechanism. These devices are operably connected to the system controller which will be described in greater detail hereinafter. The function of the cam mechanism is to convert rotational movement of the motor shaft into a rectilinear motion necessary for translating the platform-like carriage structure along the rails when a cassette is inserted within the platform-like carriage structure. A proximity sensor, mounted within the system housing, can be used to detect the presence of the cassette cartridge being inserted through the insertion port and placed within the platform-like carriage structure. The signal produced from the proximity sensor can be provided to the system controller in order to initiate the cassette cartridge withdrawal process in an automated manner.

Within the system housing, the automatic door opening mechanism can be realized by any suitable mechanism that can slide the cassette door 14B into its open position when the cassette cartridge is completely withdrawn into the cassette storage bay. In the illustrative embodiment, the automatic cassette ejection mechanism employs the same basic structures and functionalities of the cassette receiving mechanism described above. The primary difference is the automatic cassette ejection mechanism responds to the depression of an "ejection" button provided on the front panel of the system housing, or functionally equivalent triggering condition or event. When the button is depressed, the system controller automatically causes the discharging heads to be transported away from the metal-fuel tape, the path-length extended metal-fuel tape to become unextended, and the cassette cartridge automatically ejected from the cassette storage bay, through the cassette insertion port.

Notably, the control functions required by the Cassette Cartridge Loading/Unloading Subsystem 2, as well as all other subsystems within the FCB system of the first illustrative embodiment, are carried out by the system controller 18, shown in FIGS. 2A31,2A32 and 2A4. In the illustrative embodiments hereof, the system controller is realized by a programmed microcontroller (i.e. microcomputer) having program storage memory (ROM), data storage memory (RAM) and the like operably connected by one or more system buses well known in the microcomputing and control arts.

Metal-Fuel Tape Transport Subsystem for the First Illustrative Embodiment of the Metal-Air FCB System of the Present Invention As shown in FIGS. 2A31,2A32 and 2A4, the metal-fuel tape transport subsystem 4 of the first illustrative embodiment comprises: a pair of synchronized electric motors 19A and 19B for engaging spindles 20A and 20B in the metal-fuel cartridge 3 when it is inserted in the cassette receiving bay of the system, and driving the same in either forward or reverse directions under synchronous control during the Discharging Mode and (Tape) Recharging Mode of operation; electrical drive circuits 21A and 21B for producing electrical drive signals for the electric motors 19A and 19B; and a tape-speed sensing circuit 22 for sensing the speed of the metal-fuel tape (i.e. motors) and producing signals indicative thereof for use by the system controller 18 to control the speed of the metal-fuel tape during discharging and recharging operations. As the metal-fuel tape transport subsystem 4 of the first illustrative embodiment employs the system controller 18, it is proper to include the system controller 18 as a supporting subsystem within the metal-fuel tape transport subsystem 4.

The Metal-Fuel Tape Discharging Subsystem for the First Illustrative Embodiment of the Metal-Air FCB System of the Present Invention As shown in FIGS. 2A31,2A32 and 2A4, the metal-fuel tape discharging subsystem 6 of the first illustrative embodiment comprises a number of subsystems, namely: an assembly of multi-track discharging heads 9, each having multi-element cathode structures and anode-contacting structures with electrically-conductive output terminals connectable in a manner to be described hereinbelow; an assembly of metal-oxide sensing heads 23 for sensing the presence of metal-oxide formation along particular zones of metal fuel tracks as the metal fuel tape is being transported past the discharging heads during the Discharging Mode; a metal-fuel tape path-length extension mechanism 8, as schematically illustrated in FIGS. 2A1 and 2A2 and described above, for extending the path-length of the metal-fuel tape over a particular region of the cassette device 5, and enabling the assembly of multi-track discharging heads to be arranged thereabout during the Discharging Mode of operation; a discharging head transport subsystem 24 for transporting the subcomponents of the discharging head assembly 9 (and the metal-oxide sensing head assembly 24) to and from the metal-fuel tape when its path-length is arranged in an extended configuration by the metal-fuel tape path-length extension mechanism 8; a cathode-anode output terminal configuration subsystem 25 for configuring the output terminals of the cathode and anode-contacting structures of the discharging heads under the control of the system controller 18 so as to maintain the output voltage required by a particular electrical load connected to the Metal-Fuel Tape Discharging Subsystem; a cathode-anode voltage monitoring subsystem 26, connected to the cathode-anode output terminal configuration subsystem 25 for monitoring (i.e. sampling) the voltage produced across cathode and anode of each discharging head, and producing (digital) data representative of the sensed voltage level; a cathode-anode current monitoring subsystem 27, connected to the cathode-anode output terminal configuration subsystem 25, for monitoring (e.g. sampling) the current flowing across the cathode and anode of each discharging head during the Discharging Mode, and producing digital data signals representative of the sensed current levels; a cathode oxygen pressure control subsystem, comprising the system controller 18, solid-state $pO_2$ sensors 28, vacuum chamber (structure) 29 shown in FIGS. 2A7 and 2A8, vacuum pump 30, airflow control device 31, manifold structure 32, and multi-lumen tubing 33 shown in FIGS. 2A8, for sensing and controlling the $pO_2$ level within the cathode structure of each discharging head 9; a metal-fuel tape speed control subsystem, comprising the system controller 18, motor drive circuits 21A and 21B, and tape velocity (i.e. speed and direction) sensor/detector 22, for bi-directionally controlling the speed of metal-fuel tape relative to the discharging heads, in either forward or reverse tape directions; an ion-concentration control subsystem, comprising the system controller 18, solid-state moisture sensor 34, moisturizing (e.g. humidifying or wicking element) 35, for sensing and modifying conditions within the FCB system (e.g. the moisture or humidity level at the cathode-electrolyte interface of the discharging heads) so that the ion-concentration at the cathode-electrolyte interface is maintained within an optimal range during the Discharge Mode of operation: discharge head temperature control subsystem comprising the system controller 18, solid-state temperature sensors (e.g. thermistors) 271 embedded within each channel of the multi-cathode support structure hereof, and a discharge head cooling device 272, responsive to control signals produced by the system controller 18, for lowering the temperature of each discharging channel to within an optimal temperature range during discharging operations; a relational-type metal-fuel database management subsystem (MFDMS) 275 operably connected to system controller 18 by way of local bus 276, and designed for receiving particular types of information derived from the output of various subsystems within the Metal-Fuel Tape Discharging Subsystem 6; a Data Capture and Processing Subsystem (DCPS) 277, comprising data reading head 38 embedded within or mounted closely to the cathode support structure of each discharging head 9, metal-oxide sensing head assembly 23 and associated circuitry, and a programmed microprocessor-based data processor adapted to receive data signals produced from voltage monitoring subsystem 26, cathode-anode current monitoring subsystem 27, metal-oxide sensing head assembly 23, the cathode oxygen pressure control subsystem and the ion-concentration control subsystem hereof, and enable (i) the reading of metal-fuel zone identification data from transported metal-fuel tape 5, (ii) the recording of sensed discharge parameters and computed metal-oxide indicative data derived therefrom in the Metal-Fuel Database Management Subsystem (MFDMS) 275 using local system bus 278 shown in FIG. 2B17, and (iii) the reading of prerecorded recharge parameters and prerecorded metal-fuel indicative data stored in the Metal-Fuel Database Management Subsystem (MFDMS) using the same local system bus 278; an output (i.e. discharging) power regulation subsystem 40 connected between the output terminals of the cathode-anode output terminal configuration subsystem 25 and the input terminals of the electrical load 12 connected to the Metal-Fuel Tape Discharging Subsystem 6, for regulating the output power delivered across the electrical load (and regulate the voltage and/or current characteristics as required by the Discharge Control Method carried out by the system controller); an input/output control subsystem 41, interfaced with the system controller 18, for controlling all functionalities of the FCB system by way of a remote system or resultant system, within which the FCB system is embedded; and system controller 18, interfaced with system controller 18' within the Metal-Fuel Tape Recharging Subsystem 7 by way of global system bus 279, as shown in FIG. 2B17, and having various means for managing the operation of the above mentioned subsystems during the various modes of system operation. These subsystems will be described in greater technical detail below.

Multi-Track Discharging Head Assembly within the Metal-Fuel Tape Discharging Subsystem The function of the assembly of multi-track discharging heads 9 is to generate electrical power across the electrical load as metal-fuel tape is transported therethrough during the Discharging Mode of operation. In the illustrative embodiment, each discharging head 9 comprises: a cathode element support plate 42 having a plurality of isolated channels 43 permitting the free passage of oxygen ($O_2$) through the bottom portion 44 of each such channel; a plurality of electrically-conductive cathode elements (e.g. strips) 45 for insertion within the lower portion of these channels, respectively; a plurality to electrolyte-impregnated strips 46 for placement over the cathode, strips 45, and support within the channels 43; respectively, as shown in FIGS. 2A6 and 2A7 and an oxygen-injection chamber 29 mounted over the upper (back) surface of the cathode element support plate 44, in a sealed manner.

As shown in FIGS. 2A13 and 2A14, each oxygen-injection chamber 29 has a plurality of subchambers 29A through 29E physically associated with channels 35A and 35E, respectively, wherein each subchamber is isolated from all other subchamber and is arranged in fluid communication with one channel in the electrode support plate supporting one electrode element and one electrolyte impregnated element. As shown, each subchamber within the discharging head assembly is arranged in fluid communication with an air compressor or $O_2$ gas supply means (e.g. tank or cartridge) 30 via one lumen of multi-lumen tubing 33, one channel of manifold assembly 32 and one channel of electronically-controlled air-flow switch 31, shown in FIGS. 3A3 and 2A4, and whose operation is controlled by system controller 18. This arrangement enables the system controller 18 to independently control the $pO_2$ level in each oxygen-injection chamber 29A through 29E within an optimal range during discharging operations, within the discharging head assembly, by selectively pumping pressurized air through the corresponding air flow channel in the manifold assembly 32 under the management of the system controller 18.

In the illustrative embodiment, electrolyte-impregnated strips are realized by impregnating an electrolyte-absorbing carrier medium with a gel-type electrolyte. Preferably, the electrolyte-absorbing carrier strip is realized as a strip of low-density, open-cell foam material made from PET plastic. The gel-electrolyte for each discharging cell is made from a formula consisting of an alkali solution (e.g. KOH), a gelatin material, water, and additives known in the art.

In the illustrative embodiment, each cathode strip is made from a sheet of nickel wire mesh 47 coated with porous carbon material and granulated platinum or other catalysts 48 to form a cathode suitable for use in metal-air FCB systems. Details of cathode construction are disclosed in U.S. Pat. Nos. 4,894,296 and 4,129,633, incorporated herein by reference. To form a current collection pathway, an electrical conductor 49 is soldered to the underlying wire mesh sheet of each cathode strip. As shown in FIG. 2A7, each electrical conductor 49 is passed through a small hole 50 formed in the bottom surface of a channel 43 of the cathode support plate, and is connected to the cathode-anode output terminal configuration subsystem 25. As shown, the cathode strip pressed into the lower portion of the channel to secure the same therein. As shown in FIG. 2A7, the bottom surface 44 of each channel 43 has numerous perforations 43A formed therein to allow the free passage of oxygen to the cathode strip. In the illustrative embodiment, an electrolyte-impregnated strip 46 is placed over a cathode strip 45 and is secured within the upper portion of the cathode supporting channel 43. As shown in FIG. 2A8, when the cathode strip and thin electrolyte strip are mounted in their respective channel in the cathode support plate, the outer surface of the electrolyte-impregnated strip is disposed flush with the upper surface of the plate defining the channels, thereby permitting metal-fuel tape to be smoothly transported thereover during tape discharging operations.

Hydrophobic agents are added to the carbon material constituting the oxygen-pervious cathode elements within the discharging head assembly 9 to ensure the expulsion of water therefrom during discharging operations. Also, the interior surfaces of the cathode support channels are coated with a hydrophobic film (e.g. Teflon) 51 to ensure the expulsion of water within electrolyte-impregnated strips 47 and thus achieve optimum oxygen transport across the cathode strips, to the injection-chamber 29 during the Discharging Mode. Preferably, the cathode support plate is made from an electrically non-conductive material, such as polyvinyl chloride (PVC) plastic material well known in the art. The cathode support plate and evacuation chamber can be fabricated using injection molding technology also well known in the art.

In order to sense the partial oxygen pressure within the cathode structure during the Discharging Mode, for use in effective control of electrical power generated from discharging heads, a solid-state $pO_2$ sensor 28 is embedded within each channel of the cathode support plate 42, as illustrated in FIG. 2A7, and operably connected to the system controller 18 as an information input device thereto. In the illustrative embodiment, the $pO_2$ sensor can be realized using well-known $pO_2$ sensing technology employed to measure (in vivo) $pO_2$ levels in the blood of humans. Such prior art sensors can be constructed using miniature diodes which emit electromagnetic radiation at two or more different wavelengths that are absorbed at different levels in the presence of oxygen in the blood, and such information can be processed and analyzed to produce a computed measure of $pO_2$ in a reliable manner, as taught in U.S. Pat. No. 5,190,038 and references cited therein, each being incorporated herein by reference. In the present inventions the characteristic wavelengths of the light emitting diodes can be selected so that similar sensing functions can be carried out within the structure of the cathode in each discharging head, in a straightforward manner.

The multi-tracked fuel tape contained within the cassette fuel cartridge of FIG. 1 is shown in greater structural detail in FIG. 2A9. As shown, the metal-fuel tape 5 comprises: an electrically non-conductive base layer 53 of flexible construction (i.e. made from a plastic material stable in the presence of the electrolyte); a plurality of parallel extending, spatially-separated strips of metal (e.g. zinc) 54A, 54B, 54C, 54D and 54E disposed upon the ultra-thin current-collecting layer (not shown) itself disposed upon the base layer 53; a plurality of electrically non-conductive strips 55A, 55B, 55C, 55D and 55E disposed upon the base layer, between pairs of fuel strips 54A, 54B, 54C, 54D and 54E; and a plurality of parallel extending channels (e.g. grooves) 56, 56B, 56B, 56D and 56E formed in the underside of the base layer, opposite the metal fuel strips thereabove, for allowing electrical contact with the metal-fuel tracks 54A, 54B, 54C, 54D and 54E through the grooved base layer. Notably, the spacing and width of each metal-fuel strip is designed so that it is spatially-registered with a corresponding cathode strip in the discharging head of the system in which the metal-fuel tape is intended to be used.

The metal-fuel tape described above can be made by applying zinc strips onto a layer of base plastic material 53 in the form of tape, using any of the fabrication techniques described hereinabove. The metal strips can be physically spaced apart, or separated by Teflon, in order to ensure electrical isolation therebetween. Then, the gaps between the metal strips can be filled in by applying a coating of electrically insulating material, and thereafter, the base layer can be machined, laser etched or otherwise treated to form fine channels therein for allowing electrical contact with the individual metal fuel strips through the base layer. Finally, the upper surface of the multi-tracked fuel tape can be polished to remove any electrical insulation material from the surface of the metal fuel strips which are to come in contact with the cathode structures during discharging.

In FIG. 2A10, an exemplary metal-fuel (anode) contacting structure 58 is disclosed for use with the multi-tracked cathode structure shown in FIGS. 2A7 and 2A8. As shown, a plurality of electrically-conductive elements 60A, 60B, 60C, 60D, and 60E are supported from an platform 61 disposed adjacent the travel of the fuel tape within the cassette cartridge. Each conductive element 60A through 60E has a smooth surface adapted for slidable engagement with one track of metal-fuel through the fine groove formed in the base layer 53 of the metal-fuel tape corresponding to fuel track. Each conductive element is connected to an electrical conductor which is connected to the cathode-anode output terminal configuration subsystem 25 under the management of the system controller 18. The platform 61 is operably associated with the discharging head transport subsystem 24 and can be designed to be moved into position with the fuel tape during the Discharging Mode of the system, under the control of the system controller.

Notably, the use of multiple discharging heads, as in the illustrative embodiments hereof, rather than a single discharging head, allows more power to be produced from the discharging head assembly for delivery to the electrical load while minimizing heat build-up across the individual discharging heads. This feature of the Metal-Fuel Tape Discharging Subsystem extends the service-life of the cathodes employed within the discharging heads thereof.

Metal-Oxide Sensing Head Assembly within the Metal-Fuel Tape Discharging Subsystem The function of the Metal-Oxide Sensing Head Assembly 23 is to sense (in real-time) the current levels produced across the individual fuel tracks during discharging operations, and generate electrical data signals indicating the degree to which portions of metal-fuel tracks have been oxidized and thus have little or no power generation potential. As shown in FIGS. 2A15, each multi-track metal-oxide sensing head 23 in the assembly thereof comprises a number of subcomponents, namely: a positive electrode support structure 63 for supporting a plurality of positively electrode elements 64A, 64B, 64C, 64D and 64E, each in registration with the upper surface of one of the fuel tracks (that may have been oxidized) and connected to a low voltage power supply terminal 65A, 65B, 65C, 65D and 65E provided by current sensing circuitry 66 which is operably connected to the Data Capture and Processing Subsystem 277 within the Metal-Fuel Tape Discharging Subsystem 6, as shown in FIGS. 2A31,2A32 and 2A4; and a negative electrode support structure 67 for supporting a plurality of negative electrode elements 68A, 68B, 68C, 68D and 68E, each in registration with the lower surface of the fuel tracks and connected to a low voltage power supply terminal 69A, 69B, 69C, 69D and 69E, respectively, provided by current sensing circuitry 66.

In the illustrative embodiment shown in FIGS. 2A31, 2A32 and 2A4, each multi-track metal-oxide sensing head 23 is disposed immediately before a discharging head 9 in order to sense the actual condition of the metal-fuel tape therebefore and provide a data signal to the system controller 18 for detection and determination of the actual amount of metal-oxide present thereon before the discharging. While only one metal-oxide sensing head assembly 23 is shown in the first illustrative embodiment of the FCB system hereof, it is understood that for bidirectional tape-based FCB systems, it would be preferred to install one metal-oxide sensing head assembly 23 on each end of the discharging head assembly so that the system controller can "anticipate" which metal-fuel zones are "dead" or devoid of metal-fuel regardless of the direction that the metal-fuel tape is being transported at any particular instant in time. With such an arrangement, the Metal-Fuel Tape Discharging Subsystem 6 is capable of determining (i.e. estimating) which portions of which metal-fuel tracks have sufficient electrical power generation capacity for discharge operations, and which do not, and to control the metal-fuel tape transport subsystem so as to discharge metal-fuel tape in an optimal manner during the Discharging Mode of operation. Details concerning this aspect of the present invention will be described hereinafter.

Metal-Fuel Tape Path-Length Extension Mechanism within the Metal-Fuel Tape Discharging Subsystem As shown in FIGS. 2A31,2A32 and 2A4, the tape path-length extension mechanism 8 of the illustrative embodiment comprises: a first array of rollers 71 A through 71E mounted on support structure 72 for contacting the metal-fuel portion of the metal-fuel tape when the cassette device 3 inserted into the cassette receiving port of the FCB system; a second array of rollers 73A through 73D disposed between the array of stationary rollers 71A through 71E and mounted on support structure 74, for contacting the base portion of the metal-fuel tape when the cassette device is inserted into the cassette receiving port of the FCB system; and a transport mechanism 75 of electro-mechanical construction, for transporting roller support structures 72 and 74 relative to the system housing and each other in order to carry out the functions of this subsystem described in greater detail hereinbelow.

Figure 4:
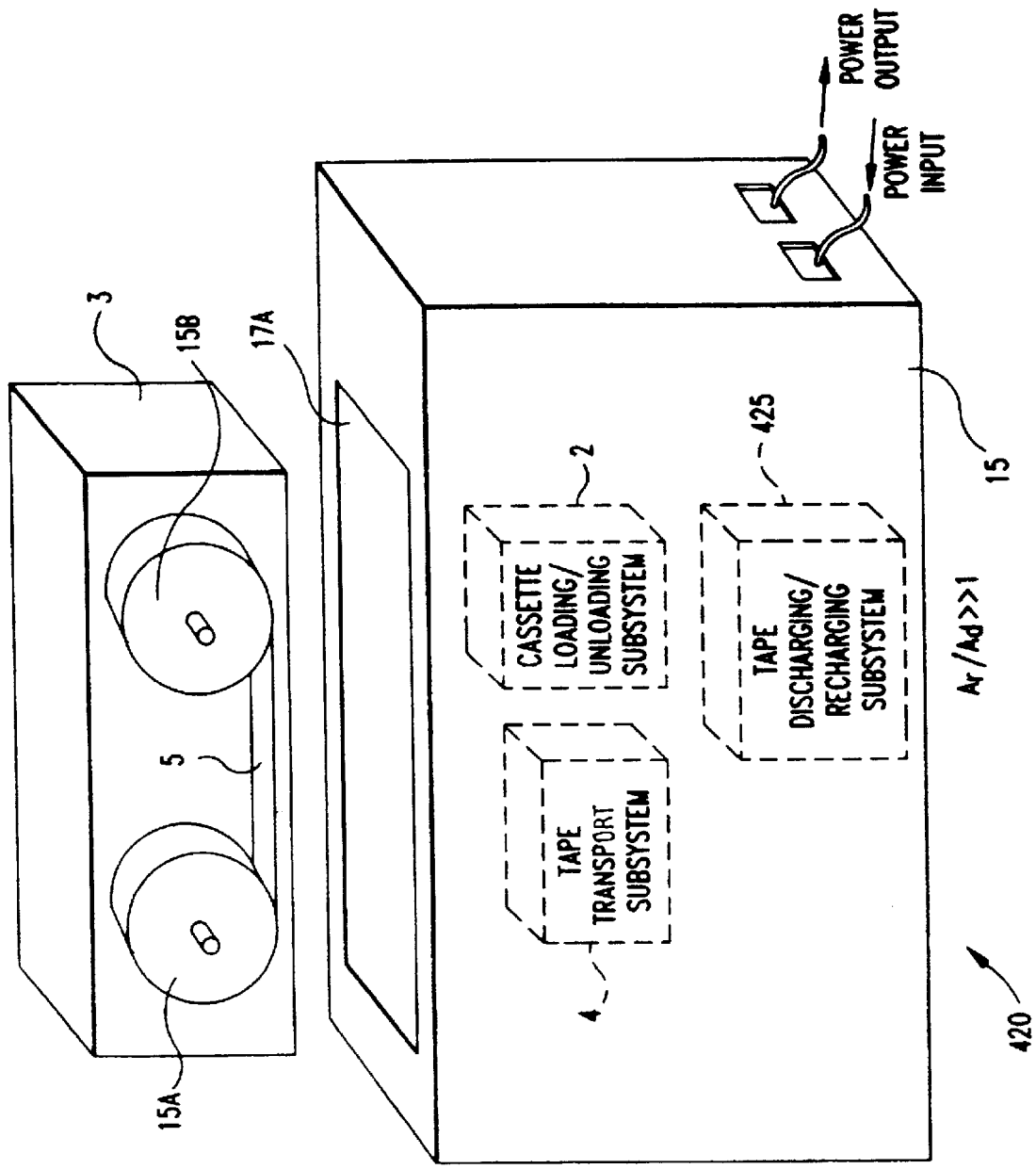

In the configuration shown in FIGS. 2A31,2A32 the tape path-length mechanism 8 is arranged so that the first and second sets of rollers 71A through 71E and 73A through 73E barely contact opposite sides of the metal-fuel tape when the cassette device 3 is inserted within the cassette receiving port of the FCB system. As shown in FIG. 2A4, the second set of rollers 73A through 73E are displaced (i.e transported) a distance relative to the first set of stationary rollers 71A through 71E, thereby causing the path-length of the metal-fuel tape to become substantially extended from the path-length shown in the configuration of FIGS. 2A31,2A32. This extended path-length permits a plurality of discharging heads 9 to be arranged thereabout during the discharging mode of operation. In this configuration, the cathode structure 76 of each discharging head is in ionic contact with the, metal-fuel structures along the metal-fuel tape, while the anode-contacting structure 77 of each discharging head is in electrical contact with the metal-fuel structures of the tape. In this configuration, the metal-fuel tape is so arranged so that a plurality of discharging heads can be arranged about the metal-fuel tape during power discharging operations. The use of multiple discharging heads enables low current loading of the metal-fuel tape- during power generation, and thus provides improved control over the formation of metal-oxide during power generation. Such advantages will become apparent hereinafter.

Discharging Head Transport Subsystem within the Metal-Fuel Tape Discharging Subsystem The primary function of the discharging head transport subsystem is to transport the assembly of discharging heads 9 (and metal-oxide sensing heads 23 supported thereto) about the metal-fuel tape that has been path-length extended, as shown in FIGS. 2A31,2A32. When properly transported, the cathode and anode-contacting structures of the discharging heads are brought into "ionically-conductive" and "electrically-conductive" contact with the metal-fuel tracks of metal-fuel tape while the metal-fuel tape is transported through the discharging head assembly by the metal-fuel tape transport subsystem during the discharging mode of operation.

Discharging head transport subsystem 24 can be realized using any one of a variety of electro-mechanical mechanisms capable of transporting the cathode structure 76 and anode-contacting structure 77 of each discharging head away from the metal-fuel tape 5, as shown in FIGS. 2A31 and 2A32 and about the metal-fuel tape as shown in FIG. 2A4. As shown, these transport mechanisms are operably connected to system controller 18 and controlled by the same in accordance with the system control program carried out thereby.

Cathode-Anode Output Terminal Configuration Subsystem within the Metal-Fuel Tape Discharging Subsystem As shown in FIGS. 2A31,2A32 and 2A4, the cathode-anode output terminal configuration subsystem 25 is connected between the input terminals of the discharging power regulation subsystem 40 and the output terminals of the cathode-anode pairs within the assembly of discharging heads 9. The system controller 18 is operably connected to cathode-anode output terminal configuration subsystem 25 in order to supply control signals for carrying out its functions during the Discharging Mode of operation.

The function of the cathode-anode output terminal configuration subsystem 25 is to automatically configure (in series or parallel) the output terminals of selected cathode-anode pairs within the discharging heads of the Metal-Fuel Tape Discharging Subsystem so that the required output voltage level is produced across the electrical load connected to the FCB system during tape discharging operations. In the illustrative embodiment of the present invention, the cathode-anode output terminal configuration mechanism 25 can be realized as one or more electrically-programmable power switching circuits using transistor-controlled technology, wherein the cathode and anode-contacting elements within the discharging heads 9 are connected to the input terminals of the output power regulating subsystem 40. Such switching operations are carried out under the control of the system controller 18 so that the required output voltage is produced across the electrical load connected to the output power regulating subsystem of the FCB system.

Cathode-Anode Voltage Monitoring Subsystem within the Metal-Fuel Tape Discharging Subsystem As shown in FIGS. 2A31,2A32 and 2A4, the cathode-anode voltage monitoring subsystem 26 is operably connected to the cathode-anode output terminal configuration subsystem 25 for sensing voltage levels and the like therewithin. While not shown, this subsystem is also operably connected to the system controller 18 for receiving control signals required to carry out its functions. In the first illustrative embodiment, the cathode-anode voltage monitoring subsystem 26 has two primary functions: to automatically sense the instantaneous voltage level produced across the cathode-anode structures associated with each metal-fuel track being transported through each discharging head during the Discharging Mode; and to produce a (digital) data signal indicative of the sensed voltages for detection, analysis and processing within the Data Capture and Processing Subsystem 277, and subsequent recording within the Metal-Fuel Database Management Subsystem 275 which is accessible by the system controller 18 during the Discharge Mode of operation.

In the first illustrative embodiment of the present invention, the Cathode-Anode Voltage Monitoring Subsystem 26 can be realized using electronic circuitry adapted for sensing voltage levels produced across the cathode-anode structures associated with each metal-fuel track transported through each discharging head within the Metal-Fuel Tape Discharging Subsystem 6. In response to such detected voltage levels, the electronic circuitry can be designed to produce a digital data signals indicative of the sensed voltage levels.

Cathode-Anode Current Monitoring Subsystem within the Metal-Fuel Tape Discharging Subsystem As shown in FIGS. 2A31,2A32 and 2A4, the cathode-anode current monitoring subsystem 27 is operably connected to the cathode-anode output terminal configuration subsystem 25. The cathode-anode current monitoring subsystem 27 has two primary functions: to automatically sense the magnitude of electrical current flowing through the cathode-anode pair of each metal-fuel track along each discharging head assembly within the Metal-Fuel Tape Discharging Subsystem during the discharging mode; and to produce a digital data signal indicative of the sensed current for detection, analysis and processing within the Data Capture and Processing Subsystem 277, and subsequent recording within the Metal-Fuel Database Management Subsystem 275 which is accessible by the system controller 18 during the Discharge Mode of operation.

In the first illustrative embodiment of the present invention, the Cathode-Anode Current Monitoring Subsystem 27 can be realized using current sensing circuitry for sensing the electrical current passed through the cathode-anode pair of each metal-fuel track along each discharging head assembly, and producing a digital data signal indicative of the sensed current. As will be explained in greater detail hereinafter, these detected current levels are stored in the Metal-Fuel Database Subsystem 275 and can be readily accessed by the system controller 18 in various ways, namely: carrying out its discharging power regulation method; creating a "discharging condition history" for each zone or subsection of discharged metal-fuel tape; etc.

Cathode Oxygen Pressure Control Subsystem within the Metal-Fuel Tape Discharging Subsystem The function of the cathode oxygen pressure control subsystem defined above is to sense the oxygen pressure ($pO_2$) within each channel of the cathode structure of the discharging head 9, and in response thereto, control (i.e. increase or decrease) the same by regulating the air ($O_2$) pressure within such cathode structures. In accordance with the present invention, the partial oxygen pressure ($pO_2$) within each channel of the cathode structure of each discharging head provides a measure of the oxygen concentration therewithin and thus is maintained at an optimal level in order to allow optimal oxygen consumption within the discharging heads during the Discharging Mode. By maintaining the $pO_2$ level within each channel of the cathode structure, power output produced from the discharging heads can be increased in a controllable manner. Also, by monitoring changes in $pO_2$ and producing digital data signals representative thereof for detection and analysis by the system controller, the system controller 18 is provided with a controllable variable for use in regulating electrical power supplied to the electrical load 12 during the Discharging Mode.

In the first illustrative embodiment of the FCB system hereof shown in FIG. 1, the data signals produced by the solid-state $pO_2$ sensors 28A through 28E embodied within the discharging heads 9 are provided to the Data Capture and Processing Subsystem 277, as shown in FIGS. 2A31,2A32 and 2A4. The Data Capture and Processing Subsystem 277 receives these signals, converts them into digital data and the like and then records the resulting information items within the information structure shown in FIG. 2A16, managed within the Metal-Fuel Database Management Subsystem 275 with the Metal-Fuel Tape Discharging Subsystem 6. Such discharging parameters can be accessed by the system controller 18 at any time over local bus 276 in order to independently control the level of $PO_2$ within each of the channels of the discharging heads 9 hereof during discharging operations.

Metal-Fuel Tape Speed Control Subsystem within the Metal-Fuel Tape Discharging Subsystem During the Discharging Mode, the function of Metal-Tape Speed Control Subsystem 4 is to control the speed of the metal-fuel tape over the discharging heads within the Metal-Fuel Tape Discharging Subsystem 6 In the illustrative embodiment, metal-fuel tape speed control subsystem 18 comprises a number of subcomponents, namely: the system controller 18; the motor speed circuits 21A and 21B; and tape velocity sensor 22. In response to the transport of tape past the velocity sensor 22, a data signal indicative of the tape velocity (i.e. speed and direction) is generated and supplied to the Data Capture and Processing Subsystem 277. Upon processing this data signal, the Data Capture and Processing Subsystem 277 produces digital data representative of the sampled tape velocity which is then stored in the Metal-Fuel Database Management Subsystem 275, correlated with the metal-fuel identification data (i.e. Code) read bathe same subsystem. In accordance with the Power Discharge Regulation Method being carried out, the system controller 18 automatically reads the tape velocity data from the Metal-Fuel Database Management Subsystem 275 by way of local system bus 276. Using this information, the system controller 18 automatically controls (i.e. increases or decreases) the instantaneous velocity of the metal-fuel tape, relative to the discharging heads. Such tape velocity control is achieved by generating appropriate control signals for driving electric motors 19A and 19B coupled to the supply and take-up reels of metal-fuel tape being discharged.

The primary reason for controlling the velocity of metal-fuel tape is that this parameter determines how much electrical current (and thus power) can be produced from metal-fuel tape during transport through each discharging head within the Metal-Fuel Tape Discharging Subsystem 6. Ideally, during the Discharging Mode, it is desirable to transport the metal-fuel tape as slow as possible through the discharging head assembly in order to deliver the amount of electrical power required by the connected load 12. However, for practical reasons, the velocity of the metal-fuel tape will be controlled so that the cathode-anode current ($i_{ac}$) generated in each discharging head will satisfy the electrical power requirements of the connected load 12. In many applications where the power requirements of the electrical load are below the maximum output power capacity of the FCB system, the velocity of the metal-fuel tape will be controlled so that the total metal fuel amount (TMFA) along each metal-fuel zone is completely consumed upon a single complete pass through all of the discharging heads within the discharging head assembly, thereby distributing the electrical load and heat generation evenly across each of the discharging heads. This will serve to maximize the service-life of the discharging heads.

Ion-Concentration Control Subsystem within the Metal-Fuel Tape

Discharging Subsystem

In order to achieve high-energy efficiency during the Discharging Mode, it is necessary to maintain an optimal concentration of (charge-carrying) ions at the cathode-electrolyte interface of each discharging head within the Metal-Fuel Tape Discharging Subsystem 6. Thus it is the primary function of the ion-concentration control subsystem to sense and modify conditions within the FCB system so that the ion-concentration at the cathode-electrolyte interface within the discharging heads is maintained within an optimal range during the Discharge Mode of operation.

In the case where the ionically-conducting medium between the cathode and anode is an electrolyte containing potassium hydroxide (KOH), it will be desirable to maintain its concentration at 6N (~6M) during the Discharging Mode of operation. As the moisture level or relative humidity (RH%) can significantly affect the concentration of KOH in the electrolyte, it is desirable to regulate the moisture level or relative humidity at the cathode-electrolyte interface within each discharging heads. In the illustrative embodiment, ion-concentration control is achieved in a variety of different ways: (e.g. by embedding a miniature solid-state moisture sensor 34 within the FCB System (as close as possible to the anode-cathode interfaces of the discharging heads) in order to sense moisture conditions and produce a digital data signal indicative thereof. As shown in FIGS. 2A31,2A32 and 2A4, the digital data signals are supplied to the Data Capture and Processing Subsystem 277 for detection, analysis and subsequent recording within the information structure of FIG. 2A16 which is maintained by the Metal-Fuel Data Management Subsystem 275. In the event that the moisture level (or relative humidity) within a particular channel of the discharging head drops below the predetermined threshold value set within the information structure of FIG. 2A16, the system controller 18 responds to such changes in moisture-level by automatically generating a control signal that is supplied to moisturizing ($H_2O$ dispensing) element 35 for the purpose of increasing the moisture level within the particular channel. In general, moisturizing element 35 can be realized in a number of different ways. One such way would be to controllably release a supply of water to the surface of the metal-fuel tracks on the tape using a wicking (e.g. $H_2O$ applying) device 36 arranged in physical contact with the metal-fuel tracks as the metal-fuel tape is being transported through the discharging head assembly during the Discharging Mode. Another technique may involve spraying fine water droplets (e.g. ultra-fine mist) from micro-nozzles realized along the top surfaces of each cathode support structure, facing the metal-fuel tape during transport. Such operations will increase the moisture level (or relative humidity) within the interior of the discharging heads and thus ensure that the concentration of KOH within electrolyte-impregnated strips 46A through 46E is maintained for optimal ion transport and thus power generation.

Discharge Head Temperature Control Subsystem within the Metal-Fuel Tape Discharging Subsystem As shown in FIGS. 2A31,2A32 2A4, and 2A7, the discharge head temperature control subsystem incorporated within the Metal-Fuel Tape Discharging Subsystem 6 of the first illustrative embodiment comprises a number of subcomponents, namely: the system controller 18; solid-state temperature sensors (e.g. thermistors) 271 embedded within each channel of the multi-cathode support structure hereof 42, as shown in FIG. 2A7; and a discharge head cooling device 272, responsive to control signals produced by the system controller 18, for lowering the temperature of each discharging channel within an optimal temperature range during discharging operations. The discharge head cooling device 272 can be realized using a wide variety of heat-exchanging techniques, including forced-air cooling, water-cooling, and/or refrigerant cooling, each well known in the heat exchanging art. In some embodiments of the present invention, where high levels of electrical power are being generated, it may be desirable to provide a jacket-like structure about each discharge head in order to circulate air, water or refrigerant for temperature control purposes.

Data Capture and Processing Subsystem within the Metal-Fuel Tape Discharging Subsystem In the illustrative embodiment of FIG. 1. Data Capture And Processing Subsystem (DCPS) 277 shown in FIGS. 2A31,2A32 and 2A4 carries out a number of functions, including, for example: (1) identifying each zone or subsection of metal-fuel tape immediately before it is transported through each discharging head within the discharging head assembly and producing metal-fuel zone identification data representative thereof; (2) sensing (i.e. detecting) various "discharge parameters" within the Metal-Fuel Tape Discharging Subsystem 6 existing during the time period that the identified metal-fuel zone is transported through the discharging head assembly thereof; (3) computing one or more parameters, estimates or measures indicative of the amount of metal-oxide produced during tape discharging operations, and producing "metal-oxide indicative data" representative of such computed parameters, estimates and/or measures; and (4) recording in the Metal-Fuel Database Management Subsystem 275 (accessible by system controller 18), sensed discharge parameter data as well as computed metal-oxide indicative data both correlated to its respective metal-fuel zone identified during the Discharging Mode of operation. As will become apparent hereinafter, such recorded information maintained within the Metal-Fuel Database Management Subsystem 275 by Data Capture and Processing Subsystem 277 can be used by the system controller 18 in various ways including, for example: optimally discharging (i.e. producing electrical power from) partially or completely oxidized metal-fuel tape in an efficient manner during the Discharging Mode of operation; and optimally recharging partially or completely oxidized metal-fuel tape in a rapid manner during the Recharging Mode of operation.

During discharging operations, the Data Capture and Processing Subsystem 277 automatically samples (or captures) data signals representative of "discharge parameters" associated with the various subsystems constituting the Metal-Fuel Tape Discharging Subsystem 6 described above. These sampled values are encoded as information within the data signals produced by such subsystems during the Discharging Mode. In accordance with the principles of the present invention, tape-type "discharge parameters" shall include, but are not limited to: the voltages produced across the cathode and anode structures along particular metal-fuel tracks monitored, for example, by the cathode-anode voltage monitoring subsystem 26; the electrical currents flowing across the cathode and anode structures along particular metal-fuel tracks monitored, for example, by the cathode-anode current monitoring subsystem 27; the velocity (i.e. speed and direction) of the metal-fuel tape during discharging of a particular zone of metal-fuel tape, monitored by the metal-fuel tape speed control subsystem; the oxygen saturation level ($pO_2$) within the cathode structure of each discharging head, monitored by the cathode oxygen pressure control subsystem (28,30,31,18); the moisture ($H_2O$) level (or relative humidity) level across or near the cathode-electrolyte interface along particular metal-fuel tracks in particular discharging heads monitored, for example, by the ion-concentration control subsystem (18, 34, 35 and 36); and the time duration ($\Delta T$) of the state of any of the above-identified discharge parameters.

In general, there are a number of different ways in which the Data Capture and Processing Subsystem 277 can record tape-type "discharge parameters" during the Discharging Mode of operation. These different methods will be detailed hereinbelow.

According to a first method of data recording shown in FIG. 2A9, a unique zone identifying code or indicia 80 (e.g. miniature bar code symbol encoded with zone identifying information is graphically printed on an "optical" data track 81 realized as, for example, as a strip of transparent of reflective film material affixed or otherwise attached along the edge of each zone or subsection 82 of metal-fuel tape, as shown in FIG. 2A9. The function of this optical data track is to record a unique identifying code or symbol (i.e. digital information label) alongside each metal-fuel zone along the supply of metal-fuel tape. The position of the graphical zone identifying code should physically coincide with the particular metal-fuel zone to which it relates. This optical data track, with zone identifying codes recorded therein by printing or photographic techniques, can be formed at the time of manufacture of the multi-track metal-fuel tape hereof. The metal-fuel zone identifying indicia 80 along the edge of the tape is then read by an optical data reader 38 realized using optical techniques (e.g. laser scanning bar code symbol readers, or optical decoders). In the illustrative embodiment, the digital data representative of these unique zone identifying codes is produced for recording in an information storage structure, as shown in FIG. 2A16, which is created for each metal-fuel zone identified along the tape by tape data reader 38 of the Data Capture and Processing Subsystem 277. Preferably, such information storage is realized by data writing operations carried out by the Data Capture and Processing and Subsystem 277 within the Metal-Fuel Tape Discharging Subsystem 6 during the discharge operations.

According to a second method of data recording shown in FIG. 2A9', a unique digital "zone identifying" code 83 is magnetically recorded in a magnetic data track 84 disposed along the edge of each zone or subsection 85 of the metal-fuel tape 5'. The position of the code should coincide with the particular metal-fuel zone to which it relates. This magnetic data track, with zone identifying codes recorded therein, can be formed at the time of manufacture of the multi-track metal-fuel tape hereof. The zone identifying indicia along the edge of the tape is then read by a magnetic reading head 38' realized using magnetic information reading techniques well known in the art. In the illustrative embodiment, the digital data representative of these unique zone identifying codes is produced for recording in an information storage structure, as shown in FIG. 2A16, created for each metal-fuel zone identified along the tape by the data reader 38'. Preferably, such information storage is realized by data writing operations carried out by the Data Capture and Processing and Subsystem 277 within the Metal-Fuel Tape Discharging Subsystem 6 during the discharge operations.

According to a third method of data recording shown in FIG. 2A9", a unique digital "zone identifying" code is recorded as a sequence of light transmission apertures 86 formed in an optically opaque data track 87 disposed along the edge of each zone or subsection 88 of the metal-fuel tape 5". In this aperturing technique, information is encoded in the form of light transmission apertures whose relative spacing and/or width is the means by which information encoding is achieved. The position of the code (i.e. unique identification number or address) should spatially coincide with the particular metal-fuel zone to which it relates. This optical data track, with zone identifying codes recorded therein, can be formed at the time of manufacture of the multi-track metal-fuel tape hereof. The zone identifying indicia 86 along the edge of the tape is then read by an optical sensing head 38" realized using optical sensing techniques well known in the art. In the illustrative embodiment, the digital data representative of these unique zone identifying codes is produced for recording in an information storage structure, as shown in FIG. 2A16, created for each metal-fuel zone identified along the tape by the data reader 38". Preferably, such information storage is realized by data writing operations carried out by the Data Capture and Processing and Subsystem 277 within the Metal-Fuel Tape Discharging Subsystem 6 during the discharge operations.

According to a fourth alternative method of data recording, both unique digital "zone identifying" code and discharge parameters for each identified metal-fuel zone are recorded in a magnetic, optical, or apertured data track, realized as a strip attacked to and extending along the edge of the metal-fuel tape of the present invention. The block of information pertaining to a particular zone or subsection of metal-fuel, schematically indicated in FIG. 2A16, can be recorded in the data track physically adjacent the related metal-fuel zone facilitating easily access of such recorded information during the Recharging Mode of operation. Typically, the block of information will include the metal-fuel zone identification number and a set of discharge parameters detected by the Data Capture and Processing Subsystem 275 as the metal-fuel zone is transported through the discharging head assembly 9.

The first and second data recording methods described above have several advantages over the third method described above. In particular, when using the first and second methods, the data track provided alone the metal-fuel tape can have a very low information capacity. This is because very little information needs to be recorded to tag each metal-fuel zone with a unique identifier (i.e. address number or zone identification number), to which sensed tape discharge parameters are recorded in the Metal-Fuel Database Management Subsystem 275. Also, formation of a data track in accordance with the first and second methods should be very inexpensive, as well as providing apparatus for reading zone identifying information recorded along such data tracks.

Discharging Power Regulation Subsystem within the Metal-Fuel Tape Discharging Subsystem As shown in FIGS. 2A31,2A32 and 2A4, the input port of the discharging power regulation subsystem 40 is operably connected to the output port of the cathode-anode output terminal configuration subsystem 25, whereas the output port of the discharging power regulation subsystem 40 is operably connected to the input port of the electrical load 12. While the primary function of the discharging power regulation subsystem 40 is to regulate the electrical power delivered the electrical load during its Discharging Mode of operation, the discharging power regulation subsystem can also regulate the output voltage across the electrical load, as well as the electrical current flowing across the cathode-electrolyte interface during discharging operations. Such control functions are managed by the system controller 18 and can be programmably selected in a variety of ways in order to achieve optimal discharging of multi-tracked and single-tracked metal-fuel tape according to the present invention while satisfying dynamic loading requirements.

The discharging power regulating subsystem of the first illustrative embodiment can be realized using solid-state power, voltage and current control circuitry well known in the power, voltage and current control arts. Such circuitry can include electrically-programmable power switching circuits using transistor-controlled technology, in which a current-controlled source is connectable in electrical series with electrical load 12 in order to control the electrical current therethrough in response to control signals produced by the system controller carrying out a particular Discharging Power Control Method. Such electrically-programmable power switching circuits can also include transistor-controlled technology, in which a voltage-controlled source is connectable in electrical parallel with the electrical load in order to control the output voltage therethrough in response to control signals produced by the system controller. Such circuitry can be combined and controlled by the system controller 12 in order to provide constant power control across the electrical load.

In the illustrative embodiment of the present invention, the primary function of the discharging power regulation subsystem 40 is to carry out real-time power regulation to the electrical load using any one of the following Discharge Power Control (i.e. Regulation) Methods, namely: (1) a Constant Output Voltage/Variable Output Current Method, wherein the output voltage across the electrical load is maintained constant while the current is permitted to vary in response to loading conditions: (2) a Constant Output Current/Variable Output Voltage Method, wherein the current into the electrical load is maintained constant while the output voltage thereacross is permitted to vary in response to loading conditions, (3) a Constant Output Voltage/Constant Output Current Method, wherein the voltage across and current into the load are both maintained constant in response to loading conditions; (4) a Constant Output Power Method, wherein the output power across the electrical load is maintained constant in response to loading conditions; (5) a Pulsed Output Power Method, wherein the output power across the electrical load is pulsed with the duty cycle of each power pulse being maintained in accordance with preset conditions; (6) a Constant Output Voltage/Pulsed Output Current Method, wherein the output current into the electrical load is maintained constant while the current into the load is pulsed with a particular duty cycle; and (7) a Pulsed Output Voltage/Constant Output Current Method, wherein the output power into the load is pulsed while the current thereinto is maintained constant.

In the preferred embodiment of the present invention, each of the seven (7) Discharging Power Regulation Methods are preprogrammed into ROM associated with the system controller 18. Such power regulation methods can be selected in a variety of different ways, including, for example, by manually activating a switch or button on the system housing, by automatically detection of a physical, electrical, magnetic or optical condition established or detected at the interface between the electrical load 12 and the Metal-Fuel Tape Discharging Subsystem 6.

Input/Output Control Subsystem within the Metal-Fuel Tape Discharging Subsystem

In some applications, it may be desirable or necessary to combine two or more FCB systems or their Metal-Fuel Tape Discharging Subsystems in order to form a resultant system with functionalities not provided by such subsystems operating alone. Contemplating such applications, the Metal-Fuel Tape Discharging Subsystem 6 hereof includes an Input/Output Control Subsystem 41 which allows an external system (e.g. microcomputer or micro-controller) to override and control aspects of the Metal-Fuel Tape Discharging Subsystem 6 as if its system controller were carrying out such control functions. In the illustrative embodiment, the Input/Output Control Subsystem 41 is realized as a standard IEEE I/O bus architecture which provides an external and/or remote computer system with a way and means of directly interfacing with the system controller 18 of the Metal-Fuel Tape Discharging Subsystem 6 and managing various aspects of system and subsystem operation in a straightforward manner.

System Controller within the Metal-Fuel Tape Discharging Subsystem

As illustrated in the detailed description set forth above, the system controller 18 performs numerous operations in order to carry out the diverse functions of the FCB system within its Discharging Mode. In the preferred embodiment of the FCB system of FIG. 1, the system controller 18 is realized using a programmed micro-controller having program and data storage memory (e.g. ROM, EPROM, RAM and the like) and a system bus structure well known in the microcomputing and control arts. In any particular embodiment of the present invention, it is understood that two or more microcontrollers may be combined in order to carry out the diverse set of functions performed by the FCB system hereof. All such embodiments are contemplated embodiments of the system of the present invention.

Discharging Metal-Fuel Tape within the Metal-Fuel Tape Discharging Subsystem

FIG. 2A5 sets forth a high-level flow chart describing the basic steps of discharging metal-fuel tape (i.e. generating electrical power therefrom) using the Metal-Fuel Tape Discharging Subsystem shown in FIGS. 2A31,2A32 through 2A4.

As indicated at Block A, the user places (i.e. inserts) a supply of unoxidized metal-fuel tape into the cartridge receiving port of the system housing so that the tape path-length expansion mechanism 8 is adjacent the metal-fuel tape ready for discharge within the Metal-Fuel Tape Discharging Subsystem.

As indicated at Block B, the path-length expansion mechanism within the Metal-Fuel Tape Discharging Subsystem increases the path-length of the metal-fuel tape over the increased path-length region thereof, as shown in FIGS. 2A31,2A32 and 2A4.

As indicated at Block C, the Discharge Head Transport Subs„stem 6 arranges the discharging heads about the metal-fuel tape over the expanded path-length of the Metal-Fuel Tape Discharging Subsystem so that the ionically-conducting medium is disposed between each cathode structure and the adjacent metal-fuel tape.

As indicated at Block D, the Discharge Head Transport Subsystem 6 then configured each discharging head so that its cathode structure is in ionic contact with a portion of the path-length extended metal-fuel tape and its anode contacting structure is in electrical contact therewith.

As indicated at Block E, the cathode-anode output terminal configuration subsystem 25 automatically configured the output terminals of the cathode-anode structures of each discharging head arranged about the path-length extended metal-fuel tape, and then the system controller 18 controls the Metal-Fuel Card Discharging Subsystem 6 so that electrical power is generated and supplied to the electrical load at the required output voltage. When all or a substantial portion of the metal-fuel tape has been discharged, then the Cartridge Loading/Unloading Subsystem 2 can be programmed to automatically eject the metal-fuel tape cartridge for replacement with a cartridge containing recharged metal-fuel tape.

Metal-Fuel Tape Recharging Subsystem for the First Illustrative Embodiment of the Metal-Air FCB System of the Present Invention As shown in FIGS. 2B31,2B32 and 2B4, the metal-fuel tape recharging subsystem 7 of the first illustrative embodiment comprises a number of subsystems, namely: an assembly of multi-track metal-oxide reducing (i.e. recharging) heads 11, each having multi-element cathode structures and anode-contacting structures with electrically-conductive input terminals connectable in a manner to be described hereinbelow; an assembly of metal-oxide sensing heads 23' for sensing the presence of metal-oxide formation along particular zones of metal fuel tracks as the metal fuel tape is being transported past the recharging heads during the Recharging Mode; a metal-fuel tape path-length extension mechanism 10, as schematically illustrated in FIGS. 2B1 and 2B2 and described above, for extending the path-length of the metal-fuel tape over a particular region of the cassette device 5, and enabling the assembly of multi-track metal-oxide reducing heads to be arranged thereabout during the Recharging Mode of operation; a recharging head transport subsystem 24' for transporting the subcomponents of the recharging head assembly 11 (and the metal-oxide sensing head assembly 23' to and from the metal-fuel tape when its path-length is arranged in an extended configuration by the metal-fuel tape path-length extension mechanism 11; an input power supply subsystem 90 for converting externally supplied AC power signals into DC power supply signals having voltages suitable for recharging metal-fuel tracks being transported through the recharging heads of the Metal-Fuel Tape Recharging Subsystem; a cathode-anode input terminal configuration subsystem 91, for connecting the output terminals (port) of the input power supply subsystem 90 to the input terminals (port) of the cathode and anode-contacting structures of the recharging heads 11, under the control of the system controller 18' so as to supply input voltages thereto for electro-chemically converting metal-oxide formations into its primary metal during the Recharging Mode; a cathode-anode voltage monitoring subsystem 26', connected to the cathode-anode input terminal configuration subsystem 91, for monitoring (i.e. sampling) the voltage applied across cathode and anode of each recharging head, and producing (digital) data representative of the sensed voltage level; a cathode-anode current monitoring subsystem 27', connected to the cathode-anode input terminal configuration subsystem 91, for monitoring (e.g. sampling) the current flowing across the cathode-electrolyte interface of each recharging head during the Recharging Mode, and producing digital data signals representative of the sensed current levels; a cathode oxygen pressure control subsystem comprising the system controller 18', solid-state $pO_2$ sensors 28', vacuum chamber (structure) 29' shown in FIGS. 2B7 and 2B8, vacuum pump 30', electronically-controlled airflow control device 31', manifold structure 32', and multi-lumen tubing 33' shown in FIGS. 2B8, for sensing and controlling the $pO_2$ level within each channel of the cathode structure of each recharging head 11; a metal-fuel tape speed control subsystem comprising the system controller 18', motor drive circuits 21A and 21B, and tape velocity (i.e. speed and direction) sensor/detector 22', for bi-directionally controlling the velocity of metal-fuel tape relative to the recharging heads 11, in the forward and reverse tape directions; an ion-concentration control subsystem comprising the system controller 18', solid-state moisture sensor 34', moisturizing (e.g. humidifying or wicking element) 35', for sensing and modifying conditions within the FCB system (e.g. the relative humidity at the cathode-electrolyte interface of the discharging heads) so that the ion-concentration at the cathode-electrolyte interface is maintained within an optimal range during the Recharge Mode of operation; recharge head temperature control subsystem comprising the system controller 18', solid-state temperature sensors (e.g. thermistors) 271' embedded within each channel of the multi-cathode support structure hereof, and a discharge head cooling: device 272', responsive to control signals produced by the system controller 18', for lowering the temperature of each recharging channel to within an optimal temperature range during recharging operations; a relational-type Metal-Fuel Database Management Subsystem (MRDMS) 280 operably connected to system controller 18' by way of local bus 281, and designed for receiving particular types of information derived from the output of various subsystems within the Metal-Fuel Tape Recharging Subsystem 7; a Data Capture and Processing Subsystem (DCPS) 282, comprising data reading head 38' embedded within or mounted closely to the cathode support structure of each recharging head 11, metal-oxide sensing head assembly 23' and associated circuitry, and a programmed microprocessor-based data processor adapted to receive data signals produced from voltage monitoring subsystem 26', current monitoring subsystem 27', metal-oxide sensing head assembly 23', the tape velocity control subsystem, the cathode oxygen pressure control subsystem, and the ion-concentration control subsystem hereof, and enable (i) the reading of metal-fuel zone identification data from transported metal-fuel tape 5, (ii) the recording of sensed discharge parameters and computed metal-oxide indicative data derived therefrom in the Metal-Fuel Database Management Subsystem (MFDMS) 280 using local system bus 283, and (iii) the reading of prerecorded recharge parameters and prerecorded metal-fuel indicative data stored in the Metal-Fuel Database Management Subsystem 280 using local system bus 281: an input (i.e. recharging) power regulation subsystem 92 connected between the output terminals (i.e. port) of the input power supply subsystem 90 and the input terminal (i.e. port) of the cathode-anode input terminal configuration subsystem 91, for regulating the input power (and voltage and/or current characteristics) delivered across the cathode and anode structures of each metal-fuel track being recharged during the Recharging Mode; an input/output control subsystem 41', interfaced with the system controller 18', for controlling all functionalities of the FCB system by way of a remote system or resultant system, within which the FCB system is embedded; and system controller 18' for managing the operation of the above mentioned subsystems during the various modes of system operation. These subsystems will be described in greater technical detail below.

Multi-Track Recharging Head Assembly within the Metal-Fuel Tape Recharging Subsystem The function of the assembly of multi-track recharging heads 11 is to electro-chemically reduce metal-oxide formations along the tracks of metal-fuel tape transported through the recharging head assembly 11 during the Recharging Mode of operation. In the illustrative embodiment, each recharging head 11 comprises: a cathode element support plate 42 having a plurality of isolated channels 43'permitting the free passage of oxygen ($O_2$) through the bottom portion 44' of each such channel: a plurality of electrically-conductive cathode elements (e.g. strips) 45A' through 45E' for insertion within the lower portion of these channels, respectively: a plurality of electrolyte-impregnated strips 46A' through 46E' for placement over the cathode strips 45A' through 45E', respectively, and support within the channels 44' as shown in FIG. 2B6; and an oxygen-evacuation chamber 29' mounted over the upper (back) surface of the cathode element support plate 42', in a sealed manner, as shown in FIG. 2B7.

As shown in FIGS. 2B31,2B32 and 2B4, each oxygen-evacuation chamber 29' has a plurality of subchambers 29A' through 29E' physically associated with recessed channels 154A' and 154E', respectively. Each vacuum subchamber 29A' through 29E' is isolated from all other subchambers and is in fluid communication with one channel supporting a cathode element and electrolyte-impregnated element. As shown, each subchamber 29A' through 29E' is arranged in fluid communication with a vacuum pump 30' via multi-lumen tubing 38', manifold assembly 32' and electronically-controlled air-flow switch 31', each of whose operation is controlled by system controller 18'. This arrangement enables the system controller 18' to maintain the $pO_2$ level in each subchamber within an optimal range during recharging operations by selectively evacuating air from subchamber through the corresponding air flow channel in the manifold assembly 32'.

In the illustrative embodiment, electrolyte-impregnated strips within the recharging head assembly 11 are realized by impregnating an electrolyte-absorbing carrier medium with a gel-type electrolyte. Preferably, the electrolyte-absorbing carrier strip is realized as a strip of low-density, open-cell foam material made from PET plastic. The gel-electrolyte for each discharging cell is made from a formula consisting of an alkali solution (e.g. KOH), a gelatin material, water, and additives known in the art.

In the illustrative embodiment, each cathode strip is made from a sheet of nickel wire mesh 47' coated with porous carbon material and granulated platinum or other catalysts 48' to form a cathode suitable for use in metal-air FCB systems. Details of cathode construction are disclosed in U.S. Pat. Nos. 4,894,296 and 4,129,633, incorporated herein by reference. To form a current collection pathway, an electrical conductor 49" is soldered to the underlying wire mesh sheet of each cathode strip. As shown in FIG. 2B7, each electrical conductor 49' is passed through a small hole 50' formed in the bottom surface of a channel of the cathode support plate, and is connected to the cathode-anode input terminal configuration subsystem 91. As shown, the cathode strip pressed into the lower portion of the channel to secure the same therein. As shown in FIG. 2B7, the bottom surface of each channel 43 has numerous perforations 43A formed therein to allow the evacuation of oxygen away from the cathode-electrolyte interface, and out towards the vacuum pump 30'. In the illustrative embodiment, an electrolyte-impregnated strip 46A' through 46E' is placed over a cathode strip 45A' through 45E' and is secured within the upper portion of the cathode supporting channel 43'. As shown in FIG. 2B8, when the cathode strip and thin electrolyte strip are mounted in their respective channel in the cathode support plate 42', the outer surface of the electrolyte-impregnated strip is disposed flush with the upper surface of the plate defining the channels, thereby permitting metal-fuel tape to be smoothly transported thereover during tape recharging operations.

Hydrophobic agents are added to the carbon material constituting the cathode elements within the recharging head assembly 11, to ensure the expulsion of water from the oxygen-pervious cathode elements. Also, the interior surfaces 44 of the cathode support channels are coated with a hydrophobic film (e.g. PTFE) 51' to ensure the expulsion of water within electrolyte-impregnated strips 47' and thus achieve optimum oxygen transport across the cathode strips during the Recharging Mode. Preferably, the cathode support plate is made from an electrically nonconductive material, such as polyvinyl chloride (PVC) plastic material well known in the art. The cathode support plate and evacuation chamber can be fabricated using injection molding technology also well known in the art.

In order to sense the partial oxygen pressure within the cathode structure during the Recharging Mode, for use in effective control of metal-oxide reduction within the recharging heads, a solid-state $pO_2$ sensor 28' is embedded within each channel of the cathode support plate 42', as illustrated in FIG. 2B7, and operably connected to the Data Capture and Processing Subsystem 282 as an information input device thereto. Data signals produced by the $pO_2$ sensors are received by the Data Capture and Processing Subsystem 282, converted into an appropriate format and then recorded within the information structure shown in FIG. 2B16, maintained by the Metal-Fuel Database Management Subsystem 280. The system controller 18' has access to such information stored in the Database Management Subsystem by way of local system bus 281, as shown in FIGS. 2B31,2B32 and 2B4.

In the illustrative embodiment, each $pO_2$ sensor can be realized using well-known $pO_2$ sensing technology employed to measure (in vivo) $pO_2$ levels in the blood of humans. Such prior art sensors can be constructed using miniature diodes which emit electromagnetic radiation at different wavelengths that are absorbed at different levels in the presence of oxygen in the blood, and such information can be processed and analyzed to produce a computed measure of $pO_2$ in a reliable manner, as taught in U.S. Pat. No. 5,190,038 and references cited therein, each being incorporated herein by reference. In the present invention, the characteristic wavelengths of the light emitting diodes can be selected so that similar sensing functions are carried out within the structure of the cathode in each recharging head, in a straightforward manner.

In FIG. 2B9, there is shown a section of multi-tracked fuel tape that has undergone partial discharge and thus has metal-oxide formations along the metal-fuel tracks thereof. Notably, this section of partially-discharged metal-fuel tape is contained within the cassette fuel cartridge shown in FIG. 1 and requires recharging within the Metal-Fuel Tape Recharging Subsystem 7 while its cassette device is received within the cassette storage bay of the FCB system.

In FIG. 2B10, an exemplary metal-fuel (anode) contacting structure 58' is disclosed for use with the cathode structure shown in FIGS. 2B7 and 2B8. As shown, a plurality of electrically conductive elements 60A through 60E' are supported from an platform 61' disposed adjacent the travel of the fuel tape within the cassette cartridge. Each conductive element 60A' through 60E' has a smooth surface adapted for slidable engagement with one track of metal fuel through the fine groove formed in the base layer of the fuel tape, corresponding to the fuel track. Each conductive element is connected to an electrical conductor which is connected to the output port of the cathode-anode input terminal configuration subsystem 91. The platform 61' is operably associated with the recharging head transport subsystem 24' and can be designed to be moved into position with the metal-fuel tape during the Recharging Mode of the system, under the control of the system controller.

Notably, the use of multiple recharging heads, as shown in the illustrative embodiments hereof, rather than a single recharging head, allows discharged metal-fuel tape to be recharged more quickly using lower recharging currents, thereby minimizing heat build-up across the individual recharging heads. This feature of the Metal-Fuel Tape Recharging Subsystem 7 extends the service-life of the cathodes employed within the recharging heads thereof.

Metal-Oxide Sensing Head Assembly within the Metal-Fuel Tape Recharging Subsystem The function of the Metal-Oxide Sensing Head Assembly 23' within the Metal-Fuel Tape Recharging Subsystem 7 is to sense (in real-time) the current levels produced across the individual fuel tracks during recharging operations, and generate electrical signals indicating the degree to which portions of metal-fuel tracks have been oxidized and thus require metal-oxide reduction. As shown in FIGS. 2B15, each multi-track metal-oxide sensing head 23' in the assembly thereof comprises a number of subcomponents, namely: a positive electrode support structure 63' for supporting a plurality of positively electrode elements 64A' through 64E', each in registration with the upper surface of one of the fuel tracks (that may have been oxidized) and connected to a low-voltage power supply terminal 59A, 59B, 59C, 59D and 59E provided by current sensing circuitry 66 which is operably connected to the Data Capture and Processing Subsystem 282 within the Metal-Fuel Tape Recharging Subsystem 7, as shown in FIGS. 2B31,2B32 and 2B4, and a negative electrode support structure 67 for supporting a plurality of negative electrode elements 68A' through 68E', each in registration with the lower surface of the metal-fuel tracks and connected to a low voltage power supply terminal 69A through 69E provided by current sensing circuitry 66.

In the illustrative embodiment shown in FIGS. 2B31, 2B32 and 2B4, each multi-track metal-oxide sensing head 23' is disposed immediately before a recharging head 11 in order to sense the actual condition of the metal-fuel tape therebefore and provide a signal to the system controller 18' for detection and determination of the amount (or percentage) of metal-oxide present thereon before recharging. While only one metal-oxide sensing head assembly 23' is shown in the first illustrative embodiment of the FCB system hereof, it is understood that for bi-directional tape-based FCB systems, it would be preferred to install one assembly on each end of the recharging head assembly so that the system controller 18' can "anticipate" which metal-fuel zones are fully charged, partially discharged or completely discharged, regardless of the direction that the metal-fuel tape is being transported at any particular instant in time.

With this arrangement, the Metal-Fuel Tape Recharging Subsystem 7 is capable of actually determining which portions of which metal fuel tracks require metal-oxide reducing during recharging operations. Such information gathering can be carried out using current sensing circuitry 66' which automatically applies a test voltage ($v_{acr}$) across each metal-fuel track during the Recharge Mode, to measure the response current ($i_{acr}$). Such parameters are provided as input to the Data Capture and Processing Subsystem 282. This subsystem then processes this captured data in one or more ways to determine the presence of metal-oxide formations. For example, this subsystem can compare the detected response current value against a threshold current value stored within the Metal-Fuel Database Management Subsystem 280. Alternatively, the subsystem may compute the ratio $v_{acr}/i_{acr}$ to determine a measure of electrical resistance for the cell and compare this measure with a reference threshold value to determine whether there is high electrical resistance across the cell and thus large metal-oxide formations therealong. This data is stored in the Metal-Fuel Database Management Subsystem 280 and is accessible by the system controller 18' any time during recharging operations. The various ways in which the system controller 18' may respond to real-time analysis of data within the Metal-Fuel Database Management Subsystem 280 will be described in greater detail hereinafter.

Metal-Fuel Tape Path-Length Extension Mechanism within the Metal-Fuel Tape Recharging Subsystem As shown in FIGS. 2B31,2B32 and 2B4, the tape path-length extension mechanism 10 of the illustrative embodiment comprises: a first array of rollers 71A' through 71E' mounted upon support structure 72', for contacting the metal-fuel portion of the metal-fuel tape when the cassette device 3 inserted into the cassette receiving port of the FCB system; a second array of rollers 73A' through 73D, disposed between the array of stationary rollers 71A' through 71E', for contacting the base portion of the metal-fuel tape 5 when the cassette device 3 is inserted into the cassette receiving port of the FCB system, and a transport mechanism 75' of the electro-mechanical construction, for transporting roller support structures 72 and 74 relative to the system housing and each other, in order to carry out the functions of this subsystem described in greater detail hereinbelow. Notably, these roller arrays 71A' through 71E' can be arranged to either the left of right of the roller arrays 73A' through 73E' of the tape-path extension mechanism provided for the Metal-Fuel Tape Discharging Subsystem 7. Alternatively, in other embodiments of the present invention, it may be desirable to employ a single tape path-length extension mechanism for use with the discharging heads of the Metal-Fuel Tape Discharging Subsystem and the recharging heads of the Metal-Fuel Tape Recharging Subsystem.

In the configuration shown in FIGS. 2B31 and 2B32 the tape path-length mechanism 10 for the Metal-Fuel Tape Recharging Subsystem is arranged so that the first and second sets of rollers 71A' through 71E' and 73A' through 73E' barely contact opposite sides of the metal-fuel tape when the cassette device 3 is inserted within the cassette receiving port of the FCB system. As shown in FIG. 2B4, the second set of rollers 73A' through 73E' are displaced a distance relative to the first set of stationary rollers 71A' through 71E', thereby causing the path-length of the metal-fuel tape to become substantially extended from the path-length shown in the configuration of FIGS. 2A31 and 2A32. This extended path-length permits a plurality of recharging heads 11 to be arranged thereabout during the recharging mode of operation. In this configuration, the cathode structure 76' of each recharging head 11 is in ionic contact with the metal-fuel structures along the metal-fuel tape, while the anode-contacting structure 77' of each recharging head is in electrical contact with the metal-fuel structures of the tape. In this configuration, the metal-fuel tape is arranged so that a plurality of recharging heads 11 can be arranged about the metal-fuel tape during tape recharging operations. The use of multiple recharging heads enables recharging of metal-fuel tape using lower electrical currents and thus providing improved control over the metal-oxide conversion during tape recharging. Such advantages will become apparent hereinafter.

Recharging Head Transport Subsystem within the Metal-Fuel Tape Recharging Subsystem The primary function of the recharging head transport subsystem is to transport the assembly of recharging heads 11 (and metal-oxide sensing heads 23' supported thereto) about the metal-fuel tape that has been path-length extended, as shown in FIGS. 2B31 and 2B432. When properly transported, the cathode and anode-contacting structures of the recharging heads are brought into "ionically-conductive" and "electrically-conductive" contact with the metal-fuel tracks of metal-fuel tape while it transported through the recharging head assembly during the Recharging Mode.

The recharging head transport subsystem 24' can be realized using any one of a variety of electro-mechanical mechanisms capable of transporting the cathode structure 76' and anode-contacting structure 77' of each recharging head away from the metal-fuel tape 5, as shown in FIGS. 2B31 and 2B32, and about the metal-fuel tape as shown in FIG. 2B4. As shown, these transport mechanisms are operably connected to system controller 18' and controlled by the same in accordance with the system control program carried out thereby.

Input Power Supply Subsystem within the Metal-Fuel Tape Recharging Subsystem In the illustrative embodiment, the primary function of the Input Power Supply Subsystem 90 is to receive as input, standard alternating current (AC) electrical power (e.g. at 120 or 220 Volts) through an insulated power cord, and to convert such electrical power into regulated direct current (DC) electrical power at a regulated voltage required at the recharging heads of the Metal-Fuel Tape Recharging Subsystem 7 during the recharging mode of operation. For zinc anodes and carbon cathodes, the required "open-cell" voltage $v_{ac}$ across each anode-cathode structure during recharging is about 2.2–2.3 Volts in order to sustain electrochemical reduction. This subsystem can be realized in various ways using AC-DC and DC-DC power conversion and regulation circuitry well known in the art.

Cathode-Anode Input Terminal Configuration Subsystem within the Metal-Fuel Tape Recharging Subsystem As shown in FIGS. 2B31,2B32 and 2B4, the cathode-anode input terminal configuration subsystem 91 is connected between the output terminals of the input power regulation subsystem 90 and the input terminals of the cathode-anode pairs associated with multiple tracks of the recharging heads 11. The system controller 18 is operably connected to cathode-anode input terminal configuration subsystem 91 in order to supply control signals thereto for carrying out its functions during the Recharge Mode of operation.

The primary function of the cathode-anode input terminal configuration subsystem 91 is to automatically configure (in series or parallel) the input terminals of selected cathode-anode pairs within the recharging heads of the Metal-Fuel Tape Recharging Subsystem 7 so that the required input (recharging) voltage level is applied across cathode-anode structures of metal-fuel tracks requiring recharging. In the illustrative embodiment of the present invention, the cathode-anode input terminal configuration mechanism 91 can be realized as one or more electrically-programmable power switching circuits using transistor-controlled technology, wherein the cathode and anode-contacting elements within the recharging heads 11 are connected to the output terminals of the input power regulating subsystem 92. Such switching operations are carried out under the control of the system controller 18' so that the required output voltage produced by the input power regulating subsystem 92 is applied across the cathode-anode structures of metal-fuel tracks requiring recharging.

Cathode-Anode Voltage Monitoring Subsystem within the Metal-Fuel Tape Recharging Subsystem As shown in FIGS. 2B31, 2B32 and 2B4, the cathode-anode voltage monitoring subsystem 26' is operably connected to the cathode-anode input terminal configuration subsystem 91 for sensing voltage levels across the cathode and anode structures connected thereto. This subsystem is also operably connected to the system controller 18' for receiving control signals therefrom required to carry out its functions. In the first illustrative embodiment, the cathode-anode voltage monitoring subsystem 26' has two primary functions: to automatically sense the instantaneous voltage level applied across the cathode-anode structures associated with each metal-fuel track being transported through each recharging head during the Recharging Mode; and to produce a (digital) data signals indicative of the sensed voltages for detection and analysis by the Data Capture and Processing Subsystem 280, and ultimately response by the system controller 18'.

In the first illustrative embodiment of the present invention, the Cathode-Anode Voltage Monitoring Subsystem 26' can be realized using electronic circuitry adapted for sensing voltage levels applied across the cathode-anode structures associated with each metal-fuel track transported through each recharging head within the Metal-Fuel Tape Recharging Subsystem 7. In response to such detected voltage levels, the electronic circuitry can be designed to produce a digital data signals indicative of the sensed voltage levels for detection, analysis and response at the data signal input of the system controller 18'. As will be described in greater detail hereinafter, such data signals can be used by the system controller to carry out its recharging power regulation method during the Recharging Mode to operation.

Cathode-Anode Current Monitoring Subsystem within the Metal-Fuel Tape Recharging Subsystem As shown in FIGS. 2B31, 2B32 and 2B4, the cathode-anode current monitoring subsystem 27' is operably connected to the cathode-anode input terminal configuration subsystem 18'. The cathode-anode current monitoring subsystem 27' has two primary functions: to automatically sense the magnitude of electrical current flowing through the cathode-anode pair of each metal-fuel track along each recharging head assembly within the Metal-Fuel Tape Recharging Subsystem 11 during the discharging mode; and to produce a digital data signal indicative of the sensed current for detection and analysis by the system controller 18'.

In the first illustrative embodiment of the present invention, the Cathode-Anode Current Monitoring Subsystem 27' can be realized using current sensing circuitry for sensing the electrical current passed through the cathode-anode pair of each metal-fuel track along each recharging head assembly, and producing a digital data signal indicative of the sensed current for detection at the input of the system controller 18'. As will be explained in greater detail hereinafter, these detected current levels can be used by the system controller in carrying out its recharging power regulation method, and well as creating a "recharging condition history" information file for each zone or subsection of recharged metal-fuel tape.

Cathode Oxygen Pressure Control Subsystem within the Metal-Fuel Tape Recharging Subsystem The function of the cathode oxygen pressure control subsystem defined above is to sense the partial oxygen pressure ($pO_2$) (i.e. $O_2$ concentration) *within each channel of the cathode structure in the recharging heads 11, and in response thereto, control (i.e. increase or decrease) the same by regulating the air ($O_2$) pressure within such cathode structures. In accordance with the present invention, partial oxygen pressure ($pO_2$) within each channel of the cathode structure in each recharging head is maintained at an optimal level in order to allow optimal oxygen evacuation from the recharging heads during the Recharging Mode. By lowering the $pO_2$ level within each channel of the cathode structure (by evacuation), metal-oxide along the metal-fuel tape can be completely recovered with optimal use of input power supplied to the recharging heads during the Recharging Mode. Also, by monitoring changes in $pO_2$ and producing digital data signals representative thereof for detection and analysis by the system controller, the system controller is provided with a controllable variable for use in regulating the electrical power supplied to the electrical load during the Recharging Mode. In the first illustrative embodiment of the FCB system hereof shown in FIG. 1, the data signals produced by the solid-state $pO_2$ sensors 28A' through 28E' embodied within the recharging heads 11 are provided to the Data Capture and Processing Subsystem 282, as shown in FIGS. 2B31, 2B32 and 2B4. The Data Capture and Processing Subsystem 282 receives these signals, converts them into digital data and the like and then records the resulting information items within the information structure shown in FIG. 2B16, managed within the Metal-Fuel Database Management Subsystem 280 with the Metal-Fuel Tape Recharging Subsystem 7.

Metal-Fuel Tape Velocity Control Subsystem within the Metal-Fuel Tape Recharging Subsystem In the FCB system shown in FIG. 1, there is the need for only one metal-fuel tape control subsystem to be operative at any instant in time as metal-fuel tape is common to both the Metal-Fuel Tape Discharging Subsystem 6 and the Metal-Fuel Tape Recharging Subsystem 7 during discharging and/or recharging operations. Notwithstanding this fact, the system controllers 18 and 18' associated with these subsystems 6 and 7 can override each other, as required, in order to control the operation of the tape velocity control subsystem within such discharging and recharging subsystem.

For example, during the Recharging Mode, when the Metal-Fuel Tape Discharging Subsystem 6 is inoperative (i.e. no power generation occurring), the function of metal-tape speed control subsystem described hereinabove is to control the speed of the metal-fuel tape over the recharging heads within the metal-fuel tape recharging subsystem 7. In response to signals produced by the tape velocity sensor 22 and in accordance with the recharging power regulation method being carried out by the system controller 18', the system controller 18' automatically controls (i.e. increases or decreases) the speed of the metal-fuel tape relative to the recharging heads by generating appropriate control signals for driving electric motors 19A and 19B coupled to the supply and take-up reels of metal-fuel tape being recharged. The primary reason for controlling the velocity of metal-fuel tape is that, during the Recharging Mode, this parameter determines how much electrical charge can be delivered to each zone or subsection of oxidized metal-fuel tape as it is being transported through each recharging head within the Metal-Fuel Tape Recharging Subsystem 7. Ideally, during the Recharging Mode, it is desirable to transport the metal-fuel tape as fast as possible through the assembly of recharging heads in order to rapidly and completely recharge the metal-fuel tape within the cassette cartridge inserted within the FCB system. In contrast, the Discharge Mode, it will be desirable in many cases to transport the metal-fuel tape as slow as possible to conserve the supply of metal-fuel. In general, for a constant cathode-anode current applied to a recharging head with the requisite cathode-anode recharging voltage (i.e. Constant Input Current/Constant Input Voltage Method), the amount of electrical charge supplied to each zone of metal-fuel tape will decrease as the velocity of the metal-fuel zone is increased relative to the recharging head during the Recharging Mode. This inverse relationship can be explained by the fact that the metal-fuel zone has less time to accumulate electrical charge as it is transported past the recharging head. In such situations, the function of the metal-fuel tape speed control subsystem is to control the velocity of the tape so as to control the speed of the tape and to optimally convert metal-oxide formations along the tape into its primary metal.

In instances where the recharging mode and recharging mode are both operative, it will be desired to enable the system controller 18 to override system controller 18' so that the primary objective of the system is to optimally generate power from the FCB system. In other instances, however, where the primary objective of the FCB system is to optimally recharge the metal-fuel tape in a rapid manner, the system controller 18' of the Recharging Subsystem 7 will override the system controller 18 of the Discharging Subsystem 6, and thus control the velocity of the metal-fuel tape within the FCB system.

Ion-Concentration Control Subsystem within the Metal-Fuel Tape Recharging Subsystem To achieve high-energy efficiency during the Recharging Mode, it is necessary to maintain an optimal concentration of (charge-carrying) ions at the cathode-electrolyte interface of each recharging head within the Metal-Fuel Tape Recharging Subsystem 7. Also, the optimal ion-concentration within the Metal-Fuel Tape Recharging Subsystem 7 may be different than that required within the Metal-Fuel Tape Discharging Subsystem 6. For this reason, in particular applications of the FCB system hereof, it may be desirable and/or necessary to provide a separate ion-concentration control subsystem within the Metal-Fuel Tape Recharging Subsystem 7. The primary function of such an ion-concentration control subsystem would be to sense and modify conditions within the FCB system so that the ion-concentration at the cathode-electrolyte interface of the recharging heads is maintained within an optimal range during the Recharging Mode of operation.

In the illustrative embodiment of such a subsystem, ion-concentration control is achieved by embedding a miniature solid-state hydrometer (or moisture sensor) 34' within the FCB system (as close as possible to the anode-cathode interfaces of the recharging heads) in order to sense moisture conditions and produce a digital data signal indicative thereof. This digital data signal is supplied to the Data Capture and Processing Subsystem 282 for detection and analysis. In the event that the moisture-level or relative humidity drops below the predetermined threshold value set in the Metal-Fuel Database Management Subsystem 280, the system controller automatically generate a control signal supplied to a moisturizing element 35' realizable, for example, by a wicking device 36' arranged in contact with the metal-fuel tracks of the metal-fuel tape being transported during the Recharging Mode. Another technique may involve spraying fine water droplets (e.g. ultra-fine mist) from micro-nozzles realized along the top surfaces of each cathode support structure, facing the metal-fuel tape during transport. Such operations will increase the moisture-level or relative humidity within the interior of the recharging head (or system housing) and thus ensure that the concentration of KOH within the electrolyte within electrolyte-impregnated strips is optimally maintained for ion transport and thus metal-oxide reduction during tape recharging operations.

Recharging Head Temperature Control Subsystem within the Metal-Fuel Tape Recharging Subsystem As shown in FIGS. 2B31,2B32, 2B4, and 2B7, the Recharge Head Temperature Control Subsystem incorporated within the Metal-Fuel Tape Recharging Subsystem 6 of the first illustrative embodiment comprises a number of subcomponents, namely: the system controller 18'; solid-state temperature sensors (e.g. thermistors) 271' embedded within each channel of the multi-cathode support structure hereof, as shown in FIG. 2B7; and a discharge head cooling device 272', responsive to control signals produced by the system controller 18', for lowering the temperature of each discharging channel to within an optimal temperature range during discharging operations. The recharge head cooling device 272' can be realized using a wide variety of heat-exchanging techniques, including forced-air cooling, water-cooling, and/or refrigerant cooling, each well known in the heat exchanging art. In some embodiments of the present invention, where high levels of electrical power are being generated, it may be desirable to provide a jacket-like structure about each recharging head in order to circulate air, water or refrigerant for temperature control purposes.

Data Capture and Processing Subsystem within the Metal-Fuel Tape Recharging Subsystem In the illustrative embodiment of FIG. 1, Data Capture And Processing Subsystem (DCPS) 282 shown in FIGS. 2B31,2B32 and 2B4 carries out a number of functions, including, for example: (1) identifying each zone or subsection of metal-fuel tape immediately before it is transported through each recharging head within the recharging head assembly and producing metal-fuel zone identification data representative thereof; (2) sensing (i.e. detecting) various "recharge parameters" within the Metal-Fuel Tape Recharging Subsystem existing during the time period that the identified metal-fuel zone is transported through the recharging head assembly thereof; (3) computing one or more parameters, estimates or measures indicative of the amount of metal-oxide produced during tape recharging operations, and producing "metal-oxide indicative data" representative of such computed parameters, estimates and/or measures; and (4) recording in the Metal-Fuel Database Management Subsystem 280 (accessible by system controller 18'), sensed recharge parameter data as well as computed metal-oxide indicative data both correlated to its respective metal-fuel zone identified during the Recharging Mode of operation. As will become apparent hereinafter, such recorded information maintained within the Metal-Fuel Database Management Subsystem 280 by Data Capture and Processing Subsystem 282 can be used by the system controller 18' in various ways including, for example: optimally recharging partially or completely oxidized metal-fuel tape in a rapid manner during the Recharging Mode of operation.

During recharging operations, the Data Capture and Processing Subsystem 282 automatically samples (or captures) data signals representative of "recharge parameters" associated with the various subsystems constituting the Metal-Fuel Tape Recharging Subsystem 7 described above. These sampled values are encoded as information within the data signals produced by such subsystems during the Recharging Mode. In accordance with the principles of the present invention, tape-type "recharge parameters" shall include, but are not limited to: the voltages supplied across the cathode and anode structures along particular metal-fuel tracks monitored, for example, by the cathode-anode voltage monitoring subsystem 26'; the electrical response currents flowing across the cathode and anode structures along particular metal-fuel tracks monitored, for example, by the cathode-anode current monitoring subsystem 27': the velocity (i.e. speed and direction) of the metal-fuel tape during recharging of a particular zone of metal-fuel tape, monitored by the metal-fuel tape speed control subsystem; the oxygen saturation (i.e. concentration) level ($pO_2$) within the cathode structure of each recharging head, monitored by the cathode oxygen pressure control subsystem (28',30',31',18'); the moisture ($H_2O$) level (or relative humidity) level across or near the cathode-electrolyte interface along particular metal-fuel tracks in particular recharging heads monitored, for example, by the ion-concentration control subsystem (18', 34', 35' and 36'); and the time duration ($\Delta T$) of the state of any of the above-identified recharge parameters.

In general, there a number of different ways in which the Data Capture and Processing Subsystem 282 can record tape-type "recharge parameters" during the Recharging Mode of operation. While these methods are similar to those employed during the recording of discharging parameters, such methods will be detailed hereinbelow for sake of completion.

According to a first method of data recording shown in FIG. 2B9, zone identifying code or indicia 80 (e.g. miniature bar code symbol encoded with zone identifying information) graphically printed on "optical" data track 81, can be read by optical data reader 38 realized using, optical techniques (e.g. laser scanning bar code symbol readers, or optical decoders). In the illustrative embodiment, the digital data representative of these unique zone identifying codes is produced for recording in an information storage structure, as shown in FIG. 2B16, which is created for each metal-fuel zone identified along the tape by data reader 38 of the Data Capture and Processing Subsystem 282. Preferably, such information storage is realized by data writing operations carried out by the Data Capture and Processing and Subsystem within the Metal-Fuel Database Management Subsystem 280 during the recharging operations.

According to a second method of data recording shown in FIG. 2B9', digital "zone identifying" code 83 magnetically recorded in a magnetic data track 84', can be read by optical data reader 38' realized using magnetic sensing techniques well known in the mag-stripe reading art. In the illustrative embodiment, the digital data representative of these unique zone identifying codes is produced for recording in an information storage structure, as shown in FIG. 2B16, which is created for each metal-fuel zone identified along the tape by data reader 38' of the Data Capture and Processing Subsystem 282. Preferably, such information storage is realized by data writing operations carried out by the Data Capture and Processing and Subsystem within the Metal-Fuel Database Management Subsystem 280 during the recharging operations.

According to a third method of data recording shown in FIG. 2B9", digital "zone identifying" code recorded as a sequence of light transmission apertures 86 in optically opaque data track 87, can be read by optical sensing head 38" realized using optical sensing techniques well known in the art. In the illustrative embodiment, the digital data representative of these unique zone identifying codes is produced for recording in an information storage structure, as shown in FIG. 2B16, created for each metal-fuel zone identified along the tape by the data reader 38'. Preferably, such information storage is realized by data writing operations carried out by the Data Capture and Processing and Subsystem within the Metal-Fuel Database Management Subsystem 282 during the recharging operations.

According to a fourth alternative method of data recording, both unique digital "zone identifying" code and discharge parameters for each identified metal-fuel zone are recorded in a magnetic, optical, or apertured data track, realized as a strip attacked to and extending along the edge of the metal-fuel tape of the present invention. The block of information pertaining to a particular zone or subsection of metal-fuel, schematically indicated in FIG. 2B16, can be recorded in the data track physically adjacent the related metal-fuel zone facilitating easily access of such recorded information. Typically, the block of information will include the metal-fuel zone identification number and a set of recharge parameters detected by the Data Capture and Processing Subsystem 282 as the metal-fuel zone is transported through the recharging head assembly 11.

The first and second data recording methods described above have several advantages over the third method described above. In particular, when using the first and second methods, the data track provided along the metal-fuel tape can have a very low information capacity. This is because very little information needs to be recorded to tag each metal-fuel zone with a unique identifier (i.e. address number or zone identification number), to which sensed tape recharge parameters are recorded in the Metal-Fuel Database Management Subsystem 280. Also, formation of a data track in accordance with the first and second methods should be inexpensive to fabricate and provide a convenient way of recording zone identifying information along metal-fuel tape.

Input/Output Control Subsystem within the Metal-Fuel Tape Recharging Subsystem In some applications, it may be desirable or necessary to combine two or more FCB systems or their Metal-Fuel Tape Recharging Subsystems in order to form a resultant system with functionalities not provided by the such subsystems operating alone. Contemplating such applications, the Metal-Fuel Tape Recharging Subsystem 7 hereof includes an Input/Output Control Subsystem 41' which allows an external system (e.g. microcomputer or micrcontroller) to override and control aspects of the Metal-Fuel Tape Recharging Subsystem as if its system controller were carrying out such control functions. In the illustrative embodiment, the Input/Output Control Subsystem 41' is realized as a standard IEEE I/O bus architecture which provides an external or remote computer system with a way and means of directly interfacing with the system controller of the Metal-Fuel Tape Recharging Subsystem and managing various aspects of system and subsystem operation in a straightforward manner.

Recharging Power Regulation Subsystem within the Metal-Fuel Tape Recharging Subsystem As shown in FIGS. 2B31,2B32 and 2B4, the output port of the recharging power regulation subsystem 92 is operably connected to the input port of the Cathode-Anode Input Terminal Configuration Subsystem 91 whereas the input port of the recharging power regulation subsystem 92 is operably connected to the output port of the input power supply subsystem. While the primary function of the recharging power regulation subsystem 92 is to regulate the electrical power supplied to metal-fuel tape during the Recharging Mode of operation, the recharging power regulation subsystem 92 can also regulate the voltage applied across the cathode-anode structures of the metal-fuel track, as well as the electrical currents flowing across the cathode-electrolyte interfaces thereof during recharging operations. Such control functions are managed by the system controller 18' and can be programmably selected in a variety of ways in order to achieve optimal recharging of multi-tracked and single-tracked metal-fuel tape while satisfying dynamic loading requirements.

The recharging power regulating subsystem of the first illustrative embodiment can be realized using solid-state power, voltage and current control circuitry well known in the power, voltage and current control arts. Such circuitry can include electrically-programmable power switching circuits using transistor-controlled technology, in which one or more current-controlled sources are connectable in electrical series with the cathode and anode structures of the recharging heads 11 in order to control the electrical currents therethrough in response to control signals produced by the system controller carrying out a particular Recharging Power Control Method. Such electrically-programmable power switching circuits can also include transistor-controlled technology, in which one or more voltage-controlled sources are connectable in electrical parallel with the cathode and anode structures in order to control the voltage thereacross in response to control signals produced by the system controller. Such circuitry can be combined and controlled by the system controller 18' in order to provide constant power (and/or voltage and/or current) control across the cathode-anode structures of the recharging heads 11 of the FCB system.

In the illustrative embodiments of the present invention, the primary function of the recharging power regulation subsystem 92 is to carry out real-time power regulation to the cathode/anode structures of the recharging heads of the system using any one of the following Recharging Power Control Methods, namely: (1) a Constant Input Voltage/Variable Input Current Method, wherein the input voltage applied across each cathode-anode structure is maintained constant while the current therethrough is permitted to vary in response to loading conditions presented by metal-oxide formations on the recharging tape; (2) a Constant Input Current/Variable Input Voltage Method, wherein the current into each cathode-anode structure is maintained constant while the output voltage thereacross is permitted to vary in response to loading conditions; (3) a Constant Input Voltage/Constant Input Current Method, wherein the voltage applied across and current into each cathode-anode structure during recharging are both maintained constant in response to loading conditions; (4) a Constant Input Power Method, wherein the input power applied across each cathode-anode structure during recharging is maintained constant in response to loading conditions; (5) a Pulsed Input Power Method, wherein the input power applied across each cathode-anode structure during recharging is pulsed with the duty cycle of each power pulse being maintained in accordance with preset or dynamic conditions; (6) a Constant Input Voltage/Pulsed Input Current Method, wherein the input current into each cathode-anode structure during recharging is maintained constant while the current into the cathode-anode structure is pulsed with a particular duty cycle; and (7) a Pulsed Input Voltage/Constant Input Current Method, wherein the input power supplied to each cathode-anode structure during recharging is pulsed while the current thereinto is maintained constant.

In the preferred embodiment of the present invention, each of the seven (7) Recharging Power Regulation Methods are preprogrammed into ROM associated with the system controller 18'. Such power regulation methods can be selected in a variety of different ways, including, for example, by manually activating a switch or button on the system housing, by automatically detection of a physical, electrical, magnetic an/or optical condition established or detected at the interface between the metal-fuel cassette device and the Metal-Fuel Tape Recharging Subsystem 7.

System Controller within the Metal-Fuel Tape Recharging Subsystem

As illustrated in the detailed description set forth above, the system controller 18' performs numerous operations in order to carry out the diverse functions of the FCB system within its Recharging Mode. In the preferred embodiment of the FCB system of FIG. 1, the enabling technology used to realize the system controller 18' in the Metal-Fuel Tape Recharging Subsystem 7 is substantially the same subsystem used to realize the system controller 18 in the Metal-Fuel Tape Discharging Subsystem 6, except that the system controller 18' will have some programmed functions which system controller 18 does not have, and vice versa. While a common computing platform can be used to realize system controller 18 and 18', it is understood, however, the system controllers in the Discharging and Recharging Subsystems can be realized as separate subsystems, each employing one or more programmed microprocessors in order to carry out the diverse set of functions performed thereby within the FCB system hereof. In either case, the input/output control subsystem of one of these subsystems can be designed to be the primary input/output control subsystem, with which one or more external subsystems (e.g. a management subsystem) can be interfaced to enable external or remote management of the functions carried out within FCB system hereof.

Recharging Metal-Fuel Tape within the Metal-Fuel Tape Recharging Subsystem

FIG. 2B5 sets forth a high-level flow chart describing the basic steps of recharging metal-fuel tape using the Metal- Fuel Tape Recharging Subsystem 7 shown in FIGS. 2B31, 2B32 through 2B4.

As indicated at Block A, the user places (i.e. inserts) a supply of oxidized metal-fuel tape into the cartridge receiving port of the system housing so that the tape path-length expansion mechanism 10 is adjacent the metal-fuel tape ready for recharging within the Metal-Fuel Tape Recharging Subsystem 7.

As indicated at Block B, the path-length extension mechanism 10 within the Metal-Fuel Tape Recharging Subsystem 7 increases the path-length of the metal-fuel tape 5 over the extended path-length region thereof, as shown in FIGS. 2B31,2B32 and 2B4.

As indicated at Block C, the Recharge Head Transport Subsystem 24' arranges the recharging heads 11 about the metal-fuel tape over the expanded path-length of the Metal-Fuel Tape Recharging Subsystem 7 so that the ionically-conducting medium is disposed between each cathode structure of the recharging head and the adjacent metal-fuel tape.

As indicated at Block D, the Recharge Head Transport Subsystem 24' then configured each recharging head so that its cathode structure is in ionic contact with a portion of the path-length extended metal-fuel tape and its anode contacting structure is in electrical contact therewith.

As indicated at Block E, the cathode-anode input terminal configuration subsystem 91 automatically configured the input terminals of each recharging head arranged about the path-length extended metal-fuel tape, and then the system controller 18' controls the Metal-Fuel Card Recharging Subsystem 7 so that electrical power is supplied to the path-length extended metal-fuel tape at the required recharging voltages and currents, and metal-oxide formations on the tape are converted into the primary metal. When all or a substantial portion of the metal-fuel tape has been recharged, then the Cartridge Loading/Unloading Subsystem 2 can be programmed to automatically eject the metal-fuel tape cartridge for replacement with a cartridge containing recharged metal-fuel tape.

Managing Metal-Fuel Availability and Metal-Oxide Presence within the First Illustrative Embodiment of the Metal-Air FCB System of the Present Invention In the FCB system of the first illustrative embodiment, means are provided for automatically managing the availability of metal-fuel within the Metal-Fuel Tape Discharging Subsystem 6 during discharging operations, and metal-oxide presence within the Metal-Fuel Tape Recharging Subsystem 7 during recharging operations. Such system capabilities will be described in greater detail hereinbelow.

During the Discharging Mode:

As shown in FIG. 2B17, data signals representative of discharge parameters (e.g. $i_{acd}$, $V_{acd}$, ..., $pO_{2d}$, $H_2O_d$, $T_{acd}$, $v_{acr}/i_{acr}$) are automatically provided as input to the Data Capture and Processing Subsystem 277 within the Metal-Fuel Tape Discharging Subsystem 6. After sampling and capturing, these data signals are processed and converted into corresponding data elements and then written into an information structure 285 as shown, for example, in FIG. 2A16. Each information structure 285 comprises a set of data elements which are "time-stamped" and related (i.e. linked) to a unique metal-fuel zone identifier 80 (83,86), associated with a particular metal-fuel tape supply (e.g. reel-to-reel, cassette, etc.). The unique metal-fuel zone identifier is determined by data reading head 38 (38',38") shown in FIG. 2A6. Each time-stamped information structure is then recorded within the Metal-Fuel Database Management Subsystem 275 for maintenance, subsequent processing and/or access during future recharging and/or discharging operations.

As mentioned hereinabove, various types of information are sampled and collected by the Data Capture and Processing Subsystem 277 during the discharging mode. Such information types include, for example: (1) the amount of electrical current ($i_{acd}$) discharged across particular cathode-anode structures within particular discharge heads; (2) the voltage ($v_{acd}$) generated across each such cathode-anode structure; (3) the velocity ($V_d$) of the metal-fuel zone being transported through the discharging head assembly; (4) the oxygen concentration ($pO_{2d}$) level in each subchamber within each discharging head; (5) the moisture level $\{H_2O\}_d$ near each cathode-electrolyte interface within each discharging head; and (6) the temperature ($T_{acd}$) within each channel of each discharging head. From such collected information, the Data Capture and Processing Subsystem 277 can readily compute (i) the time ($\Delta t$) duration that electrical current was discharged across a particular cathode-anode structure within a particular discharge head.

The information structures produced and stored within the Metal-Fuel Database Management Subsystem 275 on a real-time basis can be used in a variety of ways during discharging operations. For example, the above-described current ($i_{avg}$) and time information ($\Delta T$) is conventionally measured in Amperes and Hours, respectively. The product of these measures (AH) provides an approximate measure of the electrical charge (−Q) discharged from the metal-air fuel cell battery structures: along the metal-fuel tape. Thus the computed "AH" product provides an approximate amount of metal-oxide that one can expect to have been formed on the identified (i.e. labelled) zone of metal-fuel, at a particular instant in time, during discharging operations.

When information relating to: the instantaneous velocity ($v_t$) of each metal-fuel zone is used in combination with the AH product, it is possible to compute a more accurate measure of electrical discharge across a cathode-anode structure in a particular discharge head. From this more accurately computed discharged amount, the Data Capture and Processing Subsystem 277 can compute a very accurate estimate of the amount of metal-oxide produced as each metal-fuel zone is transported through a discharge head at a particular tape velocity and given set of discharging conditions determined by the detected recharging parameters.

When used with historical information about metal oxidation and reduction processes, the Metal-Fuel Database Management Subsystem 275 can be used to account for or determine how much metal-fuel (e.g. zinc) should be available for discharging (i.e. producing electrical power) from zinc-fuel tape, or how much metal-oxide is present for reducing along the zinc-fuel tape. Such information can be very useful in carrying out metal-fuel management functions including, for example, determination of metal-fuel amounts available along a particular metal-fuel zone.

In the illustrative embodiment, metal-fuel availability is managed within the Metal-Fuel Tape Discharging Subsystem 6, using one of two different methods for managing metal-fuel availiblity described hereinbelow.

First Method of Metal-Fuel Availability Management During Discharging Operations According to the first method of metal-fuel availability management, (i) the data reading head 38 (38', 38") is used to identify each metal-fuel zone passing under the metal-oxide sensing head assembly 23 and produce zone identification data indicative thereof, while (ii) the metal-oxide sensing head assembly 23 measures the amount of metal oxide present along each identified metal-fuel zone. As mentioned hereinabove, each metal-oxide measurement is carried out by applying a test voltage across a particular track of metal fuel, and detecting the electrical which flows across the section of metal-fuel track in response the applied test voltage. The data signals representative of the applied voltage ($v_{applied}$) and response current ($i_{response}$) at a particular sampling period are automatically detected by the Data Capture and Processing Subsystem 277 and processed to produce a data element representative of the ratio of the applied voltage to response current ($v_{applied}/(i_{response})$) This data element is automatically recorded within an information structure linked to the identified metal-fuel zone maintained in the Metal-Fuel Data Management Subsystem 275. As this data element (v/i) provides a direct measure of electrical resistance across the subsection of metal-fuel tape under measurement, it can be accurately correlated to a measured amount of metal-oxide present on the identified metal-fuel zone. As shown in FIG. 2A16, this metal-oxide measure (MOM) is recorded in the information structure shown linked to the identified metal-fuel zone upon which the response current measurements were taken.

The Data Capturing and Processing Subsystem 277 can then compute the amount of metal-fuel ($MFA_t$) remaining on the identified metal-fuel zone at time "t" using (i) the measured amount of metal-oxide on the identified fuel zone at time instant "t" ($MOM_t$) and (ii) a priori information recorded in the Metal-Fuel Database Management Subsystem 275 regarding the maximum amount of metal-fuel ($MFA_{maximum}$) that is potentially available over each metal-fuel zone when the zone is disposed in its fully charged state, with no metal-oxide formation thereon. This computation can be mathematically expressed as: $MFA_t = MFA_{maximum} - MOM_t$. As illustrated in FIG. 2A16, each such data element is automatically recorded within an information storage structure in the Metal-Fuel Database Management Subsystem 275. The address of each such recorded information structure is linked to the identification data of the identified metal-fuel zone ID data read during discharging operations.

During discharging operations, the above-described metal-fuel availability update procedure is carried out every $t_i$–$t_{i+1}$ seconds for each metal-fuel zone that is automatically identified by the data reading head 38 (38', 38"), over which the metal-fuel tape is transported. This ensures that for each metal-fuel zone along each track along a supply of metal-fuel tape there is an up-to-date information structure containing information on the discharging parameters, the metal-fuel availability state, metal-oxide presence state, and the like.

Second Method of Metal-Fuel Availability Management During Discharging Operations According to the second method of metal-fuel availability management. (i) the data reading head 38 (38', 38") is used to identify each metal-fuel zone passing under the discharging head assembly and produce zone identification data indicative thereof, while (ii) the Data Capturing and Processing Subsystem 277 automatically collects information relating to the various discharging parameters and computes parameters pertaining to the availability of metal-fuel and metal-oxide presence along each metal-fuel zone along a particular supply of metal-fuel tape. In accordance with the principles of the present invention, this method of metal-fuel management is realized as a three-step procedure cyclically carried out within the Metal-Fuel Database Management Subsystem 275 of the Discharging Subsystem 6. After each cycle of computations, the Metal-Fuel Database Management Subsystem 275 contains current (up-to-date) information on the amount of metal-fuel disposed along each metal-fuel zone (disposed along any particular fuel track). Such information on each identifiable zone of the metal-fuel tape can be used to: manage the availability of metal-fuel to meet the electrical power demands of the electrical load connected to the FCB system; as well as set the discharging parameters in an optimal manner during discharging operations.

As shown in FIG. 2A16, information structures 285 are recorded for each identified metal-fuel zone ($MFZ_k$) along each metal-fuel track ($MFT_j$), at each sampled instant of time $t_i$. Initially, the metal-fuel tape has been either fully charged or recharged and loaded into the FCB system hereof, and in this fully charged state, each metal-fuel zone has an initial amount of metal-fuel present along its surface. This initial metal-fuel amount can be determined in a variety of different ways, including for example: by encoding such initialization information on the metal-fuel tape itself; by prerecording such initialization information within the Metal-Fuel Database Management Subsystem 275 at the factory and automatically initialized upon reading a code applied along the metal-fuel tape by data reading head 38 (38', 38"); by actually measuring the initial amount of metal-fuel by sampling values at a number of metal-fuel zones using the metal-oxide sensing assembly 23; or by any other suitable technique.

As part of the first step of the procedure, this initial metal-fuel amount available at initial time instant $t_0$, and designated as $MFA_0$, is quantified by the Data Capture and Processing Subsystem 277 and recorded within the information structure of FIG. 2A16 maintained within the Metal-Fuel Database Management Subsystem 275. While this initial metal-fuel measure ($MFA_0$) can be determined empirically through metal-oxide sensing techniques, in many applications it may be more expedient to use theoretical principles to compute this measure after the tape has been subjected to a known course of treatment (e.g. complete recharging).

The second step of the procedure involves subtracting from the initial metal-fuel amount $MFA_0$, the computed metal-oxide estimate $MOE_{0-1}$ which corresponds to the amount of metal-oxide produced during discharging operations conducted between time interval $t_0$–$t_1$. The during the discharging operation, metal-oxide estimate $MOE_{0-1}$ is computed using the following discharging parameters collected—electrical discharge current $i_{acd}$ time duration $\Delta T_d$, and the average tape zone velocity $v_{0-1}$ over time duration $\Delta T_d$.

The third step of the procedure involves adding to the computed measure ($MFA_0 - MOE_{0-1}$), the metal-fuel estimate $MFE_{0-1}$ which corresponds to the amount of metal-fuel produced during any recharging operations conducted between time interval $t_0$–$t_1$. Notably, the metal-fuel estimate $MFE_{0-1}$ is computed using the following recharging parameters collected—electrical recharge current $i_{acr}$, time duration $\Delta T$, and tape zone velocity $v_{0-1}$ during the discharging operation. As this metal-fuel measure $MFE_{0-1}$ will have been previously computed and recorded within the Metal-Fuel Database Management Subsystem 280 within the Metal-Fuel Tape Recharging Subsystem 7, it will be necessary for the system controller 18 to read this prerecorded information element from the Database Subsystem 280 within the Recharging Subsystem 7 during discharging operations.

The computed result of the above-described procedure (i.e. $MFA_{0-1}$ $MOE_{0-1}+MFE_{0-1}$) is then posted within the Metal-Fuel Database Management Subsystem 275 within Discharging Subsystem 6 as the new current metal-fuel amount ($MFA_1$) which will be used in the next metal-fuel availability update procedure.

During discharging operations, the above-described accounting update procedure is carried out for every $t_i$–$t_{i+1}$ seconds for each metal-fuel zone that is automatically identified by the data reading head 38 (38', 38"), by which the metal-fuel tape is transported. Notably, each element of metal-fuel zone identification data (zone ID data) collected by the data reading head 38 (38', 38") during discharging operations is used to address memory storage locations within the Metal-Fuel Database Management Subsystems 275 and 280 where correlated information structures are to be recorded during database updating operations. While such database updating operations are carried out at the same time that discharging operations are carried out, it may be convenient in some applications to perform such updating operations after the occurance of some predetermined delay period.

Uses for Metal-Fuel Availability Management During the Discharging Mode of Operation During discharging operations, the computed estimates of metal-fuel present over any particular metal-fuel zone (i.e. $MFE_{t1-t2}$), along any particular fuel track, determined at the i-th discharging head, can be used to compute in real-time the availability of metal-fuel at the (j+1)th, (j+2)th, or (j+n)th discharging head downstream from the j-th discharging head. Using such computed measures, the system controller 18 within the Metal-Fuel Tape Discharging Subsystem 6 can determine (i.e. anticipate) in real-time, which metal-fuel zones along a supply of metal-fuel tape contain metal-fuel (e.g. zinc) in quantities sufficient to satisfy instantaneous electrical-loading conditions imposed upon the Metal-Fuel Tape Discharging Subsystem 6 during the discharging operations, and selectively advance the metal-fuel tape to zones where metal-fuel is known to exist. In the event that gaps of fuel-depletion exist along any particular section of tape, the tape transport control subsystem can rapidly "skip over" such tape sections to where metal-fuel exists. Such tape advancement (or skipping) operations can be carried out by the system controller 18 temporarily increasing the instantaneous velocity of the metal-fuel tape so that tape supporting metal-fuel content (e.g. deposits) along particular tracks are readily available for producing electrical power required by the electrical load 12. During such brief time periods when depleted sections of tape are transported through the discharging head assembly 9, the discharging power regulation subsystem 40, equipped with storage capacitors or the like, can serve to regulate the output power as required by electrical load conditions.

Another advantage derived from such metal-fuel management capabilities is that the system controller 18 within the Metal-Fuel Tape Discharging Subsystem 6 can control discharge parameters during discharging operations using information collected and recorded within the Metal-Fuel Database Management Subsystem 275 during the immediately prior discharging and recharging operations.

Means for Controlling Discharging Parameters During the Discharging Mode Using Information Recorded During the Prior Modes of Operation In the FCB system of the first illustrative embodiment, the system controller 18 within the Metal-Fuel Tape Discharging Subsystem 6 can automatically control discharge parameters using information collected during prior recharging and discharging operations and recorded within the Metal-Fuel Database Management Subsystems of the FCB system of FIG. 1.

As shown in FIG. 2B17, the subsystem architecture and buses 276. 279 and 281 provided within and between the Discharging and Recharging Subsystems 6 and 7 enable system controller 18 within the Metal-Fuel Tape Discharging Subsystem 6 to access and use information recorded within the Metal-Fuel Database Management Subsystem 280 within the Metal-Fuel Tape Recharging Subsystem 7. Similarly, the subsystem architecture and buses provided within and between the Discharging and Recharging Subsystems 6 and 7 enable system controller 18' within the Metal-Fuel Tape Recharging Subsystem 7 to access and use information recorded within the Metal-Fuel Database Management Subsystem 275 within the Metal-Fuel Tape Discharging Subsystem 6. The advantages of such information file and sub-file sharing capabilities will be explained hereinbelow.

During the discharging operations, the system controller 18 can access various types of information stored within the Metal-Fuel Database Management Subsystems of Discharging and Recharging Subsystems 6 and 7. One important information element will relate to the amount of metal-fuel currently available at each metal-fuel zone along a particular fuel track at a particular instant of time (i.e. $MFE_t$). Using this information, the system controller 18 can determine if there will be sufficient metal-fuel along a particular section of tape to satisfy current electrical power demands. The zones along one or more or all of the fuel tracks along a supply of metal-fuel tape may be substantially consumed as a result of prior discharging operations, and not having been recharged since the last discharging operation. The system controller 18 can anticipate such metal-fuel conditions prior to the section of tape being transported over the discharging heads. Depending on the metal-fuel condition of "upstream" sections of tape, the system controller 18 may respond as follows: (i) increase the tape speed when the fuel is thinly present on identified zones, and decrease the tape speed when the fuel is thickly present on identified zones being transported through the discharging heads, to satisfy the demands of the electrical load; (ii) connect the cathode-anode structures of metal-fuel "rich" tracks into the discharging power regulation subsystem 40 when high loading conditions are detected at load 12, and connect the cathode-anode structures of metal-fuel "depleted" tracks from this subsystem when low loading conditions are detected at load 12; (iii) increase the amount of oxygen being injected within the corresponding cathode support structures (i.e. increase the $pO_2$ therewithin) when the thinly formed metal-fuel is present on identified metal-fuel zones, and decrease the amount of oxygen being injected within the corresponding cathode support structures when thickly formed metal-fuel is present on identified metal-fuel zones being transported through the discharging heads; (iv) control the temperature of the discharging heads when the sensed temperature thereof exceeds predetermined thresholds; etc. It is understood that in alternative embodiments of the present invention, the system controller 18 may operate in different ways in response to the detected condition of particular tracks on an identified fuel zone.

During the Recharging Mode:

As shown in FIG. 2B17, data signals representative of recharge parameters (e.g. $i_{acr}$, $v_{acr}$, . . . , $pO_{2r}$, $H_2O_r$, $T_r$, $v_{acr}/i_{acr}$) are automatically provided as input to the Data Capture and Processing Subsystem 275 within the Metal-Fuel Tape Recharging Subsystem 7. After sampling and capturing, these data signals are processed and converted into corresponding data elements and then written into an information structure 286 as shown, for example, in FIG. 2B16. As in the case of discharge parameter collection, each information structure 286 for recharging parameters comprises a set of data elements which are "time-stamped" and related (i.e. linked) to a unique metal-fuel zone identifier 80 (83, 86), associated with the metal-fuel tape supply (e.g. reel-to-reel, cassette, etc.) being recharged. The unique metal-fuel zone identifier is determined by data reading head 60 (60', 60") shown in FIG. 2B6. Each time-stamped information structure is then recorded within the Metal-Fuel Database Management Subsystem 280 of the Metal-Fuel Tape Recharging Subsystem 7, shown in FIG. 2B17, for maintenance, subsequent processing and/or access during future recharging and/or discharging operations.

As mentioned hereinabove, various types of information are sampled and collected by the Data Capture and Processing Subsystem 282 during the recharging mode. Such information types include, for example: (1) the recharging voltage applied across each such cathode-anode structure within each recharging head; (2) the amount of electrical current ($i_{ac}$) supplied across each cathode-anode structures within each recharge head; (3) the velocity of the metal-fuel tape being transported through the recharging head assembly; (4) the oxygen concentration ($pO_2$) level in each subchamber within each recharging head; (5) the moisture level ($H_2O$) near each cathode-electrolyte interface within each recharging head; and (6) the temperature ($T_{ac}$) within each channel of each recharging head. From such collected information, the Data Capture and Processing Subsystem 282 can readily compute various parameters of the system including, for example, the time duration ($\Delta t$) that electrical current was supplied to a particular cathode-anode structure within a particular recharging head.

The information structures produced and stored within the Metal-Fuel Database Management Subsystem 280 of the Metal-Fuel Tape Recharging Subsystem 7 on a real-time basis can be used in a variety of ways during recharging operations. For example, the above-described current ($i_{avg}$) and time duration ($\Delta T$) information acquired during the recharging mode is conventionally measured in Amperes and Hours, respectively. The product of these measures (AH) provides an approximate measure of the electrical charge (−Q) supplied to the metal-air fuel cell battery structures along the metal-fuel tape during recharging operations. Thus the computed "AH" product provides an approximate amount of metal-fuel that one can expect to have been produced on the identified (i.e. labeled) zone of metal-fuel, at a particular instant in time, during recharging operations.

When information relating to the instantaneous velocity ($v_t$) of each metal-fuel zone is used in combination with the AH product, it is possible to compute a more accurate measure of electrical charge (Q) supplied to a particular cathode-anode structure in a particular recharging head. From this accurately computed "recharge" amount, the Data Capture and Processing Subsystem 282 can compute a very accurate estimate of the amount of metal-fuel produced as each identified metal-fuel zone is transported through each recharging head at a particular tape velocity, and given set of recharging conditions determined by the detected recharging parameters.

When used with historical information about metal oxidation and reduction processes, the Metal-Fuel Database Management Subsystems within the Metal-Fuel Tape Discharging and Recharging Subsystems 6 and 7 respectively can be used to account for or determine how much metal-oxide (e.g. zinc-oxide) should be present for recharging (i.e. conversion back into zinc from zinc-oxide) along the zinc-fuel tape. Thus such information can be very useful in carrying out metal-fuel management functions including, for example, determination of metal-oxide amounts present along each metal-fuel zone during recharging operations.

In the illustrative embodiment, the metal-oxide presence process may be managed within the Metal-Fuel Tape Recharging Subsystem 7 using one or two different methods which will be described hereinbelow.

First Method of Metal-Oxide Presence Management During Recharging Operations According to the first method of metal-oxide presence management, (i) the data reading head 60 (60', 60") is used to identify each metal-fuel zone passing under the metal-oxide sensing head assembly 23' and produce zone identification data indicative thereof, while (ii) the metal-oxide sensing head assembly 23' measures the amount of metal oxide present along each identified metal-fuel zone. As mentioned hereinabove, each metal-oxide measurement is carried out by applying a test voltage across a particular track of metal fuel, and detecting the electrical current which flows across the section of metal-fuel track in response the applied test voltage. The data signals representative of the applied voltage ($V_{applied}$) and response current ($i_{response}$) at a particular sampling period are automatically detected by the Data Capture and Processing Subsystem 282 and processed to produce a data element representative of the ratio of the applied voltage to response current ($V_{applied}/i_{response}$). This data element is automatically recorded within an information structure linked to the identified metal-fuel zone, maintained in the Metal-Fuel Data Management Subsystem 282 of the Metal-Fuel Tape Recharging Subsystem 7. As this data element (v/i) provides a direct measure of electrical resistance across the subsection of metal-fuel tape under measurement, it can be accurately correlated to a measured amount of metal-oxide present on the identified metal-fuel zone. As shown in FIG. 2B16, this metal-oxide measure (MOM) is recorded in the information structure shown linked to the identified metal-fuel zone upon which the response current measurements were taken during a particular recharging operation.

The Data Capturing and Processing Subsystem 282 within the Metal-Fuel Tape Recharging Subsystem 7 can then compute the amount of metal-oxide ($MOA_t$) existing on the identified metal-fuel zone at time "t". As illustrated in FIG. 2B16, each such data element is automatically recorded within an information storage structure in the Metal-Fuel Database Management Subsystem 282 of the Metal-Fuel Tape Recharging Subsystem 7. The address of each such recorded information structure is linked to the identification data of the identified metal-fuel zone ID data read during recharging operations.

During recharging operations, the above-described metal-oxide presence update procedure is carried out every $t_i$–$t_{i+1}$ seconds for each metal-fuel zone that is automatically identified by the data reading head 60 (60', 60"), over which the metal-fuel tape is transported.

Second Method of Metal-Fuel Presence Management During Recharging Operations According to the second method of metal-fuel presence management, (i) the data reading head 60 (60', 60") is used to identify each metal-fuel zone passing under the recharging head assembly and produce zone identification data indicative thereof, while (ii) the Data Capturing and Processing Subsystem 282 automatically collects information relating to the various recharging parameters and computes parameters pertaining to the availability of metal-fuel and metal-oxide presence along each metal-fuel zone along a particular supply of metal-fuel tape. As will be described in greater detail hereinafter, this method of metal-oxide management is realized as a three-step procedure cyclically carried out within the Metal-Fuel Database Management Subsystem 280 of the Recharging Subsystem 7. After each cycle of computation, the Metal-Fuel Database Management Subsystem 280 contains current (up-to-date) information on the amount of metal-fuel disposed along each metal-fuel zone (disposed alone any particular fuel track). Such information on each identifiable zone of the metal-fuel tape can be used to: manage the presence of metal-oxide for efficient conversion into its primary metal; as well as set the recharging parameters in an optimal manner during recharging operations.

As shown in FIG. 2B16, information structures 286 are recorded for each identified metal-fuel zone ($MFZ_k$) along each metal-fuel track ($MFT_j$), at each sampled instant of time $t_i$. Typically, the metal-fuel tape has been completely or partially discharged and loaded into the FCB system hereof, and in this discharged state, each metal-fuel zone has an initial amount of metal-oxide present along its surface which cannot be used to produced electrical power within the FCB system. This initial metal-fuel amount can be determined in a variety of different ways, including for example: by encoding such initialization information on the metal-fuel tape itself; by prerecording such initialization information within the Metal-Fuel Database Management Subsystem 282 at the factory and automatically initialized upon reading a code applied along the metal-fuel tape by data reading head 60 (60', 60"); by actually measuring the initial amount of metal-oxide by sampling values at a number of metal-fuel zones using the metal-oxide sensing assembly 23'; or by any other suitable technique.

As part of the first step of the metal-oxide management procedure, this initial metal-oxide amount available at initial time instant $t_0$, and designated as $MOA_0$, is quantified by the Data Capture and Processing Subsystem 282 and recorded within the information structure of FIG. 2B16 maintained within the Metal-Fuel Database Management Subsystem 282 of the Metal-Fuel Tape Recharging Subsystem 7. While this initial metal-oxide measure ($MOA_0$) can be determined empirically through metal-oxide sensing techniques, in many applications it may be more expedient to use theoretical principles to compute this measure after the tape has been subjected to a known course of treatment (e.g. complete discharging).

The second step of the procedure involves subtracting from the initial metal-oxide amount $MOA_0$, the computed metal-fuel estimate $MFE_{0-1}$ which corresponds to the amount of metal-fuel produced during recharging operations conducted between time interval $t_0-t_1$. During the recharging operation, metal-oxide estimate $MOE_{0-1}$ is computed using the following recharging parameters collected— electrical recharge current $i_{acr}$, time duration thereof $\Delta T$, and tape zone velocity $v_{0-1}$.

The third step of the procedure involves adding to the computed measure ($MOA_0-MFE_{0-1}$), the metal-oxide estimate $MOE_{0-1}$ which corresponds to the amount of metal-oxide produced during any discharging operations conducted between time interval $t_0-t_1$. Notably, the metal-oxide estimate $MOE_{0-1}$ is computed using the following discharging parameters collected—electrical discharge current $i_{acd}$, time duration thereof $\Delta T_r$ and average tape zone velocity $v_{0-1}$ over this time duration during recharging operations. As this metal-oxide estimate $MOE_{0-1}$ will have been previously computed and recorded within the Metal-Fuel Database Management Subsystem within the Metal-Fuel Tape Discharging Subsystem 6, it will be necessary to read this prerecorded information element from the database within the Metal-Fuel Tape Discharging Subsystem 6 during recharging operations.

The computed result of the above-described accounting procedure (i.e. $MOA_0-MFE_{0-1}+MOE_{0-1}$) is then posted within the Metal-Fuel Database Management Subsystem 280 within Recharging Subsystem 7 as the new current metal-oxide amount ($MOA_1$) which will be used in the next metal-oxide presence update procedure.

During recharging operations, the above-described accounting update procedure is carried out for every $t_i-t_{i+1}$ seconds for each metal-fuel zone that is automatically identified by the data reading head 60 (60', 60"), by which the metal-fuel tape is transported. Notably, each element of metal-fuel zone identification data (zone ID data) is collected by the data reading head 60 (60', 60") during recharging operations and is used to address memory storage locations within the Metal-Fuel Database Management Subsystem 280 where correlated information structures are to be recorded during database updating operations. While such database updating operations are carried out at the same time that recharging operations are carried out, it may be convenient in some applications to perform such updating operations after the occurrence of some predetermined delay period.

Uses for Metal-Oxide Presence Management
During the Recharging Mode of Operation During recharging operations, the computed amounts of metal-oxide present over any particular metal-fuel zone (i.e. $MOA_{t1-t2}$), along any particular fuel track, determined at the i-th recharging head, can be used to compute in real-time the presence of metal-fuel at the (j+1)th, (j+2)th, or (j+n)th recharging head downstream from the j-th recharging head. Using such computed measures, the system controller 18' within the Metal-Fuel Tape Recharging Subsystem 7 can determine (i.e. anticipate) in real-time, which metal-fuel zones along a supply of metal-fuel tape contain metal-oxide (e.g. zinc-oxide) requiring recharging, and which contain metal-fuel not requiring recharging. For those metal-fuel zones requiring recharging, the system controller 18' can temporarily increasing the instantaneous velocity of the metal-fuel tape so that tape supporting metal-oxide content (e.g. deposits) along particular tracks are readily available for conversion into metal-fuel within the recharging head assembly.

Another advantage derived from such metal-oxide management capabilities is that the system controller 18' within the Metal-Fuel Tape Recharging Subsystem 7 can control recharge parameters during recharging operations using information collected and recorded within the Metal-Fuel Database Management Subsystem 280 during the immediately prior discharging operations, and vice versa. Such advantages will be described in greater detail hereinafter.

During Recharging operations, information collected can be used to compute an accurate measure of the amount of metal-oxide that exists along each metal-fuel zone at any instant in time. Such information, stored within information storage structures maintained within the Metal-Fuel Database Subsystem 280, can be accessed and used by the system controller 18' within the Metal-Fuel Tape Discharging Subsystem 7 to control the amount of electrical current supplied across the cathode-anode structures of each recharging head 11. Ideally, the magnitude of electrical current will be selected to ensure complete conversion of the estimated amount of metal-oxide (present at each such zone) into its source metal (e.g. zinc).

Means for Controlling Recharging Parameters During the Recharging

Mode Using Information Recorded During the Prior Modes of Operation

In the FCB system of the first illustrative embodiment, the system controller 18' within the Metal-Fuel Tape Recharging Subsystem 7 can automatically control recharge parameters using information collected during prior discharging and recharging operations and recorded within the Metal-Fuel Database Management Subsystems of the FCB system of FIG. 1.

During the recharging operations, the system controller 18' within the Metal-Fuel Tape Recharging Subsystem 7 can access various types of information stored within the Metal-Fuel Database Management Subsystem 275. One important information element stored therein will relate to the amount of metal-oxide currently present at each metal-fuel zone along a particular fuel track at a particular instant of time (i.e. $MOE_t$). Using this information, the system controller 18' can determine exactly where metal-oxide deposits are present along particular sections of tape, and thus can advance the metal fuel tape thereto in order to efficiently and quickly carry out recharging operations therealong. The system controller, 18' can anticipate such metal-fuel conditions prior to the section of tape being transported over the recharging heads. Depending on the metal-fuel condition of "upstream" sections of tape, the system controller 18' of the illustrative embodiment may respond as follows: (i) increase the tape speed when the metal-oxide is thinly present on identified zones, and decrease the tape speed when the metal-oxide is thickly present thereon; (ii) connect cathode-anode structures of metal-oxide "rich" tracks into the recharging power regulation subsystem 92 for longer periods of recharging, and connect metal-oxide "depleted" tracks from this subsystem for shorter periods of recharging; (iii) increase the rate of oxygen evacuation from cathode-anode structures having thickly formed metal-oxide formations present on identified metal-fuel zones, and decrease the rate of oxygen evacuation from cathode-anode structures having thinly formed metal-oxide formations present on identified metal-fuel zones being transported through the recharging heads; (iv) control the temperature of the recharging heads when the sensed temperature thereof exceeds predetermined thresholds; etc. It is understood that in alternative embodiments of the present invention, the system controller 18' may operate in different ways in response to the detected condition of particular track on an identified fuel zone.

THE SECOND ILLUSTRATE EMBODIMENT OF THE METAL-FUEL TAPE FCB SYSTEM OF THE PRESENT INVENTION

Figure 3A:
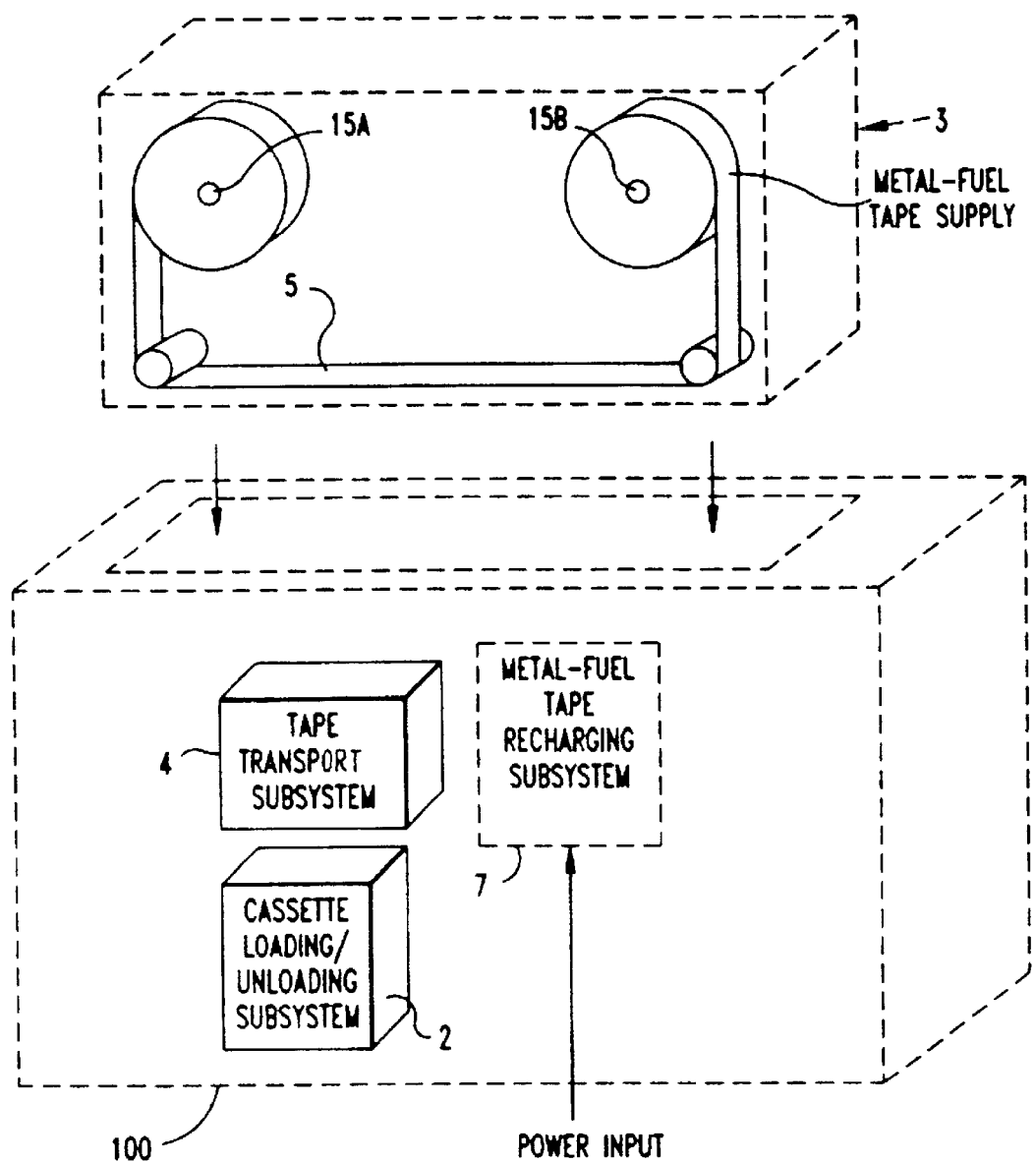
FIG. 3A is a schematic block diagram of a second illustrative embodiment of the metal-air FCB system of the present invention shown realized as an external stand-alone unit, into which a cassette-type device containing a supply of oxidized metal-fuel tape can be received and quickly recharged for reuse in generating of electrical power.

The second illustrative embodiment of the metal-air FCB system hereof is illustrated in FIG. 3A. As shown therein, this FCB system 100 comprises a number of subsystems, namely: a Metal-Fuel Tape Cassette Cartridge Loading/Unloading Subsystem 2 as described hereinabove for loading and unloading of a metal-fuel tape cassette device 3 into the FCB system during its Cartridge Loading and Unloading Modes of operation, respectively; a Metal-Fuel Tape Transport Subsystem 4 as described hereinabove for transporting the metal-fuel tape through the system during its Discharging and Recharging Modes of operation; and Metal-Fuel Tape Recharging Subsystem 7 as described hereinabove for electro-chemically recharging (i.e. reducing) sections of oxidized metal-fuel tape during the Recharging Mode of operation. Details concerning each of these subsystems have been described hereinabove in connection with the first illustrative embodiment of the FCB system shown in FIG. 1. The primary difference between the systems shown in FIGS. 1 and 3 is that the system of FIG. 3 does not have a Metal-Fuel Discharging Subsystem 6, and thus functions as a recharger and not a discharging (i.e. power generating) device.

THE THIRD ILLUSTRATIVE EMBODIMENT OF THE METAL-AIR FCB SYSTEM OF THE PRESENT INVENTION

The third illustrative embodiment of the metal-air FCB system hereof is illustrated in FIG. 3B. As shown therein, this FCB system 101 comprises a number of subsystems, namely: a Metal-Fuel Tape Cassette Cartridge Loading/Unloading Subsystem 2 for loading and unloading of a metal-fuel tape cassette device 4 into the FCB system; a Metal-Fuel Tape Transport Subsystem 7 for transporting the metal-fuel tape through the system during its Discharging and Recharging Modes of operation; and Metal-Fuel Tape Recharging Subsystem 7 for electro-chemically recharging (i.e. reducing) sections of oxidized metal-fuel tape during the Recharging lode of operation. Details concerning each of these subsystems have been described hereinabove in connection with the first illustrative embodiment of the FCB system shown in FIG. 1. The primary difference between the systems shown in FIGS. 3A and 3B is that the system of FIG. 3B is capable of recharging metal-fuel cassette devices 3 that may incorporate a component or two of a discharging head, as well as other components associated with Metal-Fuel Tape Discharging Subsystem 6.

THE FOURTH ILLUSTRATIVE EMBODIMENT OF THE AIR-METAL FCB SYSTEM OF THE PRESENT INVENTION

Figure 5B:
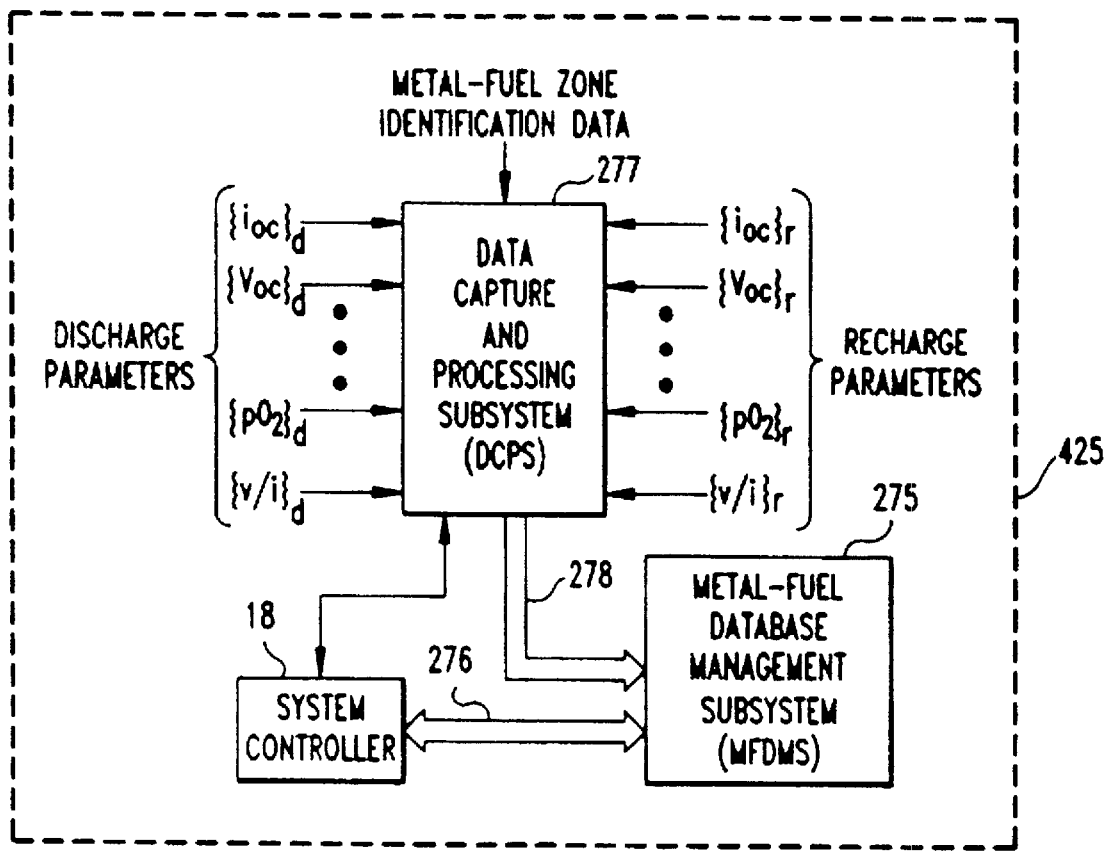
FIG. 5B is a schematic representation of the FCB system of FIG. 4 showing a number of subsystems which enable data capture, processing and storage of discharge and recharge parameters as well as metal-fuel and metal-oxide indicative data for use during discharging and recharging modes of operation.

In FIGS. 4 through 5B, a fourth embodiment of the FCB system hereof is disclosed. This system 420 is a hybrid of the system of FIG. 1, wherein the discharging and recharging head assembly are combined into a single assembly enabling simultaneous discharge and recharge operations. As shown in FIG. 4, FCB system 420 comprises a tape transport subsystem 2, a cassette tape loading/unloading subsystem 2, and a hybrid-type metal-fuel tape discharging/recharging subsystem 425. The tape transport subsystem 4 and cassette tape loading/unloading subsystem 2 are substantially similar as the subsystems disclosed in connection with the first, second and third illustrative embodiments shown in FIGS. 1, 3A and 3B and thus will not be redescribed to avoid obfuscation of the present invention. The hybrid-type metal-fuel tape discharging/recharging subsystem 425 employed in the system of FIG. 4 is sufficiently different from the subsystems described hereinabove to warrant further description below.

As shown in FIGS. 5A1(1),5A1(2) and 5A2, the metal-fuel tape discharging/recharging subsystem 425 comprises a discharging head subassembly 9', a recharging head subassembly 11', discharging power regulation subsystem 40, and recharging power regulation subsystem of the type employed in the FCB system of FIG. 1. The discharging and recharging head subassemblies 9' and 11' are mounted upon a common discharge/recharge transport subsystem 424 which is functionally equivalent to the discharging head transport subsystem 24 and recharging head transport subsystem 24' disclosed in FIGS. 2A31,2A32 and 2A4. The discharging power regulation subsystem and recharging power regulation subsystem having functionalities similar to those described hereinabove. The system bus architecture of the hybrid-type metal-fuel tape discharging/recharging subsystem 425 is illustrated in FIG. 5B and in many ways is similar to the architecture shown in FIG. 2Bl7.

In the illustrative embodiment shown in FIGS. 5A1(1), 5A1(2) and 5A2, the recharging surface area of the recharging head subassembly 11' is substantially greater than the discharging surface area of the discharging head subassembly 9', in order to ensure rapid recharging operations. The terminals of each cathode-electrolyte structure of heads 9' and 11' are connected to a cathode-electrolyte terminal configuration subsystem 426 which can be programmed to configure the terminals of the heads 9' and 11' to function as either a discharging head or recharging head as required by any particular application at hand. Programmable cathode-electrolyte terminal configuration Subsystem 426 is controlled by system controller 18 and is surrounded by many of the supporting subsystems employed in the Discharging and Recharging Subsystems 6 and 7 of the FCB system of FIG. 1.

In the event that a particular head within the metal-fuel tape discharging/recharging subsystem 425 is configured to function as a discharging head, then pressurized air will be pumped into the cathode structure thereof to increase the $pO_2$ therewithin during the Discharge Mode while the output terminals thereof are connected to the input terminals of the discharging power regulation subsystem 40, shown in FIGS. 5A1(1),5A1(2) and 5A2. In the event that a particular bead within the metal-fuel tape discharging/recharging subsystem 425 is configured to function as a recharging head, then pressurized air will be evacuated from the cathode structure thereof to lower the $pO_2$ therewithin during the Recharging Mode while the input terminals thereof are connected to the output terminals of the recharging power regulation subsystem 92, shown in FIGS. 5A1(1),5A1(2) and 5A2. The This hybrid architecture has a number of advantages, namely: it enables multiple discharging heads in applications where long-term high power generation is required; it enables multiple recharging heads where ultra-fast recharging operations are required; and it enables simultaneous discharging and recharging operations where moderate electrical loading requirements must be satisfied.

Additional Embodiments of the FCB System of the Present Invention

In the FCB systems described hereinabove, multiple discharging heads and multiple recharging heads have been provided for the noted advantages that such features provide. It is understood, however, that FCB systems of the present invention can be made with a single discharging head alone or in combination with one or more recharging heads.

In the FCB systems described hereinabove, the cathode structures of the discharging heads and the recharging heads are shown as being planar or substantially planar structures which are substantially stationary relative to the anode-contacting electrodes or elements, while the metal-fuel (i.e. the anode) material is either: (i) stationary relative to the cathode structures in the metal-fuel card embodiments of the present invention shown in FIGS. 4 and 6; or (ii) moving relative to the cathode structures in the metal-fuel tape embodiments of the present invention shown in FIGS. 1, 2, 3 and 8.

It is understood, however, the metal-air FCB system designs of the present invention are not limited to the use of planar stationary cathode structures, but can be alternatively constructed using one or more cylindrically-shaped cathode structures adapted to rotate relative to, and come into ionic contact with metal-fuel tape or metal-fuel cards during discharging and/or recharging operations, while carrying out all of the electro-chemical functions that cathode structures must enable in metal-air FCB systems. Such alternative cathode structures are disclosed in greater detail in U.S. Pat No. 6,335,111, entitled "METAL-AIR FUEL CELL BATTERY SYSTEM EMPLOYING A PLURALITY OF MOVING CATHODE STRUCTURES FOR IMPROVED VOLUMETRIC POWER DENSITY" filed Jul. 3, 1998; U.S. Pat. No. 6,299,997, entitled "METAL-AIR FUEL CELL BATTERY SYSTEM EMPLOYING METAL-FUEL TAPE AND LOW-FRICTION CATHODE STRUCTURES" filed Jul. 3, 1998, each incorporated herein by reference in its entirety. Notably, the same techniques that are used to construct planar stationary cathodes structures described hereinabove can be readily adapted to fashion cylindrically-shaped cathode structures realized about hollow, air-pervious support tubes driven by electric motors and bearing the same charge collecting substructure that the cathode structures typically are provided with, as taught in detail hereinabove.

In such alternative embodiments of the present invention, the ionically-conducting medium disposed between the cylindrically-shaped rotating cathode structure(s) and transported metal-fuel tape can be realized in a number of different ways, for example, as: (1) a solid-state electrolyte-impregnated gel or other medium affixed to the outer surface of the rotating cathode; (2) a solid-state electrolyte-impregnated gel or other medium affixed to the surface of the transported metal-fuel tape arranged in ionic-contact with the rotating cylindrically-shaped cathode structure; (3) a belt-like structure comprising a flexible porous substrate embodying a solid-state ionically conducting medium, transportable relative to both the rotating cylindrically-shaped cathode structure and the moving metal-fuel tape or (card) during discharging and/or recharging operations; or (4) a liquid-type ionically conducting medium (e.g. such as an electrolyte) disposed between the rotating cathode structure and transported metal-fuel tape (or card) to enable ionic charge transport between the cathode and anode structures during discharging and recharging operations.

One particular advantage in using a solid-state ionically-conducting belt like structure of the type-described above is that it provides "frictionless" contact between transported metal-fuel tape and its rotating cylindrical cathode structure, thereby reducing the amount of electrical power required to transport metal-fuel tape, as well as minimize wear, tear and damage to the cathode and anode structures in the FCB system during operation.

In embodiments where multiple cathode cylinders or belts are mounted within an array-like structure as taught in Applicants' U.S. Pat. No. 6,299,997, entitled "METAL-AIR FUEL CELL BATTERY SYSTEM EMPLOYING METAL-FUEL TAPE AND LOW-FRICTION CATHODE STRUC- TURES" filed Jul. 3, 1998, it is possible to generate very high electrical power output from physical structures occupying relatively small volumes of space, thereby providing numerous advantages over prior art FCB systems.

The above-described FCB systems of the present invention can be used to power various types of electrical circuits, devices and systems, including, but not limited to, lawn mowers, stand-alone portable generators, vehicular systems, and a nominal 200 kW discharging system.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying Claims to Invention.

What is claimed is:

1. A metal-air fuel cell battery system, comprising:

a supply of metal-fuel tape wound on a supply spindle and taken up on a take-up spindle; and an extension mechanism for configuring said metal fuel tape along a folded path that allows at least one discharging head to be configured about said metal-fuel tape during tape discharging operations, said extension mechanism comprises a structure movable between a first position and a second position, the first position positioned for an unfolded path of metal fuel tape and the second position positioned for the folded path, wherein said at least one discharging head produces electrical power from said supply of metal-fuel tape as said metal-fuel tape is transported through said discharging head during tape discharging operations.

2. The metal-air fuel cell battery of claim 1, wherein said discharging head comprises:

a cathode support structure supporting an electrically-conductive cathode element pervious to oxygen;

anode-contacting structure supporting an electrically-conductive anode-contacting element for establishing electrical contact with said metal-fuel tape; and an ionic medium for providing a source of ions between said electrically-conductive cathode element and electrically-conductive anode-contacting element associated with said discharging head.

3. The metal-air fuel cell battery of claim 2, which further comprises a tape transport mechanism for transporting said metal-fuel tape past said cathode support structure and said anode-contacting element, while said ionic medium is disposed between said metal-fuel tape and said electrically-conductive cathode element.

4. The metal-air fuel cell battery system of claim 1, wherein said supply spindle and said take-up spindle are driven by a motor.

5. The metal-air fuel cell battery system of claim 4, wherein said motor comprises an electric motor.

6. The metal-air fuel cell battery system of claim 1, comprising a plurality of discharging heads.

7. A metal-air fuel cell battery system, comprising:

a supply of metal-fuel tape wound on a supply spindle and taken up on a take-up spindle; and an extension mechanism for configuring said metal fuel tape along a folded path that allows at least one recharging head to be configured about said metal-fuel tape during tape recharging operations; said extension mechanism comprising a structure movable between a first position and a second position, the first position positioned for an unfolded path of metal fuel tape and the second position positioned for the folded path, wherein said at least one recharging head receives electrical power from an electrical power supply as said metal-fuel tape is transported through each said recharging head during tape recharging operations.

8. The metal-air fuel cell battery of claim 7, wherein said recharging head comprises:

a cathode support structure supporting an electrically-conductive cathode element pervious to oxygen;

anode-contacting structure supporting an electrically-conductive anode-contacting element for establishing electrical contact with said metal-fuel tape; and an ionic medium for providing a source of ions between said electrically-conductive cathode element and electrically-conductive anode-contacting element associated with said recharging head.

9. The metal-air fuel cell battery of claim 8, which further comprises tape transport means for transporting said metal-fuel tape past said cathode support structure and said anode-contacting element, while said ionic medium is disposed between said metal-fuel tape and said electrically-conductive cathode element.

10. The metal-air fuel cell battery system of claim 7, wherein said supply spindle and said take-up spindle are driven by a motor.

11. The metal-air fuel cell battery system of claim 10, wherein said motor comprises an electric motor.

12. The metal-air fuel cell battery system of claim 7, comprising a plurality of recharging heads.

13. A metal-air fuel cell battery system, comprising:

a supply of metal-fuel tape wound on a supply spindle and taken up on a take-up spindle; and an extension mechanism for configuring said metal fuel tape along a folded path that allows at least one discharging head to be configured about said metal-fuel tape during tape discharging operations, said extension mechanism comprising at least two rollers configured to remain in a first position with respect to said metal fuel tape, and at least one roller configured to be displaced between the first position and a second position, the second position positioned for the folded path, wherein said at least one discharging head produces electrical power from said supply of metal-fuel tape as said metal-fuel tape is transported through said discharging head during tape discharging operations.

14. The metal-air fuel cell battery of claim 13, wherein said discharging head comprises:

a cathode support structure supporting an electrically-conductive cathode element pervious to oxygen;

anode-contacting structure supporting an electrically-conductive anode-contacting element for establishing electrical contact with said metal-fuel tape; and an ionic medium for providing a source of ions between said electrically-conductive cathode element and electrically-conductive anode-contacting element associated with said discharging head.

15. The metal-air fuel cell battery of claim 14, which further comprises a tape transport mechanism for transporting said metal-fuel tape past said cathode support structure and said anode-contacting element, while said ionic medium is disposed between said metal-fuel tape and said electrically-conductive cathode element.

16. The metal-air fuel cell battery system of claim 13, wherein said supply spindle and said take-up spindle are driven by a motor.

17. The metal-air fuel cell battery system of claim 16, wherein said motor comprises an electric motor.

18. The metal-air fuel cell battery system of claim 14, comprising a plurality of discharging heads.

19. A metal-air fuel cell battery system, comprising:

a supply of metal-fuel tape wound on a supply spindle and taken up on a take-up spindle; and an extension mechanism for configuring said metal fuel tape along a folded path that allows at least one recharging head to be configured about said metal-fuel tape during tape recharging operations, said extension mechanism comprising at least two rollers configured to remain in a first position with respect to said metal fuel tape, and at least one roller configured to be displaced between the first position and a second position, the second position positioned for the folded path, wherein said at least one recharging head receives electrical power from an electrical power supply as said metal-fuel tape is transported through each said recharging head during tape recharging operations.

20. The metal-air fuel cell battery of claim 19, wherein said recharging head comprises:

a cathode support structure supporting an electrically-conductive cathode element pervious to oxygen;

anode-contacting structure supporting an electrically-conductive anode-contacting element for establishing electrical contact with said metal-fuel tape; and an ionic medium for providing a source of ions between said electrically-conductive cathode element and electrically-conductive anode-contacting element associated with said recharging head.

21. The metal-air fuel cell battery of claim 20, which further comprises tape transport means for transporting said metal-fuel tape past said cathode support structure and said anode-contacting element, while said ionic medium is disposed between said metal-fuel tape and said electrically-conductive cathode element.

22. The metal-air fuel cell battery system of claim 19, wherein said supply spindle and said take-up spindle are driven by a motor.

23. The metal-air fuel cell battery system of claim 22, wherein said motor comprises an electric motor.

24. The metal-air fuel cell battery system of claim 19, comprising a plurality of recharging heads.

* * * * *